United States Patent [19]
Okada et al.

[11] Patent Number: 6,082,650
[45] Date of Patent: Jul. 4, 2000

[54] SPINNING FISHING REEL HAVING A UNIFORM LONGITUDINAL SPOOL MOVEMENT

[75] Inventors: Atsuhito Okada; Yukihisa Sato, both of Fuchu, Japan

[73] Assignee: Ryobi Limited, Tokyo, Japan

[21] Appl. No.: 08/792,143

[22] Filed: Jan. 31, 1997

[30] Foreign Application Priority Data

| Jan. 31, 1996 | [JP] | Japan | P08-015914 |
| May 22, 1996 | [JP] | Japan | P08-126881 |
| May 22, 1996 | [JP] | Japan | P08-126882 |
| Jan. 16, 1997 | [JP] | Japan | P09-005810 |

[51] Int. Cl.$^7$ ................................................. A01K 89/01
[52] U.S. Cl. ............................................................ 242/242
[58] Field of Search .................................... 242/241, 242

[56] References Cited

U.S. PATENT DOCUMENTS

| 3,367,597 | 2/1968 | Morritt | 242/242 |
| 3,368,598 | 2/1968 | Nakano | 242/242 |
| 3,436,033 | 4/1969 | Murvall | 242/242 |
| 4,026,493 | 5/1977 | Anderson | 242/242 |
| 4,927,094 | 5/1990 | Henriksson | 242/242 |
| 5,012,990 | 5/1991 | Kawabe | 242/242 |
| 5,350,131 | 9/1994 | Baumgartner et al. | 242/242 |
| 5,513,814 | 5/1996 | Zanon | 242/241 |

FOREIGN PATENT DOCUMENTS 260295  12/1990  Japan .

Primary Examiner—Katherine Matecki
Attorney, Agent, or Firm—Brooks & Kushman P.C.

[57] ABSTRACT

A spinning reel for fishing comprises a reel body casing formed with a cam groove, a rotational frame mounted to the reel body casing to be rotatable about a rotational axis thereof, a spool shaft attached to the reel body casing so as to be movable in an axial direction parallel to the rotational direction of the rotational frame, a spool mounted to one end of the spool shaft, a handle lever coupled to the rotational frame to rotate the same, an oscillator mounted to the other end of the spool shaft, an oscillator gear supported by the reel body casing so as to be rotatable about a rotational shaft surrounded by the cam groove in accordance with an operation of the handle lever, and an interlock means provided with a first engaging member engaged with the cam groove and a second engaging member adapted to transfer a motion toward the oscillator. The interlock means is coupled to the oscillator gear and driven in association with the rotation of the oscillator gear such that the second engaging member is moved around the rotational shaft while carrying out a relative motion in a circumferential direction with respect to the oscillator gear.

5 Claims, 47 Drawing Sheets

SPINNING FISHING REEL HAVING A UNIFORM LONGITUDINAL SPOOL MOVEMENT

BACKGROUND OF THE INVENTION

The present invention relates to a spinning reel such as fishing reel provided with an improved slide structure.

There is known a fishing reel provided with a slid structure such as disclosed in Japanese Patent Publication No. HEI 2-60295. FIG. 66 is schematic view showing a slide structure of a fishing reel of this known publication.

Referring to FIG. 66, the slide structure comprises a handle shaft (not shown in the Figure) which extends in a bilateral direction of a reel body, an oscillator gear 301 supported by a shaft extending in parallel to the handle shaft and operated in association with the rotation of the handle shaft, a vertical groove 303a formed to an oscillator 303 contacting the oscillator gear 301 fixed to a spool shaft 302 extending in a longitudinal direction of the reel body, a slot 301 a formed to the oscillator gear 301 in a direction along a diameter direction thereof, a cam groove 304 having an elliptical shape having a long axis extending in the longitudinal direction of the reel body and surrounding the oscillator gear shaft, and a pin 305 penetrating the slot 30a and having one end inserted into the cam groove 304 and the other end inserted into the vertical groove 303a.

When the handle shaft is rotated, the oscillator gear 301 is also rotated, and the pin 305 performs an elliptical rotating motion while following up the elliptical cam groove 304 into which the one end of the pin is inserted and being guided and moved by the slot 301a formed to the oscillator gear 301 in the diameter direction thereof. Since the other end of the pin is inserted into the vertical groove 303a, the oscillator 303 follows up the elliptical rotating motion of the pin 305 to thereby perform a reciprocal motion in the longitudinal direction thereof. Accordingly, the spool shaft 302 and a spool (not shown) mounted to the front end of the spool shaft 302 are also moved reciprocally at the front portion of the reel body in the longitudinal direction.

In the fishing reel having the slide structure mentioned above, however, since the pin is inserted only into the slot of the oscillator gear and the cam groove, the pin is easily inclined and the transfer system from the oscillator gear and the oscillator is not moved smoothly, and hence, a backlash is caused in the longitudinal direction of the spool, which may damage the smooth winding up of the fishing line. Moreover, when an impact load is applied to the spool by, for example, a falling down of the reel, a large force is applied to the pin, so that the pin will be easily twisted or broken. Furthermore, since it is necessary to accord the orientation of the cam groove with the extending direction of the spool shaft, the shape of the reel body and the arrangements of parts will be limited. Still furthermore, since the pin must be located inside the root circle of the oscillator gear, the stroke of the oscillator or the spool cannot be made large more than the diameter of the oscillator gear.

Still furthermore, when the pin is guided along the slot formed in the diameter direction of the oscillator gear rotating at a constant speed while being limited by the cam groove having upper and lower flat portions and elliptical shape in the longitudinal direction of the reel body, the pin takes place a speedy elliptical motion because of the coincidence with the sliding direction of the oscillator at the upper and lower positions of the oscillator gear and takes place a slow elliptical motion because of the crossing to the sliding direction of the oscillator at longitudinal portions of the oscillator gear. Accordingly, even if the pin is rapidly rotated reversely at the front and rear end portions of the oscillator gear, the sliding direction of the oscillator cannot be changed rapidly, direction of the oscillator gear, the sliding direction of the oscillator cannot be changed rapidly, providing a problem.

Furthermore, as shown in FIG. 66, the sliding motion of the oscillator per one rotation of the oscillator gear in the four quadrants sectioned by two axes 11 and 12 is represented by FIG. 4, in which in the quadrant I, as shown with broken line, the spool shaft is in a direction change area from the forward movement to the rearward movement and the spool shaft moving speed is in a low speed sliding area, in the quadrant II, the spool shaft is in a moving area in which the spool shaft moves rearward and the spool shaft speed is in a high speed sliding area in comparison with the case in the quadrant I, in the quadrant III, the spool shaft is in a direction change area from the rearward movement to the forward movement and the spool shaft moving speed is a low speed sliding area, and in the quadrant IV, the spool shaft is in a forward moving area and the spool shaft speed is in a high speed area as in the quadrant III. For the reason described above, in the quadrants II and IV being the high speed sliding areas with respect to the I and III quadrants being the low speed sliding areas, the spool shaft moves fast, thus also providing a problem. Accordingly, the fishing line cannot be uniformly wound up because of such sliding speed difference, resulting in slacking of the fishing reel.

SUMMARY OF THE INVENTION

An object of the present invention is to substantially eliminate defects or drawbacks encountered in the prior art described above and to provide a spinning reel particularly for a fishing reel provided with an improved slide structure capable of smoothly and uniformly winding up a fish line around a spool of the spinning reel.

This and other objects can be achieved according to the present invention by providing, in a general aspect, a spinning reel for fishing which comprises:

a reel body casing formed with a cam groove;

a rotational frame mounted to the reel body casing to be rotatable about a rotational axis thereof;

a spool shaft attached to the reel body casing so as to be movable in an axial direction parallel to the rotational axis of the rotational frame;

a spool mounted to one end of the spool shaft;

a handle lever coupled to the rotational frame to rotate the same;

an oscillator mounted to the other end of the spool shaft;

an oscillator gear supported by the reel body casing so as to be rotatable about an axis of a rotational shaft surrounded with the cam groove in accordance with an operation of the handle lever; and an interlock means provided with a first engaging member engaged with the cam groove and a second engaging member adapted to transfer a motion toward the oscillator, wherein the interlock means is coupled to the oscillator gear and driven in association with the rotation of the oscillator gear such that the second engaging member is moved around the rotational shaft while carrying out a relative motion in a circumferential direction with respect to the oscillator gear.

In another preferred aspect of the present invention, there is provided a spinning reel for fishing which comprises:

a reel body casing formed with a cam groove;

a rotational frame mounted to the reel body casing to be rotatable about a rotational axis thereof;

a spool shaft attached to the reel body casing so as to be movable in an axial direction parallel to the rotational axis of the rotational frame;

a spool mounted to one end of the spool shaft;

a handle lever coupled to the rotational frame to rotate the same;

an oscillator mounted to the other end of the spool shaft;

an oscillator gear supported by the reel body casing so as to be rotatable about an axis of a rotational shaft surrounded with the cam groove in accordance with an operation of the handle lever; and an interlock means provided with a first engaging member engaged with the cam groove and a second engaging member adapted to transfer a motion toward the oscillator, wherein the interlock means is coupled to the oscillator gear through a pivot pin and driven in association with the rotation of the oscillator gear so as to be rotationally moved on a surface of the oscillator gear with the pivot being a center of the rotational movement, and wherein the cam groove is formed so as to describe substantially an elliptical shape having a long axis obliquely crossing the axial direction of the spool shaft.

In this aspect, the interlock means comprises a rotational plate, the first and second engaging members are formed as first and second guide pins to the rotational plate, and the rotational plate has one end swingable supported by the oscillator gear and the other end at which the guide pins are formed. The first guide pin is engaged with the cam groove and the second guide pin is engaged with a slot formed to the oscillator. The second guide pin is coupled to the oscillator through a link. The link is swingable supported by one of the second guide pin, the oscillator and the reel body casing, and the other two thereof are connected to the link through slots formed to the link. The second guide pin is displaced with respect to the first guide pin in a radial direction of the oscillator gear, or is displaced by a predetermined angle with respect to the first guide pin in a circumferential direction of the oscillator gear.

The rotational plate is disposed between the reel body casing and the oscillator gear.

The reel body casing is formed with a projection which is engaged with a slot formed to the rotational plate, the oscillator gear is formed with a projection, and the two projections and the second guide pin are aligned on the same line.

In a further preferred aspect of the present invention, there is provided a spinning reel for fishing, which comprises:

a reel body casing formed with a cam groove;

a rotational frame mounted to the reel body casing to be rotatable about a rotational axis thereof;

a spool shaft attached to the reel body casing so as to be movable in an axial direction parallel to the rotational axis of the rotational frame;

a spool mounted to one end of the spool shaft;

a handle lever coupled to the rotational frame to rotate the same;

an oscillator mounted to the other end of the spool shaft;

an oscillator gear formed with a guide slot and supported by the reel body casing so as to be rotatable about an axis of a rotational shaft surrounded with the cam groove in accordance with an operation of the handle lever; and an interlock means provided with a first engaging member engaged with the cam groove and a second engaging member adapted to transfer a motion toward the oscillator, the interlock means being engaged with the guide slot of the oscillator gear to be slidable, and being driven in association with the rotation of the oscillator gear, wherein the guide slot has an inclined portion extending in a direction crossing obliquely a radial direction of the oscillator gear, and wherein the cam groove is formed so as to describe substantially an elliptical shape having a long axis obliquely crossing the axial direction of the spool shaft.

In this aspect, the interlock means comprises a guide pin, and the guide pin has one and the other end portions formed as the first and second engaging members so as to be engaged with the cam groove formed to the reel body casing and a slot formed to the oscillator, respectively. The guide slot formed to the oscillator gear has three sections in a longitudinal direction thereof, one of the three sections extending along a radial direction of the oscillator gear or extending in a direction obliquely crossing the radial direction of the oscillator gear and different from directions in which the other two of the three sections extend. The other end portion of the guide pin as the second engaging member is coupled to the oscillator through a link. The link is swingable supported by one of the other end portion of the guide pin, the oscillator and the reel body casing, and the other two thereof are connected to the link through slots formed to the link.

A slide pin is formed to the oscillator, and the slide pin and the other end portion of the guide pin are coupled to each other through the link. The reel body casing is formed with a groove to which the slide pin is fitted.

The interlock means has a rotational plate slidable in an extending direction of the guide slot formed to the oscillator gear with respect thereto in accordance with the rotation of the oscillator gear, and the guide pin is fitted to the rotational plate. The other end portion of the guide pin is displaced with respect to the one end portion of the guide pin in a radial direction of the oscillator gear. The guide pin is slidable while being prevented from rotating with respect to the guide slot formed to the oscillator gear. The other end portion of the guide pin is displaced by a predetermined angle with respect to the one end portion of the guide pin in a circumferential direction of the oscillator gear.

In a still further preferred aspect of the present invention, there is provided a spinning reel for fishing, which comprises:

a reel body casing formed with a cam groove having substantially an elliptical shape;

a rotational frame mounted to the reel body casing to be rotatable about a rotational axis thereof;

a spool shaft attached to the reel body casing so as to be movable in an axial direction parallel to the rotational axis of the rotational frame;

a spool mounted to one end of the spool shaft;

a handle lever coupled to the rotational frame to rotate the same;

an oscillator mounted to the other one end of the spool shaft;

an oscillator gear supported by the reel body casing so as to be rotatable about an axis of a rotational shaft surrounded with the cam groove in accordance with an operation of the handle lever;

an interlock means provided with first engaging member and a second engaging member, the first engaging member being engaged with both the cam groove and a guide slot formed to the oscillator gear, and the second engaging member being adapted to transfer a motion toward the oscillator, wherein the interlock means is coupled to the oscillator gear so as to be rotatable in positive or reverse direction relatively to the oscillator gear while being guided by the guide slot, and wherein the second engaging member is displaced with respect to the first engaging member in a circumferential direction of the oscillator gear.

In this aspect, the first engaging member is a cam pin. The interlock means comprises a rotational plate disposed on the oscillator gear in a state that the rotational plate is relatively rotatable in positive or reverse direction with respect to the oscillator gear in accordance with the sliding motitheof the cam pin in the guide slot in association with the rotation of the oscillator gear, and an oscillator drive pin disposed to the rotational plate as the second engaging member and adapted to drive the oscillator in the axial direction of the spool shaft in association with the motion of the rotational plate, the oscillator drive pin being displaced in position in a circumferential direction with respect to the cam pin formed to the rotational plate.

The guide slot is formed along a radial direction of the oscillator gear, a pivotal slot for pivotal motion is formed to either one of the rotational plate and the oscillator gear in a manner crossing obliquely with respect to the radial direction of the oscillator gear, an engaging projection is formed to the other one of the rotational plate and the oscillator gear, and the rotational plate is disposed to be positively or reversely rotatable with respect to the oscillator gear through a slide engagement of the engaging projection with the pivotal slot. The guide slot is formed so as to cross obliquely with respect to a radial direction of the oscillator gear, a pivotal slot for pivotal motion is formed to either one of the rotational plate and the oscillator gear in a manner extending along the radial direction of the oscillator gear, an engaging projection is formed to the other one of the rotational plate and the oscillator gear, and the rotational plate is disposed to be positively or reversely rotatable with respect to the oscillator gear through a slide engagement of the engaging projection with the pivotal slot.

The guide slot is formed so as to cross obliquely with respect to a radial direction of the oscillator gear, a pivotal slot for pivotal motion is formed to either one of the rotational plate and the oscillator gear in a manner crossing obliquely with respect to the radial direction of the oscillator gear and extending in a direction different from an longitudinal direction of the guide slot, an engaging projection is formed to the other one of the rotational plate and the oscillator gear, and the rotational plate is disposed to be positively or reversely rotatable with respect to the oscillator gear through a slide engagement of the engaging projection with the pivotal slot.

The rotational plate is formed with a pivotal slot for pivotal motion which extends in a direction different from an longitudinal direction of the guide slot in a state of an engagement between the cam pin and the guide slot, and the rotational plate is disposed to be positively or reversely rotatable with respect to the oscillator gear through a slide engagement of the rotational shaft of the oscillator gear with the pivotal slot.

The rotational plate is formed with an engaging projection which penetrates an escape hole formed to the oscillator gear and which is slideably engaged with the cam groove to thereby rotate the rotational plate positively or reversely with respect to the oscillator gear.

The oscillator drive pin and the oscillator are coupled to each other through a link. A link is swingable supported by one of the oscillator drive pin, the oscillator and the reel body casing, and the other two thereof are coupled to the link to be slidable. The other two of the oscillator drive pin, the oscillator and the reel body casing are coupled to the link to be slidable through slots formed to the link. The rotational plate is disposed between the reel body casing and the oscillator gear or between the oscillator and the oscillator gear.

A collar is mounted to an engaging portion at which one of the reel body casing, the oscillator gear and the oscillator is slideably engaged with the rotational plate. The cam pin has a front end portion engaged with the cam groove, the collar being mounted on the front end portion. The collar is formed of a material softer than that forming the reel body casing.

According to one preferred aspect of the present invention described above, since the moving amount of the elliptical motion of one end of the guide pin can be adjusted per the rotation angle of the oscillator gear at the time when the elliptical motion is converted into the sliding motion of the other end of the guide pin, the uniform speed sliding motion can be achieved to thereby wind up the fish line around the spool, eliminating troubles caused at the time of the fish line wind-up time. Furthermore, since the swing axis position and the swing amount of the rotational plate are adjusted, the moving amount of the guide pin, i.e. the reciprocal motion amount of the spool, per the rotation angle of the oscillator gear can be effectively adjusted. Since the swing axis position and the swing amount of the guide pin can be also adjusted, the long and short axes of the elliptical cam groove can be adjusted and the resistance at the time of the driving power transfer can be reduced. Therefore, the wearing or damage of the cam groove and the guide pin can be effectively prevented, performing a smooth and improved sliding motion of the spool can be realized. Still furthermore, since the crossing direction of the cam groove with respect to the sliding direction of the spool can be adjusted by adjusting the swing axis position of the guide pin, the oscillator gear can be disposed near the handle shaft, improving the freedom for design of the shape or arrangement of members.

According to the embodiment in which the link is disposed, since the members are coupled to the link through the slots formed to the link, the positional relationship between these members and the link can be optionally adjusted, so that the sliding motion amount of the guide pin can be increased or decreased in an improved manner.

Furthermore, since the guide pin is arranged in a manner shifted to the radial direction or circumferential direction of the oscillator gear, the improved moving amount of the spool can be obtained with the compact arrangement of the components of the reel with reduced power transfer resistance and reduced wearing.

According to the further preferred aspect of the present invention described above, since the pin guide slot is formed so as to obliquely cross the radial direction of the oscillator gear and the elliptical cam groove is formed so that the long axis thereof obliquely crosses the sliding direction of the spool shaft, the sliding amount of the spool shaft with respect to the rotation angle of the oscillator gear can be adjusted at the time when the circular motion of the oscillator is converted to the sliding motion of the spool shaft, and accordingly, the spool shaft performs substantially the uniform speed sliding motion to thereby uniformly wind up the fish line around the spool.

The moving amount of the other end portion of the pin i.e. the sliding amount of the spool shaft, can be adjusted by optionally changing the crossing angle or crossing direction of the pin guide slot with respect to the radial direction of the oscillator gear.

In addition, also by optionally changing the crossing angle or crossing direction of the pin guide slot with respect to the radial direction of the oscillator gear, the crossing angle of the cam groove with respect to the spool shaft is adjusted to thereby make it possible to arrange the oscillator gear at a portion near the handle shaft, thus making compact the structure of the reel itself.

The link member may be arranged as in the former aspect, and according to the arrangement of the link member, the sliding motion of the oscillator, i.e. the spool shaft, with respect to the elliptical motion of the pin in the cam groove can be adjusted, and by changing the shape or inclination of the slots formed to the link member, the sliding speed of the spool shaft can be partially adjusted.

Furthermore, the other end portion of the pin engaged with the link member or the oscillator is displaced in the radial direction of the oscillator gear with respect to the one end of the pin, and accordingly, the sliding amount of the spool shaft can be easily changed or adjusted by changing the rotational plate having different displacement of the pin.

According to the still further preferred aspect of the present invention, since the rotational plate is disposed in association with the oscillator gear in a manner that the rotational plate can be relatively rotatable in positive or reverse rotation direction with respect to the oscillator gear, many advantageous functions and effects can be achieved.

That is, since the rotational plate is rotated in the positive or reverse direction relatively with respect to the oscillator gear in accordance with the swing motion of the cam pin about the rotational shaft of the oscillator gear along the cam groove together with the sliding motion of the cam pin in the pin guide slot, the moving amount of the oscillator drive pin with respect to the rotational angle of the oscillator gear can be remarkably increased or decreased, improving the possibility of free design of the sliding mechanism of the spinning reel such as fishing reel.

Furthermore, when the elliptical motion movement of the cam pin is converted to the longitudinal motion of the oscillator drive pin, the moving amount of the oscillator drive pin with respect to the rotational angle of the oscillator gear is adjusted in accordance with the rotating amount, in the positive or reverse direction, of the rotational plate with respect to the oscillator gear, whereby the cam groove can be formed so as to have an elliptical shape nearly a circular shape or having a short diameter considerably smaller than a long diameter to thereby prevent the cam pin and the cam groove from wearing or damaging and hence to achieve the smooth sliding motion of the spool with small load.

In addition, since the long axis direction of the cam groove with respect to the spool to the spool sliding direction can be adjusted by changing the shifted position of the oscillator drive pin with respect to the cam pin formed to the rotational plate, the oscillator gear can be positioned near with respect to the handle shaft, and accordingly, the shape of the reel body casing itself and the parts thereof can be compactly arranged, increasing the possibility of the design choice.

Furthermore, when the oscillator gear is rotated, the rotational plate is guides in the radial direction of the oscillator gear through the engagement of the cam pin with the pin guide slot, also guided in a direction obliquely crossing the radial direction thereof through the engagement of the engaging projection with the pivotal slot for the pivotal motion, and is hence rotated in the positive or reverse direction relatively with respect to the oscillator gear. For this arrangement, the moving amount of the oscillator drive pin with respect to the rotational angle of the oscillator gear can be remarkably increased or decreased. The moving amount of the oscillator drive pin and the rotating direction change of the rotational plate with respect to the rotation of the oscillator gear can be optionally adjusted by the inclination angle or direction of the pin guide slot with respect to the radial direction of the oscillator gear.

Still furthermore, in the modified embodiment, when the oscillator gear is rotated, the rotational plate is guided in a direction obliquely crossing the radial direction of the oscillator gear through the engagement of the cam pin with the pin guide slot, guided in a direction obliquely crossing the radial direction thereof through the engagement of the engaging projection with the pivotal slot for the pivotal motion, also guided in the direction different from the extending direction of the pin guide slot, and is rotated in the positive or reverse direction relatively with respect to the oscillator gear. For this arrangement, the moving amount of the oscillator drive pin with respect to the rotational angle of the oscillator gear can be remarkably increased or decreased. The moving amount of the oscillator drive pin and the rotating direction change of the rotational plate with respect to the rotation of the oscillator gear can be optionally adjusted by adjusting the inclination angle or direction of the pin guide slot and the pivotal slot with respect to the radial direction of the oscillator gear.

Still furthermore, in the modified embodiment, when the oscillator gear is rotated, the rotational plate is guided in a specified direction through the engagement of the cam pin with the pin guide slot, also guided in the direction different from the extending direction of the pin guide slot by the arrangement of the rotational shaft of the oscillator gear and the pivotal slot, and is rotated in the positive or reverse direction relatively with respect to the oscillator gear. For this arrangement, the moving amount of the oscillator drive pin with respect to the rotational angle of the oscillator gear can be remarkably increased or decreased. The moving amount of the oscillator drive pin and the rotating direction change of the rotational plate with respect to the rotation of the oscillator gear can be optionally adjusted by adjusting the inclination angle or direction of the pin guide slot and the pivotal slot with respect to the radial direction of the oscillator gear. According to this arrangement, the rotational shaft of the oscillator gear and the pivotal slot of the rotational plate are engaged in the slidable manner, so that the engaging projection can be eliminated, making compact the structure and eliminating assembling working process.

Still furthermore, according to the embodiments provided with the link, substantially the same effect or functions as those attained in the former aspects can be also attained.

Still furthermore, in the embodiment provided with the collar, the friction resistance can be reduced, thus absorbing backlash or impact at the engaging portion.

According to the present invention, many other functions and advantageous effects will be achieved, which will be made clear from the disclosure of the present specification hereunder made with reference to the accompanying drawings.

DESCRIPTION OF THE PREFERRED EMBODIMENTS

The preferred embodiments of the present invention will be described hereunder with reference to the accompanying drawings.

First Embodiment

Figure 1:
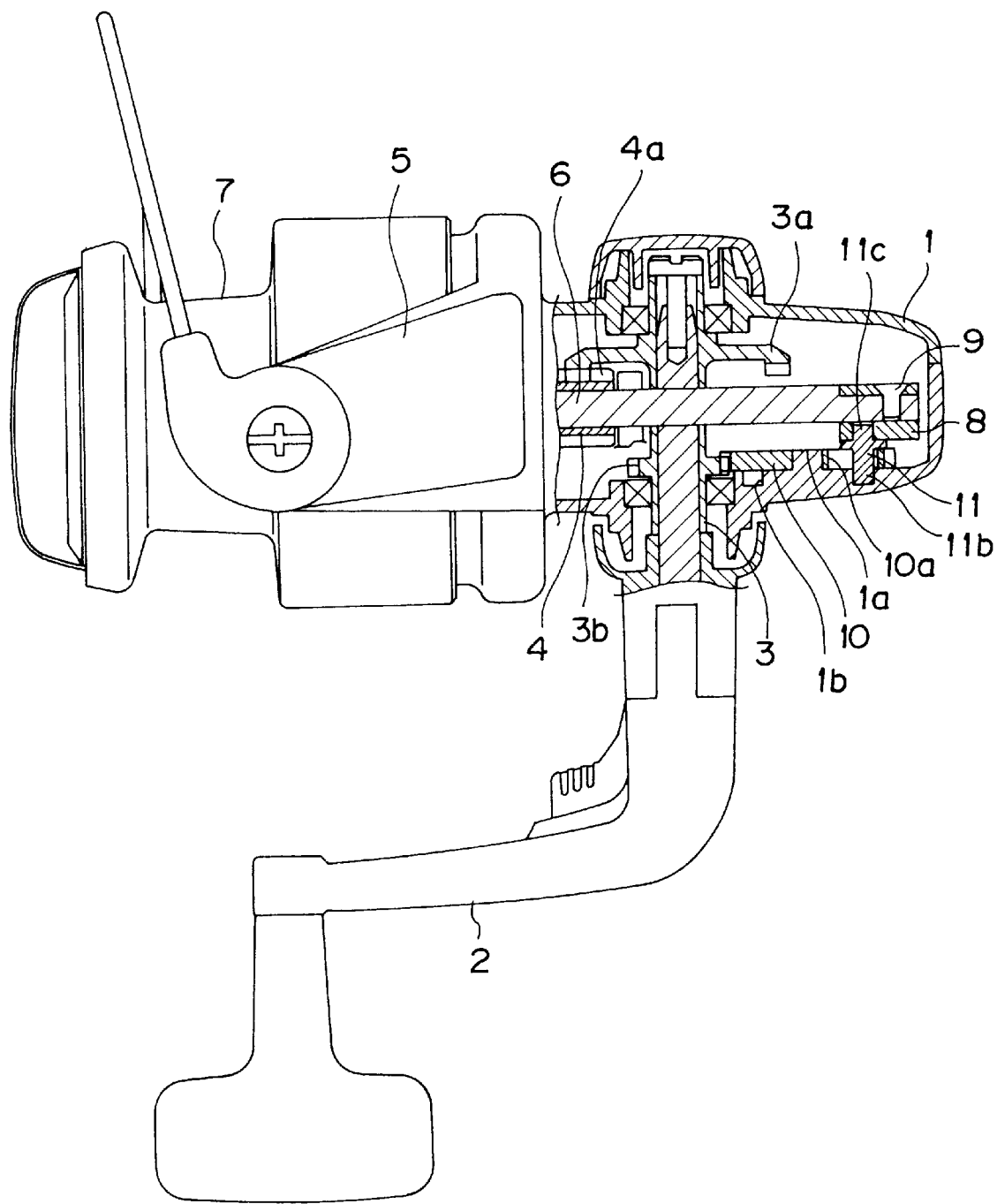
FIG. 1 is a side view, partially in section, of a fishing reel according to a first embodiment of the present invention.

FIG. 1 is a side view, partially in section, of a spinning reel as a fishing reel according to a first embodiment of the present invention. Referring to FIG. 1, a reference numeral 1 denotes a reel body of a spinning reel, to which a hollow handle shaft 3 rotated by a handle lever 2 is supported to be rotatable in a bilateral direction of the reel. A main gear 3a is formed integrally to the handle shaft 3 and the main gear 3a is meshed with a pinion 4a formed to a cylindrical shaft 4 supported to be rotatable by the reel body 1. A rotational member 5 is formed to the cylindrical shaft 4 to be rotatable together in accordance with the rotation of the cylindrical shaft 4. A spool shaft 6 is inserted into the cylindrical shaft 4 to be slidable in the axial direction thereof, and the spool shaft 6 has a front end to which a spool 7 is fixed. The spool shaft 6 also has a base end to which an oscillator 8 is fastened by a screw 9.

Figure 2:
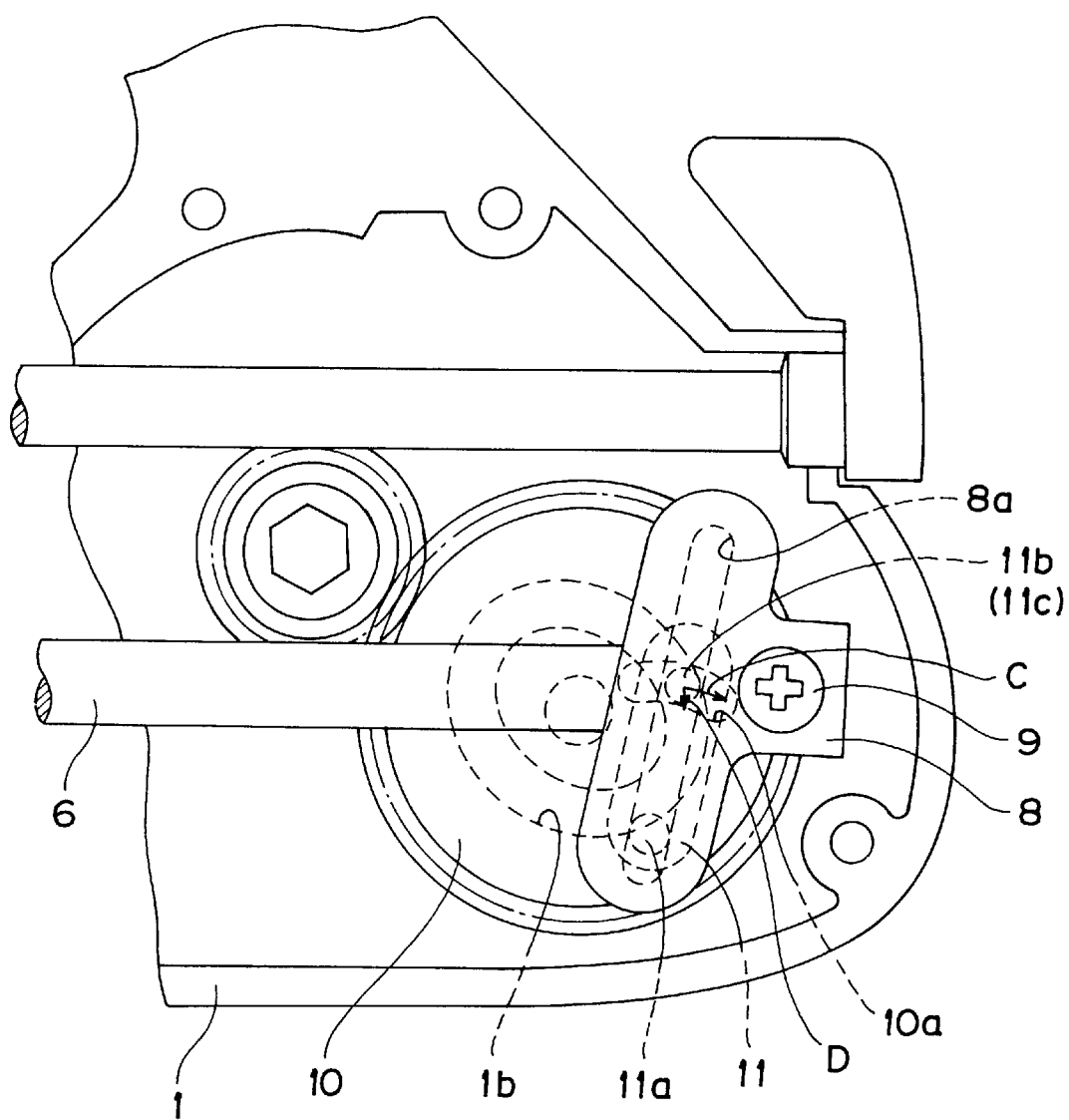
FIG. 2 is a sectional view, in an enlarged scale, of an essential portion of the fishing reel of FIG. 1.
Figure 3:
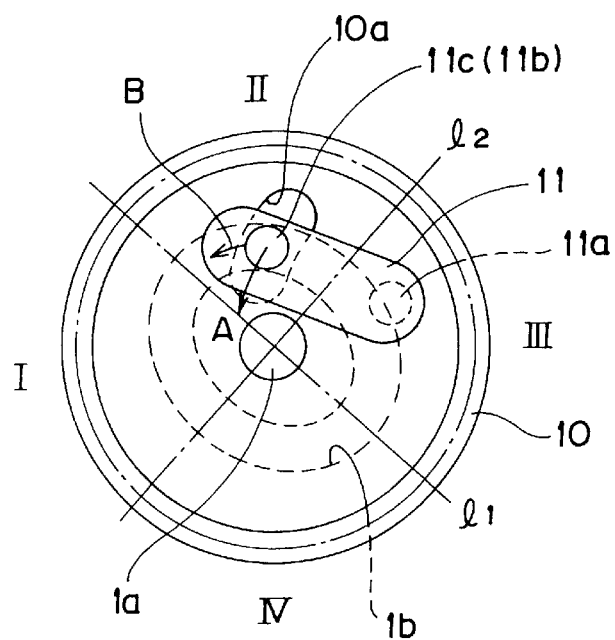
FIG. 3 is a view showing a positional relationship between an oscillator gear and a rotational plate of the first embodiment of FIG. 1.

Further, a reduction gear 3b is integrally mounted to the handle shaft 3 and the reduction gear 3b is meshed with an oscillator gear 10 mounted to a projection, as a rotational shaft, 1a of the reel body 1 to be rotatable. A rotational plate 11 is arranged between one side surface of the oscillator gear 10 and the oscillator 8. A swing pin 11a is formed to one end side of the rotational plate 11 so as to project outward as shown in FIGS. 2 and 3 so that the rotational plate 11 is disposed to be swingable with respect to the oscillator gear 10 through the engagement of the swing pin 11a with the side surface of the oscillator gear 10. Guide pins 11b and 11c are formed to both side surfaces of the other end side of the rotational plate 11 so as to project outward. The guide pin 11b to penetrates a slot 10a formed to the oscillator gear 10, the slot 10a having a circular shape with the swing pin 11a being the center thereof, and the guide pin 11b is engaged with a cam groove 1b formed to the reel body 1, the cam groove 1b having substantially an elliptical shape crossing the axial direction of the spool shaft 6. As shown in FIG. 3, a main axis of the elliptical shape of the cam groove 1b inclines to the axial direction of the spool shaft 6. The guide pin 11c is engaged with a vertical groove 8a formed in the longitudinal direction of the oscillator 8 as viewed in FIG. 2.

The fishing reel having the structure mentioned above will operate in the following manner.

When the handle lever 2 is rotated, the handle shaft 3 is also rotated, and when the handle shaft 3 is rotated, the cylindrical shaft 4 is rotated through the main gear 3a and the pinion 4. Then, the rotational body 5 is rotated.

Incidentally, when the handle shaft 3 is rotated, the oscillator gear 10 is rotated through the reduction gear 3b. At this time, as shown in FIG. 3, the spool shaft 6 is positioned in the four quadrants I to IV sectioned by the two main axes 11 and 12 such that, in the quadrant I, the spool shaft 6 is in the direction change area form the forward movement to the rearward movement and the speed of the spool shaft 6 is in the low sliding speed area, in the quadrant II, the spool shaft 6 is in the rearward moving area and the speed of the spool shaft 6 is in the high speed sliding area in comparison with the case of the quadrant I, in the quadrant III, the spool shaft 6 is in the direction change area form the rearward movement to the forward movement and the speed of the spool shaft 6 is in the low sliding speed area, and in the quadrant IV, the spool shaft 6 is in the forward moving area and the speed of the spool shaft 6 is in the high speed sliding area as in the case of the quadrant II.

Further, it is desired that in the ideal state, the spool shaft 6 moves at the constant uniform speed in all the quadrants, and accordingly, there is adapted, in the quadrants I and III, a mechanism for accelerating the sliding speed per rotational angle of the oscillator gear 10 to thereby accelerate the reciprocal motion of the spool shaft 6, and there is also adapted, in the quadrants II and VI, a mechanism for reducing the sliding speed per rotational angle of the oscillator gear 10 to thereby reduce the reciprocal motion of the spool shaft 6. Such mechanism will be called as interlock mechanism in view of its function.

That is, in the arrangement in which the pin 11c engaged with the vertical groove 8a of the oscillator 8 resides in the quadrant II, the guide pin 11b is rotated in the counterclockwise direction indicated by an arrow A in FIG. 3 with respect to the swing pin 11a. This motion is, as viewed in the circumferential direction, a movement in the counterclockwise direction indicated by an arrow B, and the speed thereof is reduced by this amount, and accordingly, the moving amount of the oscillator 8 from the point a to the point b as shown with broken line in FIG. 4 can be reduced, thus the motion approaching a uniform speed motion line shown with solid line in FIG. 4.

Further, in the quadrant IV in which the spool shaft 6 is in the same high speed sliding area, the moving amount of the oscillator 8 from the point c to the point d can be also reduced to approach the uniform speed motion line.

Next, in arrangement in which the pin 11c engaged with the vertical groove 8a of the oscillator 8 resides in the quadrant III, the guide pin 11b is rotated in the clockwise direction indicated by an arrow C in FIG. 2 with respect to the swing pin 11a. This motion is, as viewed in the circumferential direction, a movement in the clockwise direction indicated by an arrow D, and the speed thereof is accelerated by this amount, and accordingly, the moving amount of the oscillator 8 from the point b to the point c as shown with broken line in FIG. 4 can be reduced, thus the motion approaching a uniform speed motion line shown with solid line in FIG. 4.

Further, in the quadrant I in which the spool shaft 6 is in the same low speed sliding area, the moving amount of the oscillator 8 from the point d to the point a can be also accelerated to approach the uniform speed motion line.

As mentioned above, the spool shaft 6 can be reciprocated with the speed nearly approaching the uniform speed motion line, and accordingly, the fishing line can be substantially uniformly and smoothly wound up around the spool 7.

Second Embodiment

Figure 5:
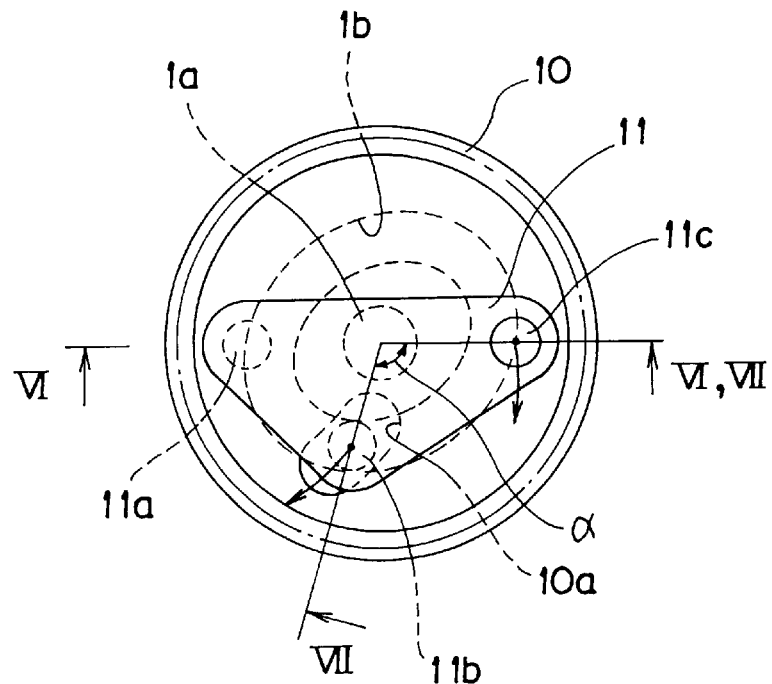
FIG. 5 is a view showing a positional relationship between an oscillator gear and a rotational plate of the second embodiment of the present invention.
Figure 6:
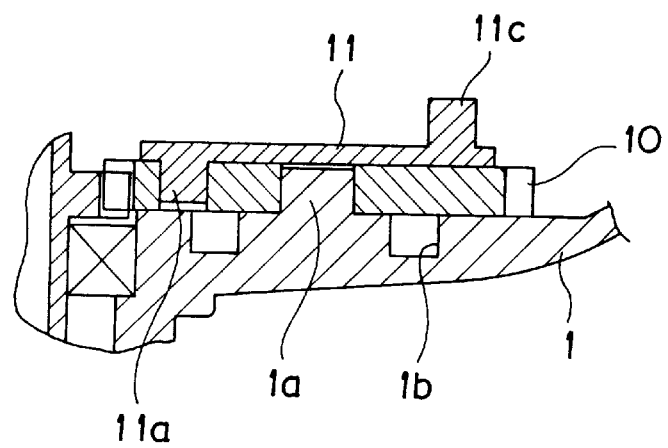
FIG. 6 is a sectional view taken along the line VI—VI in FIG. 5.
Figure 7:
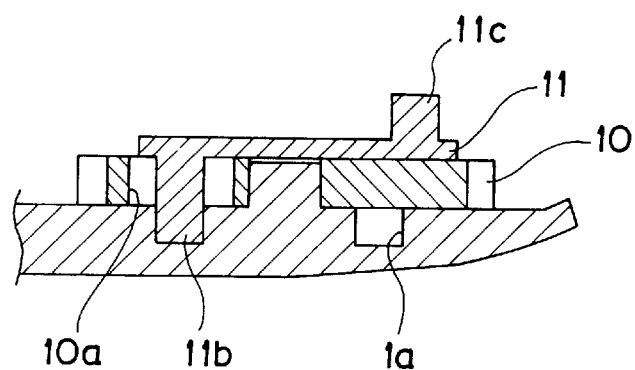
FIG. 7 is a sectional view taken along the line VII—VII in FIG. 5.
Figure 8:
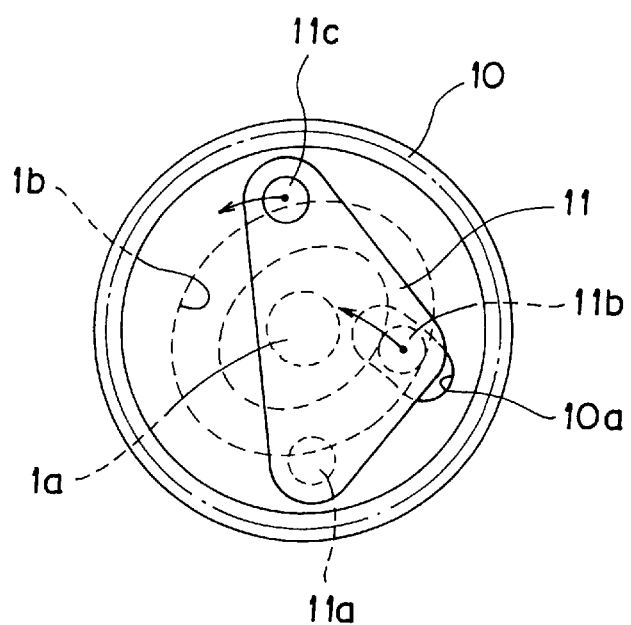
FIG. 8 is a view showing a relationship between the oscillator gear and the rotational plate at a time when a spool shaft takes its intermediate position.

FIGS. 5, 6, 7 and 8 represent a second embodiment of the fishing reel according to the present invention, in which FIG. 5 shows the relationship between the oscillator gear 10 and the rotational plate 11, in which the spool shaft 6 is positioned at the rear end position, FIG. 6 is a sectional view taken along the line VI—VI in FIG. 5, FIG. 7 is a sectional view taken along the line VII—VII in FIG. 5, and FIG. 8 is a view showing a relationship between the oscillator gear 10 and the rotational plate 11 at a time when the spool shaft 6 is positioned in its intermediate position. In these figures, like reference numerals are added to elements or members corresponding to those of the first embodiment.

Although, in the first embodiment, there is described the case in which the guide pin 11c engaged with the vertical groove 8a of the oscillator 8 formed to the rotational plate 11 and the guide pin 11b engaged with the cam groove 1b of the reel body 1 are formed to the positions coincident with each other, in this second embodiment, the guide pin 11c is displaced by a predetermined angle α in the circumferential direction of the oscillator gear 10 with respect to the guide pin 11b. According to this arrangement, the ratio of the long diameter of the elliptical cam groove 1b with respect to the short diameter thereof can be adjusted by adjusting the displacement amount of the pin in the circumferential direction of the oscillator gear 10 to thereby form the cam groove 1b so as to provide an elliptical shape near a circular shape or an elliptical shape having a short diameter further reduced, and driving power transfer resistance between the cam groove 1b and the guide pin 11b engaged therewith can be reduced. Therefore, wearing and damage therebetween can be also effectively prevented from causing and the smooth and light sliding motion of the spool can be realized.

In an alternation, the guide pin 11c may be displaced by a predetermined distance in the radial direction of the oscillator gear 10 with respect to the guide pin 11b. In this arrangement, the sliding amount of the spool 7 can be optionally adjusted by changing or adjusting the displacement amount of the guide pin 11b in the radial direction of the oscillator gear 10 with respect to the rotational axis thereof. This adjustment may be done by merely changing the rotational plate 11 in accordance with the width of the fishing line wind-up portion, leading to the possibility of free design. Furthermore, the spool sliding distance longer than the diameter of the oscillator gear 10 can be ensured by shifting the guide pin 11b by a distance longer than the long diameter of the elliptical cam groove 1b, thereby increasing the sliding amount of the spool 7 by utilizing the oscillator gear 10 having a smaller diameter and the cam groove 1b, thus making compact and light the reel body 1.

Third Embodiment

Although, in the foregoing embodiments, the oscillator gear 10, the rotational plate 11 and the cam groove 1b are arranged rear side (right side in FIG. 1) of the mounting position of the handle shaft 3 attached to the reel body 1, the present invention is not limited to such arrangement and the oscillator gear 10, the rotational plate 11 and the cam groove 1b may be arranged front side (left side in FIG. 1) of the mounting position of the handle shaft 3 and the vertical groove 8a of the oscillator 8 may be extended forward of the handle shaft 3 to be operatively coupled to the rotational plate 11.

Fourth Embodiment

Figure 9:
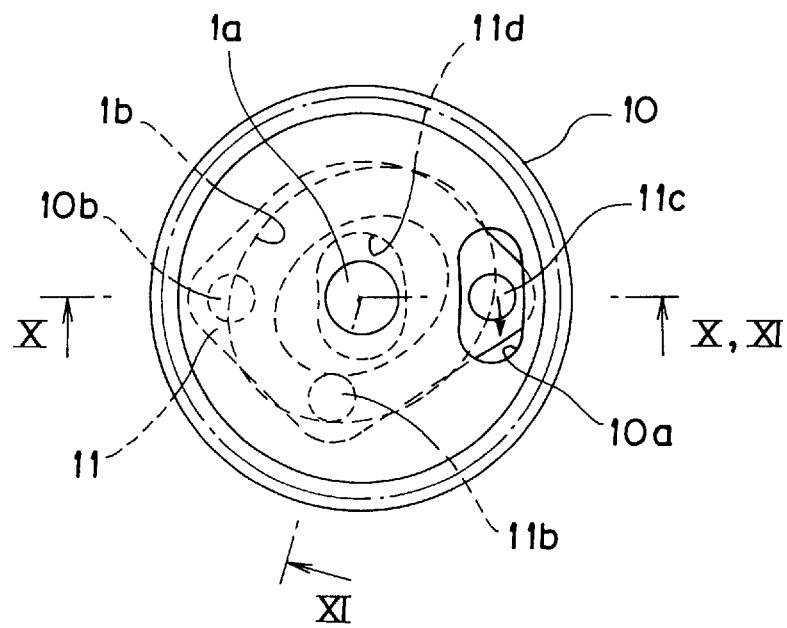
FIG. 9 is a view showing a positional relationship between an oscillator gear and a rotational plate of the fourth embodiment of the present invention.
Figure 10:
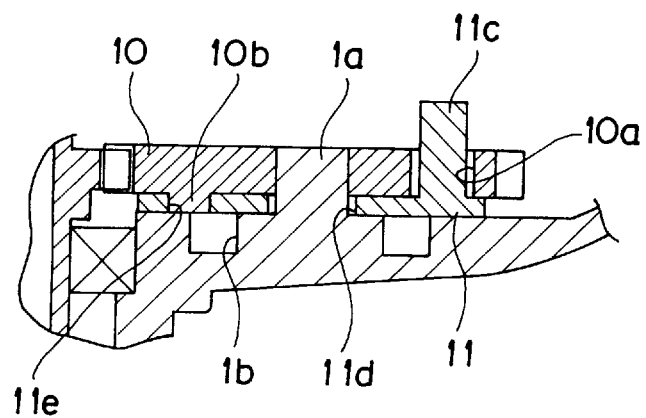
FIG. 10 is a sectional view taken along the line X—X in FIG. 9.
Figure 11:
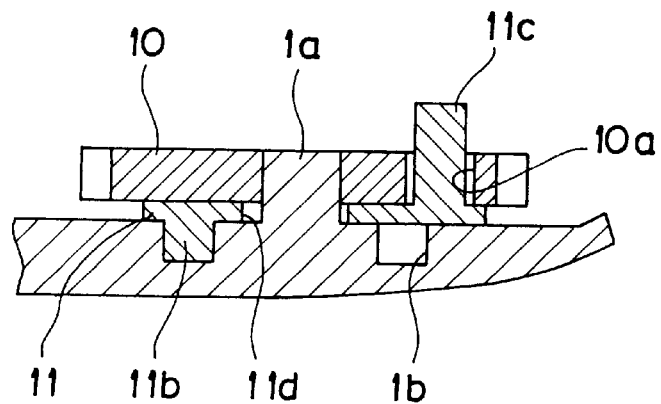
FIG. 11 is a sectional view taken along the line XI—XI in FIG. 9.
Figure 12:
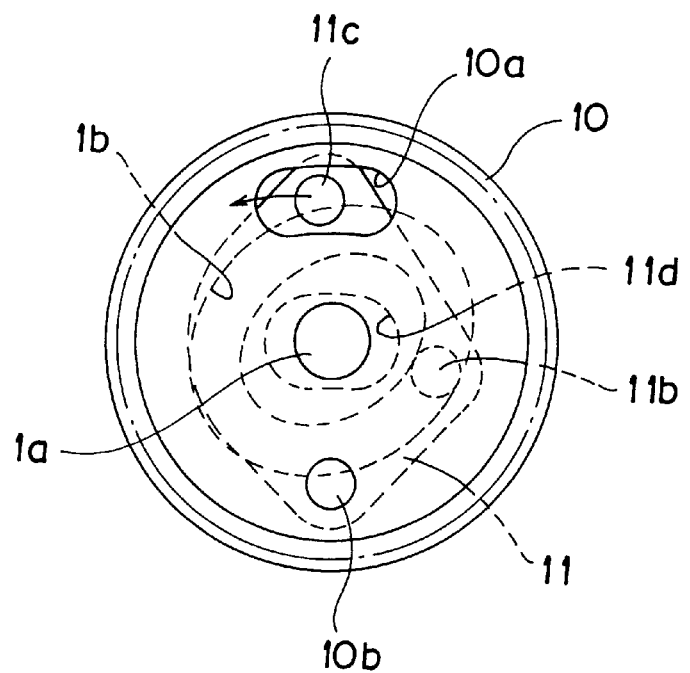
FIG. 12 is a view showing a relationship between the oscillator gear and the rotational plate at a time when a spool shaft takes its intermediate position.

FIGS. 9, 10, 11 and 12 represent a fourth embodiment of the fishing reel according to the present invention, in which FIG. 9 shows the relationship between the oscillator gear 10 and the rotational plate 11, in which the spool shaft 6 is positioned at the rear end position, FIG. 10 is a sectional view taken along the line X—X in FIG. 9, FIG. 11 is a sectional view taken along the line XI—XI in FIG. 9, and FIG. 12 is a view showing a relationship between the oscillator gear 10 and the rotational plate 11 at a time when the spool shaft 6 is positioned in its intermediate position. In these figures, like reference numerals are added to elements or members corresponding to those of the first embodiment.

In this fourth embodiment, the projection 1a is inserted into the slot 11d formed to the rotational plate 11, and the oscillator gear 10 is further inserted therein to in a rotatable manner from the upper portion, as viewed in FIG. 10, of the rotational plate 11. The guide pin 11b of the rotational plate 11 is engaged with the cam groove 1b. Furthermore, the projection 10b formed to the oscillator gear 10 is inserted into a hole 11e formed to the rotational plate 11 as the center position of the swing motion of the rotational plate 11. At this time, the guide pin 11c of the rotational plate 11 is inserted through the slot 10a formed to the oscillator gear 10 and the guide pin 11c is then engaged with the vertical groove of the oscillator. In this embodiment, as mentioned above, the rotational plate 11 is arranged between the reel body 1 and the oscillator gear 10 though, in the former embodiments, the rotational plate 11 is arranged above the oscillator gear 10. Furthermore, in this fourth embodiment, as shown in FIG. 9, the projection 10b functioning as the center position of the swing motion of the rotational plate 11, the projection 1a and the guide pin 11c are arranged on the same straight line. Because of such arrangement, the guide pin 11c is directly moved in the circumferential direction with the projection 1a being the center thereof (rotation center of the oscillator gear 10), and accordingly, an operation loss during the driving power transfer can be effectively eliminated.

Fifth Embodiment

Figure 13:
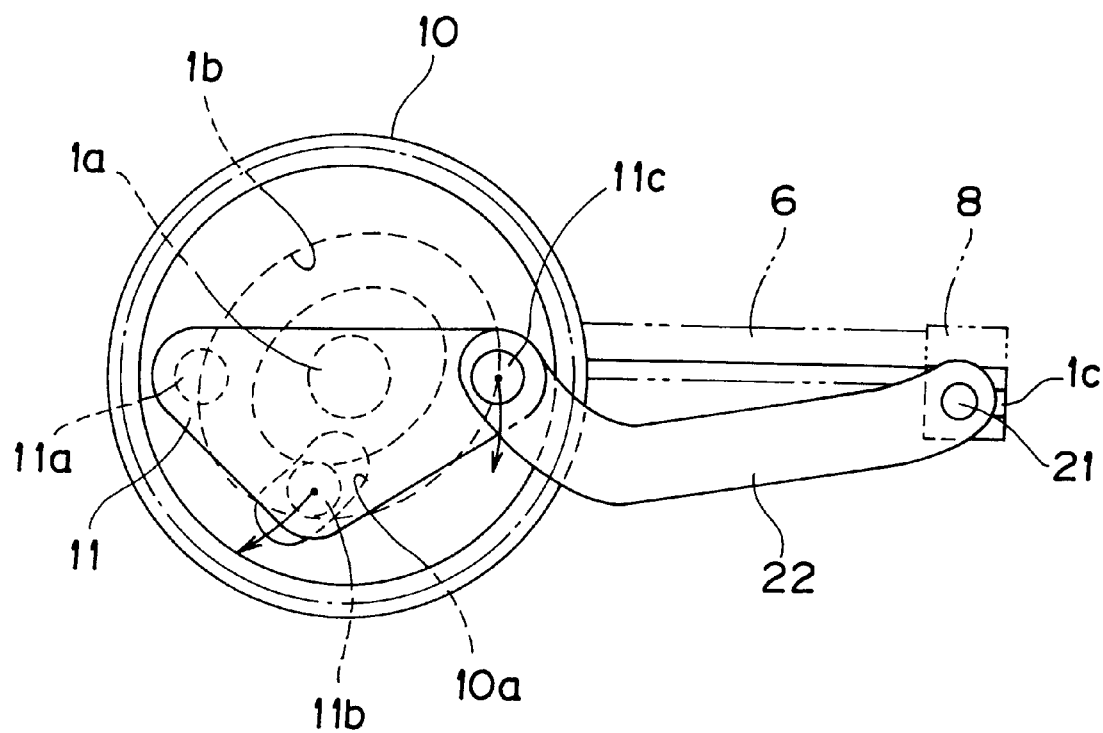
FIG. 13 is a sectional view, in an enlarged scale, of an essential portion of the fishing reel of a fifth embodiment of the present invention.

FIG. 13 represents a fifth embodiment of a fishing reel according to the present invention, in which like reference numerals are added to members or elements corresponding to the foregoing embodiments.

In this embodiment, the oscillator 8 is not formed with the vertical groove 8a as in the former embodiments and the oscillator 8 is connected to one end of a link 22 through a connection guide pin 21 and the other one end of the link 22 is connected to the guide pin 11c of the rotational plate 11 to be rotatable. The reel body 1 is provided with a guide portion 1c for guiding the movement of the connection guide pin 21 in a limited manner.

Sixth Embodiment

Figure 14:
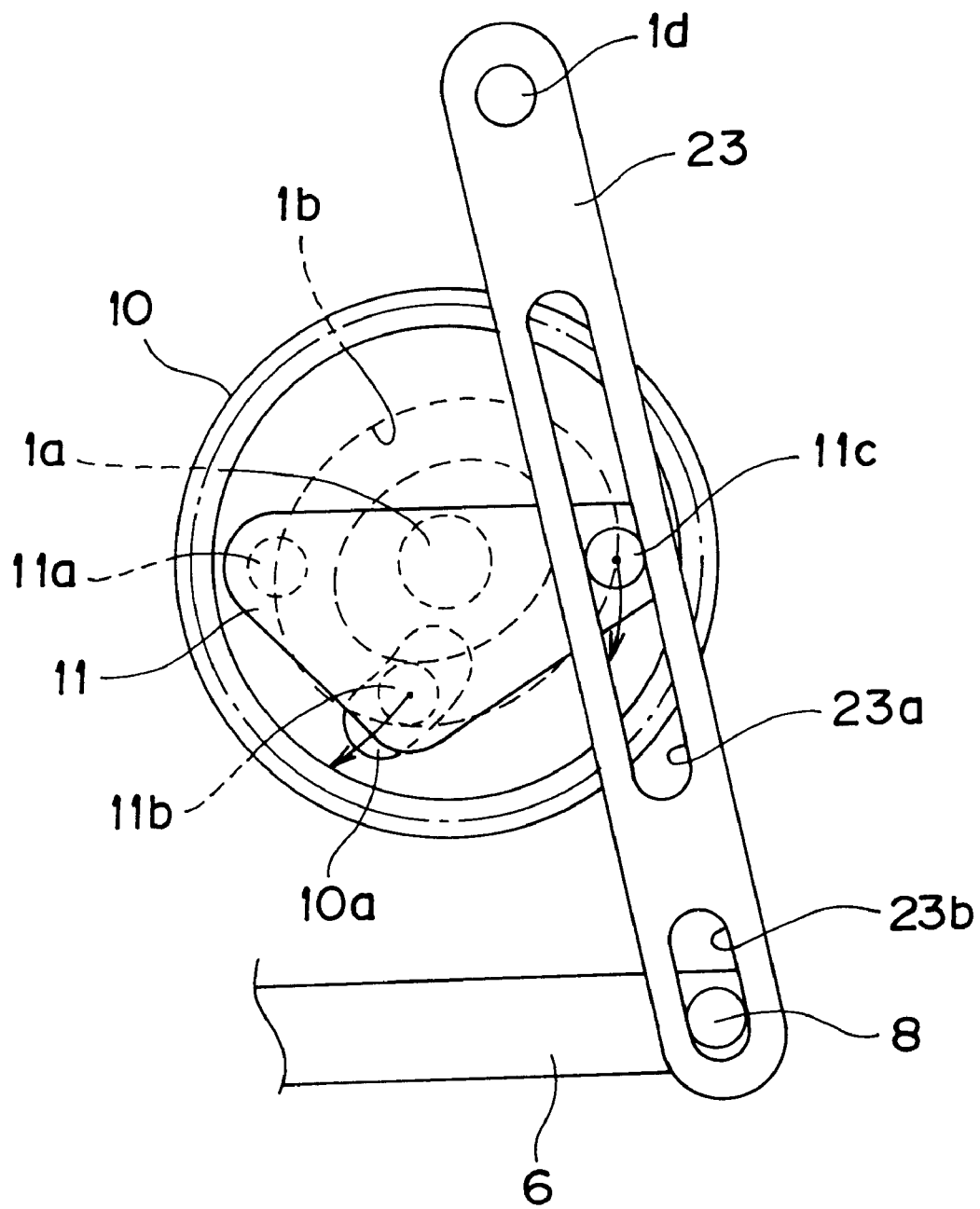
FIG. 14 is a sectional view, in an enlarged scale, of an essential portion of the fishing reel of a sixth embodiment of the present invention.

FIG. 14 represents a sixth embodiment of a fishing reel according to the present invention, in which like reference numerals are added to members or elements corresponding to the foregoing embodiments.

In this embodiment, the reel body 1 is formed with a boss member 1d to which one end of a link 23 is connected in a swingable fashion. The link 23 is formed with slots 23a and 23b, and the guide pin 11c formed to the rotational plate 11 is engaged with one slot 23a and the oscillator 8 is engaged with the other one slot 23b. According to such arrangement, the reciprocal motion amount of the oscillator 8 with respect to the circular motion of the guide pin 11c can be increased or decreased by optionally changing the connection position between the guide pin 11c and the oscillator 8 with respect to the pivot position of the link 23, and through this adjustment, the shifting amount of the spool 7 in accordance with the width of the fishing line wind-up portion can be adjusted. Furthermore, the sliding speed of the oscillator 8 can be partially adjusted by changing the inclination of the slots 23a and 23b or forming the slots 23a and 23b in bent shapes.

Seventh Embodiment

Figure 15:
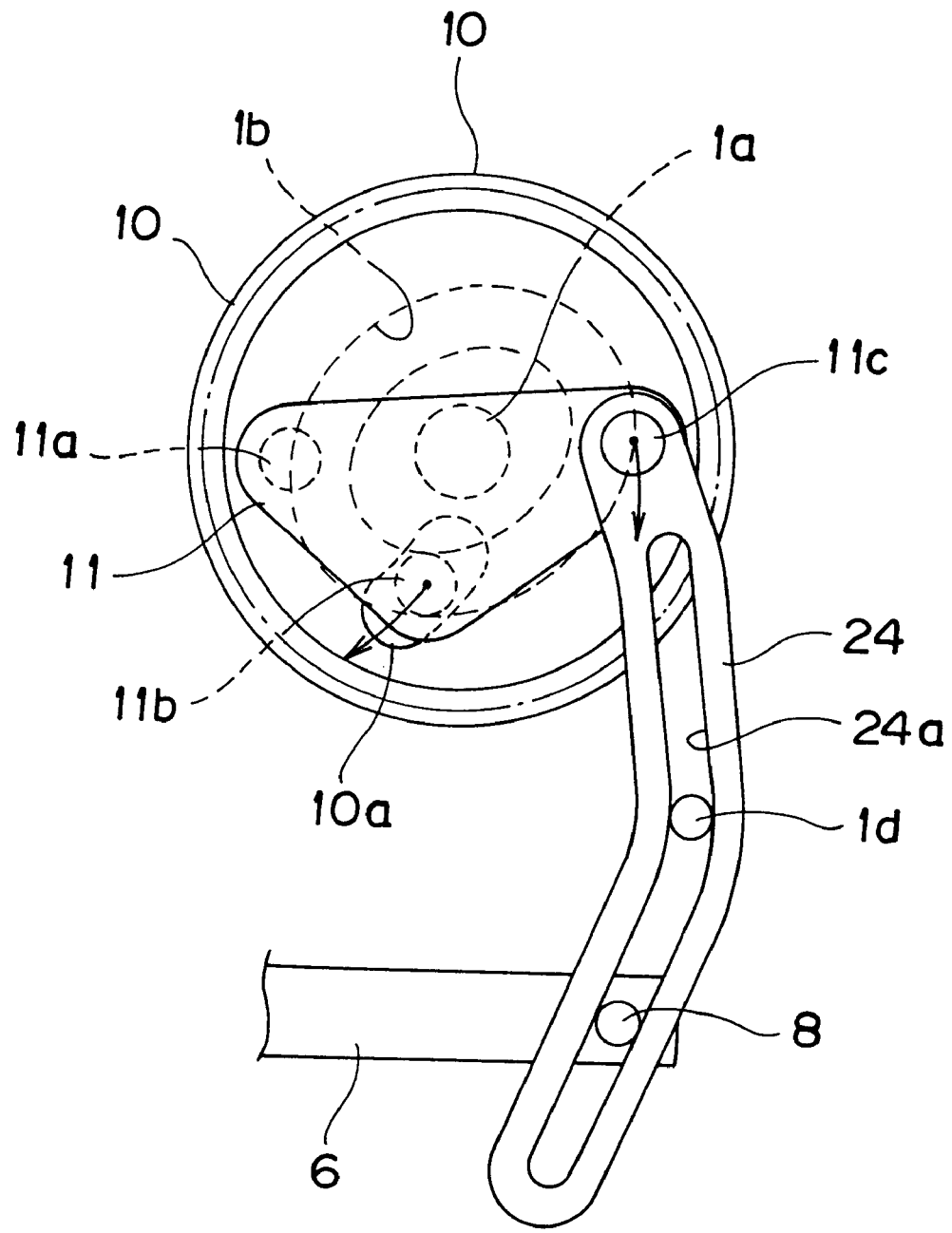
FIG. 15 is a sectional view, in an enlarged scale, of an essential portion of the fishing reel of a seventh embodiment of the present invention.

FIG. 15 represents a seventh embodiment of a fishing reel according to the present invention, in which like reference numerals are added to members or elements corresponding to the foregoing embodiments.

In this embodiment, one end of a link 24 is connected to the guide pin 11c of the rotational plate 11 to be swingable. The link 24 is formed with a slot 24a with which the boss 1a formed to the reel body 1 and the oscillator 8 mounted to the rear end of the spool shaft 6 are engaged. In such arrangement, the reciprocal motion amount of the oscillator 8 with respect to the circular motion of the guide pin 11c can be increased or decreased by optionally changing the connection position between the guide pin 11c and the oscillator 8 with respect to the pivot position of the link 24, and through this adjustment, the shifting amount of the spool 7 in accordance with the width of the fishing line wind-up portion can be adjusted. Furthermore, the sliding speed of the oscillator 8 can be partially adjusted by changing the inclination of the slots 23a and 23b or forming the slots 23a and 23b in bent shapes.

The present invention further includes the following embodiments which are represented by FIGS. 16 to 41.

Eighth Embodiment

Figure 16:
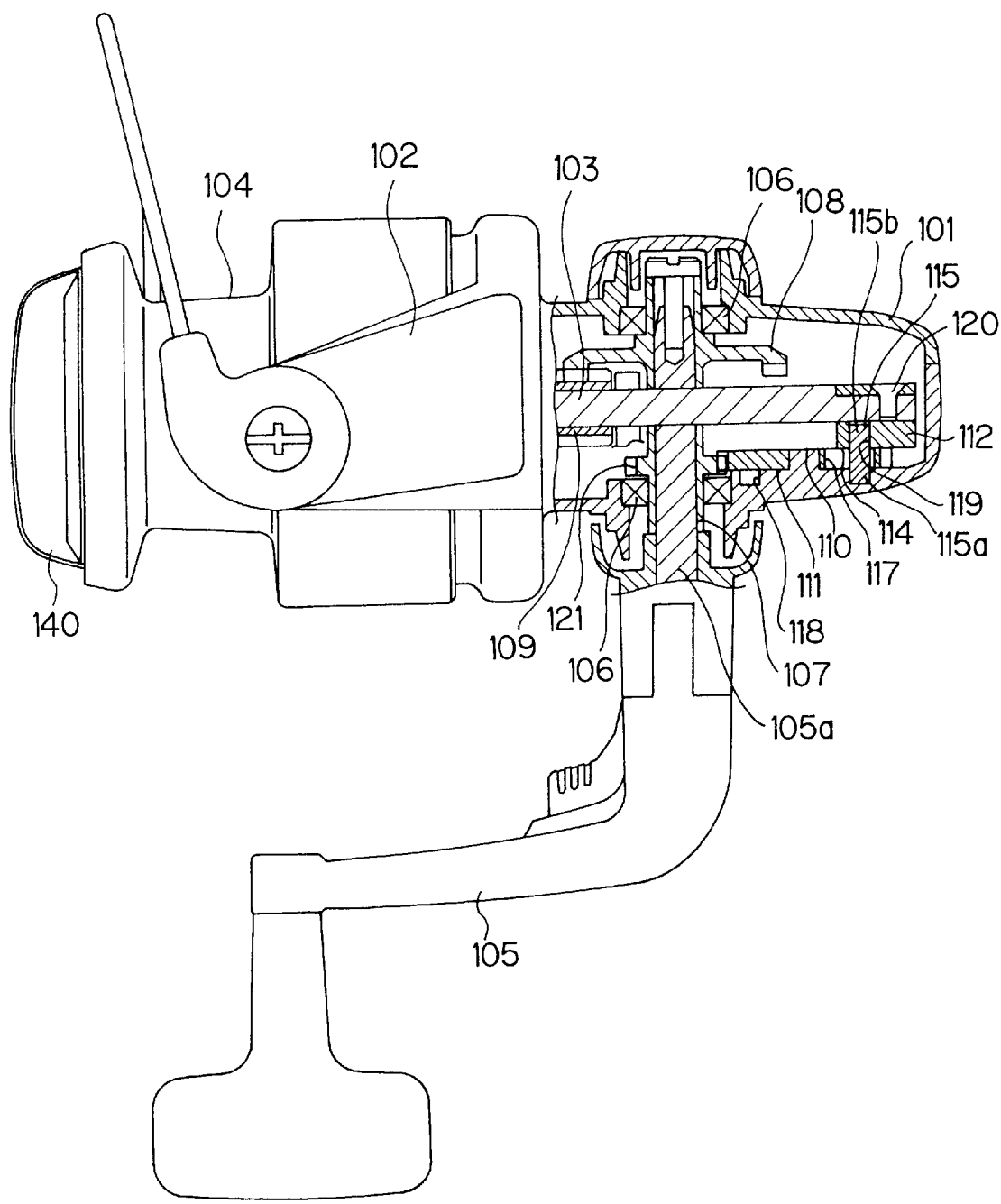
FIG. 16 is a side view, partially in section, of a fishing reel according to an eighth embodiment of the present invention.

FIG. 16 shows a side view, partially in section, of a spinning reel as a fishing reel according to the present invention.

Figure 17:
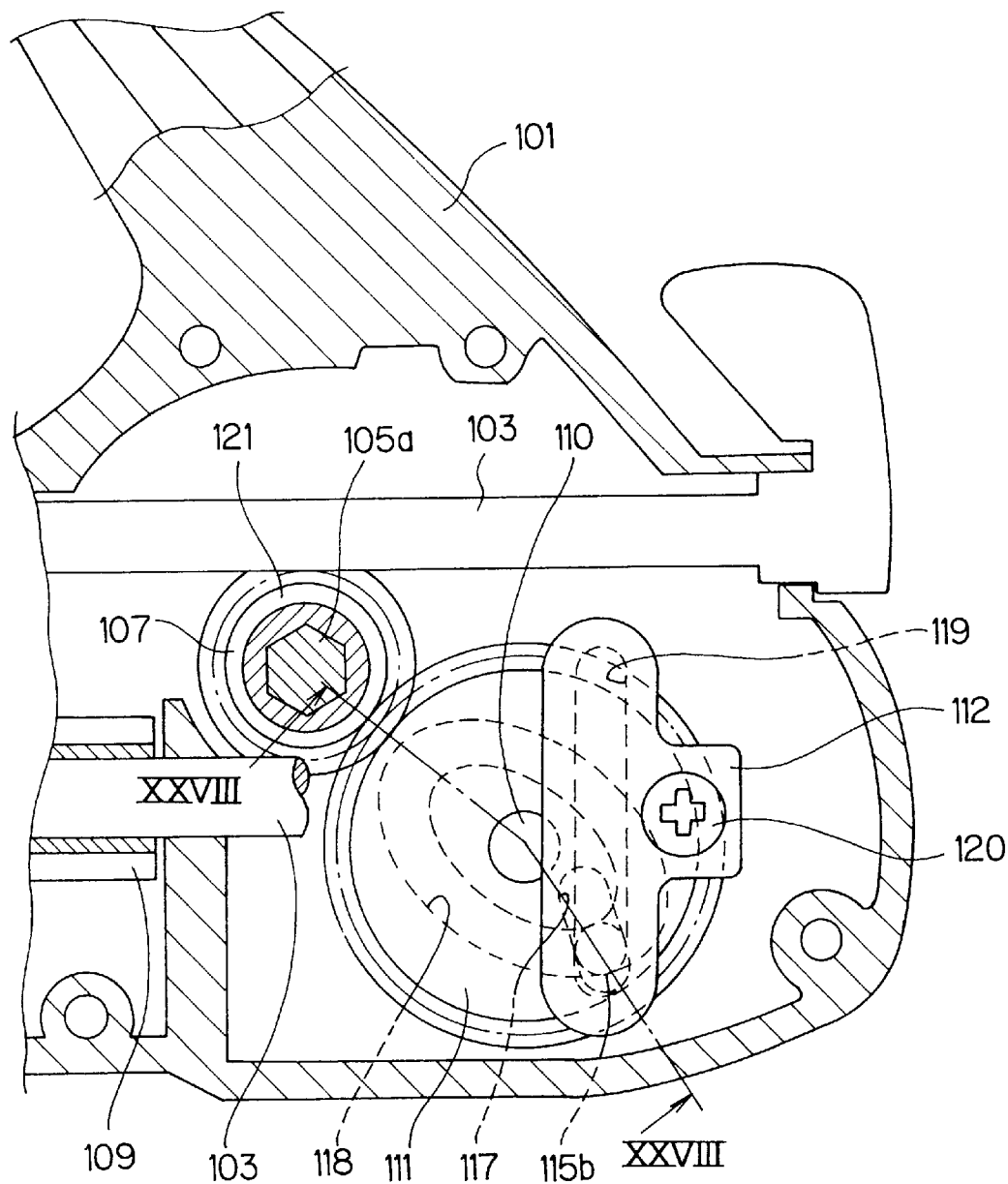
FIG. 17 is an enlarged partially sectional view of the eighth embodiment shown in FIG. 16.

With reference to FIGS. 16 and 17, a fishing reel of the eighth embodiment comprises a reel body 101 which is mounted and fixed to a fishing rod, a rotational frame 102 supported to be rotatable to the front portion of the reel body 101, a spool shaft 103 disposed in front of the rotational frame 102 and supported by the reel body 101 to be swingable in the longitudinal direction thereof, a spool 104 mounted to a front end (longitudinal left side end as viewed in FIG. 16) of the spool shaft 103, a handle lever 105 disposed to the side surface of the reel body 101 and operatively mounted thereto through a handle shaft, and a transfer mechanism disposed inside the reel body 101 to convert and then transfer the rotational motion of the handle lever 105 to the rotational motion of the rotational frame 102 and to the longitudinal slide motion of the spool 104.

The transfer mechanism for rotating the rotational frame 102 is composed of a hollow handle shaft 107 rotated by the operation of the handle lever 105, a master gear 108 fastened to the handle shaft 107, and a pinion 109 integrally formed to a cylindrical shaft of the rotational frame 102 meshed with the master gear 108. According to this structure, when an operator rotates the handle lever 105, the driving force is transferred to the rotational frame 102 to rotate the same through the handle shaft 107, the master gear 108 and the pinion 109.

The transfer mechanism for sliding the spool 104 in the longitudinal direction of the reel body 101 is composed of the handle shaft 107 extending in the width direction of the reel body 101, an oscillator 112 supported to the reel body 101 to be swingable in the longitudinal direction thereof and fixed to the rear end (longitudinal right side end as viewed in FIG. 16) of the spool shaft 103, a vertical groove 119 formed to the oscillator 112 so as to extend vertically as viewed in FIG. 16, an oscillator gear 111 which is operatively connected to a coupling gear 121 integrally formed to the handle shaft 107 mounted to the reel body 101 and which is supported to be rotatable with an oscillator gear shaft 110 formed to the reel body 101 being the center axis of this rotation, a pin guide slot 117 formed to the oscillator gear 111 so as to extend in the radial direction thereof, an elliptical cam groove 118 formed to a side wall, opposing to the oscillator gear 111, of the reel body 101, and a pin 115 which penetrates the pin guide slot 117 in a slidable manner and which has one end 115a engaged with the cam groove 118 and the other end 115b engaged with the vertical groove 119 of the oscillator 112. In this structure, the pin guide slot 117 has a shape, as shown in FIG. 17, extending so as to obliquely cross the radial direction of the oscillator gear 111 and the cam groove 118 has the elliptical shape having a long axis obliquely crossing the sliding direction of the spool shaft 103.

The spool shaft 103 penetrates the pinion 109 supporting the rotational frame 102 and supports the spool 104 on the front end side of the spool shaft 103 projecting in front of the rotational frame 102 so that the spool 104 is not come off therefrom by means of drug knob 140. The oscillator 112 is fixed to the rear end of the spool shaft 103 by a screw 120. The oscillator 112 has a shape longer in the vertical direction of the reel body 101 to prevent the spool 104 from rotating and has a flat surface facing the oscillator gear 111. The vertical groove 119 is formed to this flat surface of the oscillator 112.

Figure 19:
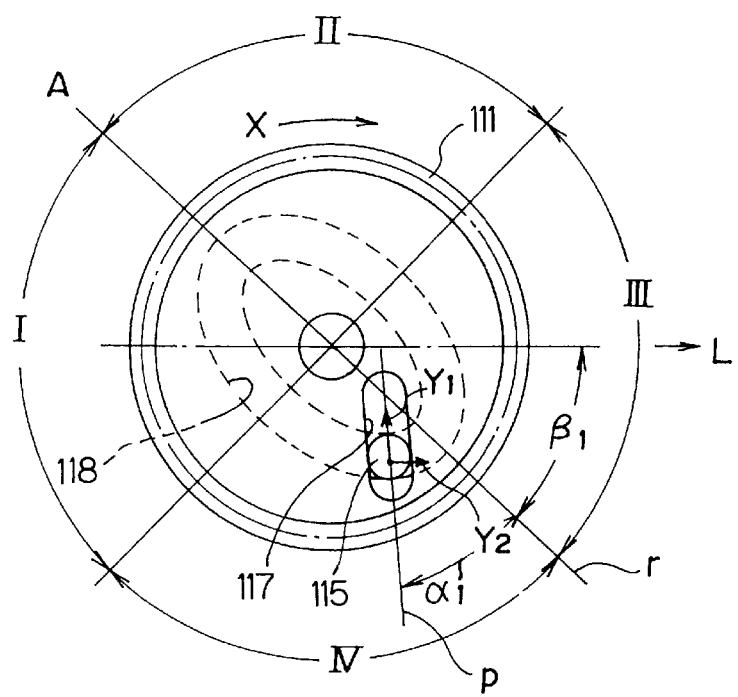
FIGS. 19 and 20 are views showing positional relationship between a cam groove, a pin and a pin guide slot according to the eighth embodiment.

The oscillator gear 111 meshes with the coupling gear 121 formed to the handle shaft 107 and rotates about the oscillator gear shaft 110 in operative association with the rotation of the handle shaft 107. As shown in FIG. 19, the pin guide slot 117 formed to the oscillator gear 111 has a shape such that a radial line 2 extending in the longitudinal direction of the pin guide slot 117 crosses a radial line r of the oscillator gear 111 with an angle $\alpha_1$ so that an outer diameter side of the slot 117 goes ahead on the oscillator gear 111 in the positive rotation direction X thereof with respect to an inner diameter side thereof.

As shown in FIG. 19, the cam groove 118 has almost elliptical shape having an extending radial line r, center line, of the long axis thereof inclines so as to go ahead by an angle $\beta_1$ in the positive rotation direction X of the oscillator gear 111 with the sliding direction L of the spool 103 being the reference line of the angle $\beta_1$. According to the rotation of the oscillator gear 111, the pin 115 carries out a motion with substantially uniform speed under the restriction of both the cam groove 118 and the pin guide slot 117, as mentioned herein later, and accordingly, the spool shaft 103 is also moved in the sliding direction L thereof with substantially uniform speed.

Figure 18:
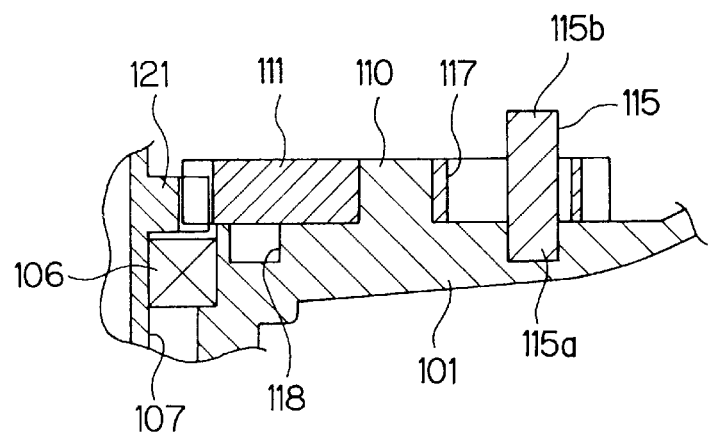
FIG. 18 is a sectional view taken along the line XVIII—XVIII in FIG. 17.

The pin 115 is formed as a round shaft. As shown in FIGS. 16 and 18, the pin 115 penetrates the oscillator gear 111 in the bilateral direction at a portion of the slot 117, and the one end 115a of the pin 115 is engaged with the cam groove 118 and the other end 115b thereof is engaged with the vertical groove 119 of the oscillator 112.

The fishing reel of this embodiment has a slide mechanism which will be operated in the following manner.

When the handle lever 105 is rotated, the handle shaft 107 is then rotated, and the rotation thereof is transferred to the rotational frame 102 to rotate the same through the transfer mechanism in the manner mentioned herein before and also rotates the oscillator gear 111. According to the rotation of the oscillator gear 111, the pin 115 meshed therewith is moved along the groove shape of the cam groove 118 while being conveyed by the oscillator gear 111. In this operation, since the other end 115b of the pin 115 is fitted to the vertical groove 119 of the oscillator 112, the oscillator 112 performs the reciprocal sliding motion in the longitudinal direction thereof. This reciprocal sliding motion corresponds to a displacement curve m described with a broken line in FIG. 21 and approximates to a uniform speed motion line n shown with a solid line in FIG. 21.

Figure 4:
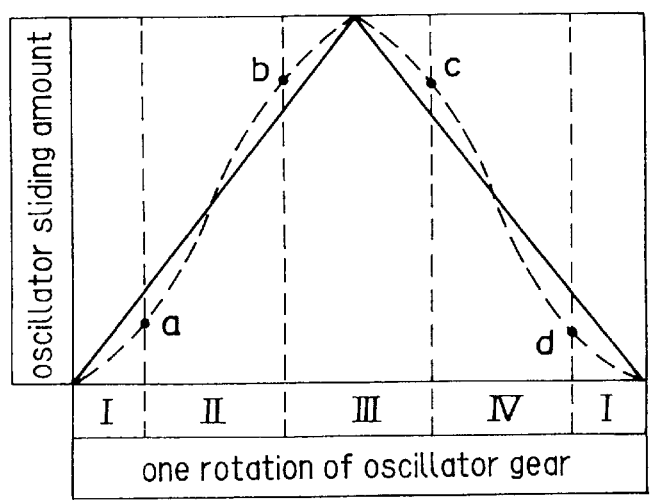
FIG. 4 is a view showing a moving amount of an oscillator with respect to a rotation angle of the oscillator gear of the first embodiment.
Figure 21:
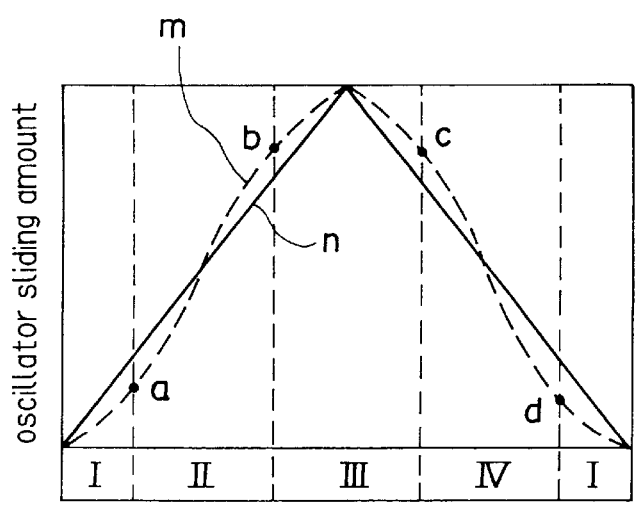
FIG. 21 is a diagram showing relationship between oscillator sliding amount and oscillator gear rotation angle of the eighth embodiment.

That is, with reference to FIG. 4, the quadrants II and IV represent the vertical position of the oscillator gear 111, in which the moving direction of the pin 115 accords with the sliding direction of the oscillator 112, so that the sliding amount of the spool per rotation angle of the oscillator gear is made large and the spool is hence slid with high speed. However, as shown in FIG. 19, when the pin 115 in the cam groove 118 is in the quadrant II or IV, moving motions of amounts Y1 and Y2 are caused to the pin 115 by the restriction of both the cam groove 118 and the pin guide groove 117, and the pin 115 is moved in the reduced diameter direction of the oscillator gear 111 by the moving amount Y1 and, at the same time, is moved in a direction reverse to the positive rotation direction X of the oscillator gear 111. Therefore, as shown in FIG. 21, the moving speed of the oscillator 112 is reduced in the high sliding speed areas in the area (quadrant II) from the point a on the displacement line to the point b thereon and the area (quadrant IV) from the point c to the point d, and the displacement curve m can approximate to the uniform speed motion line n.

Figure 20:
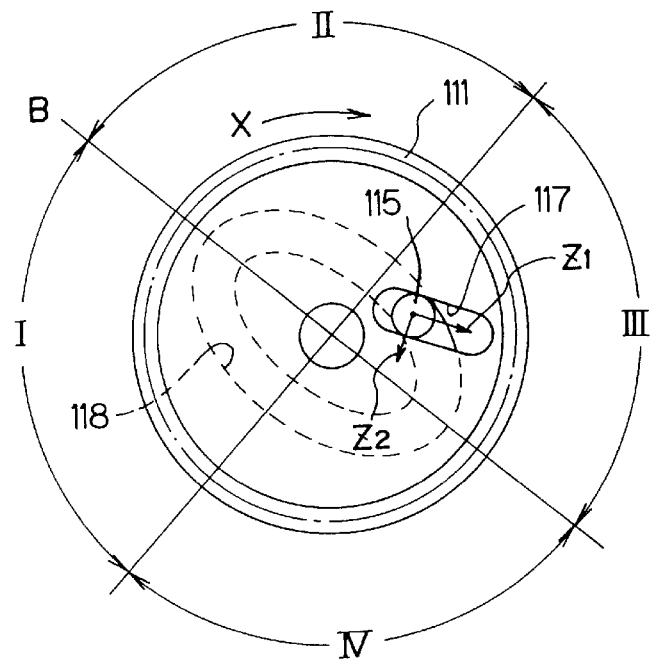

On the other hand, the quadrants I and III represent the longitudinal position of the oscillator gear 111, in which the moving direction of the pin 115 crosses the sliding direction of the oscillator 112, so that the sliding amount of the spool per rotational angle of the oscillator gear is made small and the spool is hence not rapidly slid at the front and rear end sides of the oscillator gear 111. However, as shown in FIG. 20, when the pin 115 in the cam groove 118 is in the quadrant II or IV, moving motions of amounts $Z_1$ and $Z_2$ are caused to the pin 115 by the restriction of both the cam groove 118 and the pin guide groove 117, and the pin 115 is moved in the widened diameter direction of the oscillator gear 111 by the moving amount $Z_1$ and, at the same time, is moved in the positive rotation direction X of the oscillator gear 111. Therefore, as shown in FIG. 21, the moving speed of the oscillator 112 is accelerated in the direction X in the low sliding speed areas in the area (quadrant III) from the point b on the displacement line to the point c thereon and the area (quadrant I) from the point d to the point a, whereby the oscillator 112 is also accelerated, and the displacement curve m can approximate to the uniform speed motion line n.

As described above, the displacement curve m approximates, as a whole, to the uniform speed motion line n, and hence, the oscillator 112 and the spool 104 can perform the reciprocal sliding motions with speeds near the uniform speed in the longitudinal direction thereof, thus the fishing line being uniformly wound up around the entire width portion of the spool 104.

Ninth Embodiment

Figure 22:
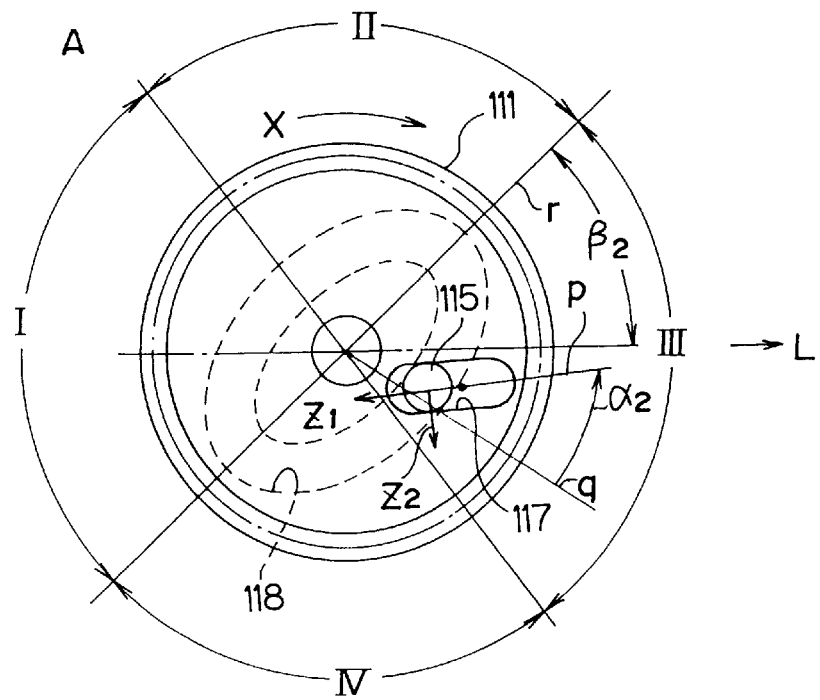
FIG. 22 is a view similar to FIG. 19 or 20 showing positional relationship between a cam groove, a pin and a pin guide groove according to a ninth embodiment of the present invention.

FIG. 22 represents a ninth embodiment of the present invention, in which the pin guide slot 117 formed to the oscillator gear 111 has a shape such that a radial line p extending in the longitudinal direction of the pin guide slot 117 crosses a radial line q of the oscillator gear 111 with an angle $\alpha_2$ so that an inner diameter side of the slot 117 goes ahead on the oscillator gear 111 in the positive rotation direction X thereof with respect to an outer diameter side thereof. The cam groove 118 having the extending radial line r, center line, of the long axis thereof inclines so as to go behind by an angle $\beta_2$ in a direction reverse to the positive direction X of the oscillator gear 111 with the sliding direction L of the spool 103 being the reference line of the angle $\beta_2$.

According to the rotation of the oscillator gear 111, the pin 115 carries out a motion under the restriction of both the cam groove 118 and the pin guide slot 117, and accordingly, the pin 115 and the spool shaft 103 also perform the reciprocal motions in the spool extending direction with substantially a constant speed.

That is, when the pin 115 in the cam groove 118 is in the quadrant I or III, moving motions of amounts $Z_1$ and $Z_2$ are caused to the pin 115 by the restriction of both the cam groove 1 18 and the pin guide groove 117, and the pin 115 is moved in the reduced diameter direction of the oscillator gear 111 by the moving amount $Z_1$ and, at the same time, is moved in the positive rotation direction X of the oscillator gear 111. Therefore, as shown in FIG. 21, the moving speed of the oscillator 112 is accelerated in the low sliding speed areas and the displacement curve m approximates to the uniform speed motion line n.

On the other hand, when the pin 115 in the cam groove 118 is in the quadrant II or IV, the pin 115 is moved in the reduced diameter direction of the oscillator gear 111 by the restriction of both the cam groove 118 and the pin guide groove 117 and, at the same time, the pin 115 is moved in a direction reverse to the positive rotation direction X of the oscillator gear 111, as shown in FIG. 21, whereby the moving speed of the oscillator 112 is reduced in the high speed sliding area and the displacement curve m thereof approximates to the uniform speed motion line n.

Accordingly, the displacement curve m of the oscillator 112 approximates, as a whole, to the uniform speed motion line n, and hence, the oscillator 112 performs the stable reciprocal sliding motion with a speed near the uniform speed in the longitudinal direction thereof, and the spool 104 also performs the stable reciprocal sliding motion with a speed near the uniform speed in the longitudinal direction thereof in association with the rotation of the rotational frame 102.

Tenth Embodiment

Figure 23:
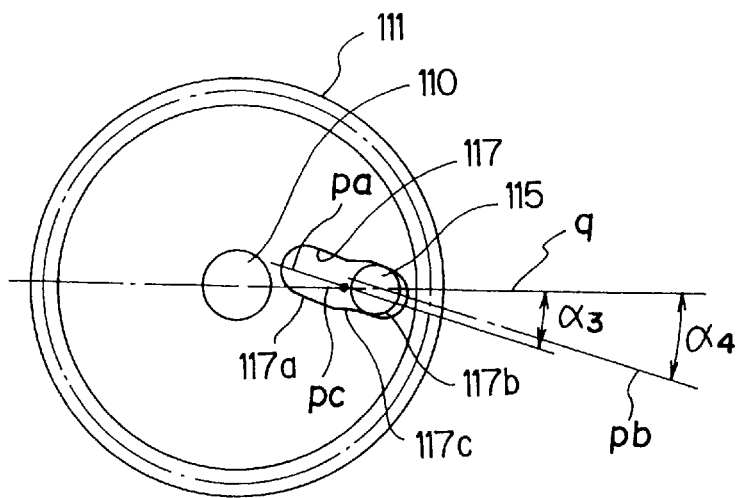
FIG. 23 is a view similar to FIG. 19 or 20 showing positional relationship between a cam groove, a pin and a pin guide groove according to a tenth embodiment of the present invention.

FIG. 23 represents a tenth embodiment of the present invention, in which the pin guide slot 117 is parted in three sections, i.e. both end side portions 117a and 117b and an intermediate portion 117c between these end side portions 117a and 117b. The intermediate portion 117c is formed so that a center line pc thereof lies on the radial line q of the oscillator gear 111 so as to make zero the crossing angle of the center line pc with respect to the radial line q. The both end side portions 117a and 117b have center lines pa and pb which are parallel to each other and cross the radial line q of the oscillator gear 111 with predetermined crossing angles $\alpha_3$ and $\alpha_4$, respectively.

According to the shape of the slot 117 mentioned above, the spool shaft 103 can slide at the accelerated or reduced speed at its front and rear ends portions or the central portion during the sliding motion thereof and is not accelerated or reduced in the sliding speed at the other portions.

Further, it is to be noted that the intermediate portion 117c may be formed so that the center line thereof has an inclination with respect to the radial line of the oscillator gear 111, and the crossing angles $\alpha_3$ and $\alpha_4$ of the center lines of both the end portions 117a and 117b may be the same or different from each other.

Eleventh Embodiment

Figure 24:
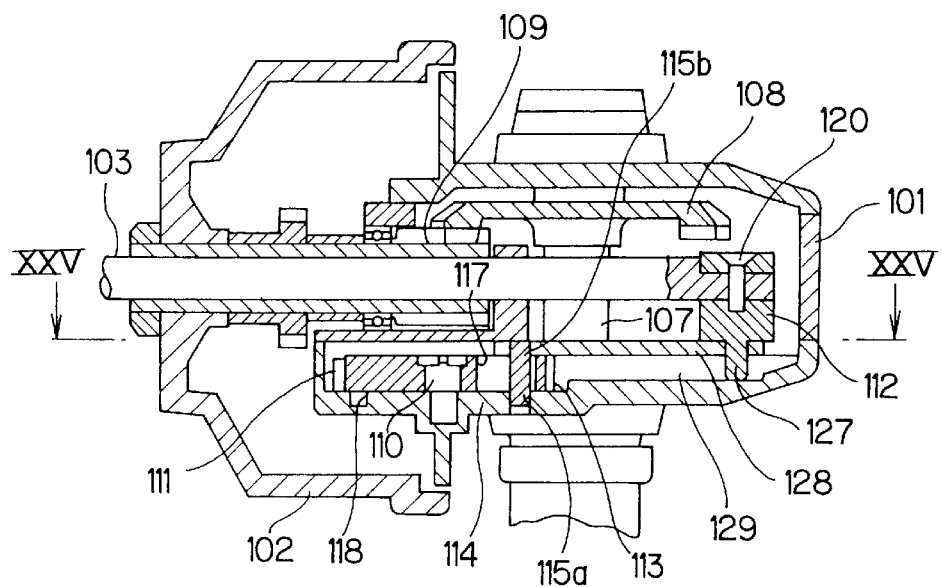
FIG. 24 is a sectional view showing an essential portion of an eleventh embodiment of the present invention.
Figure 25:
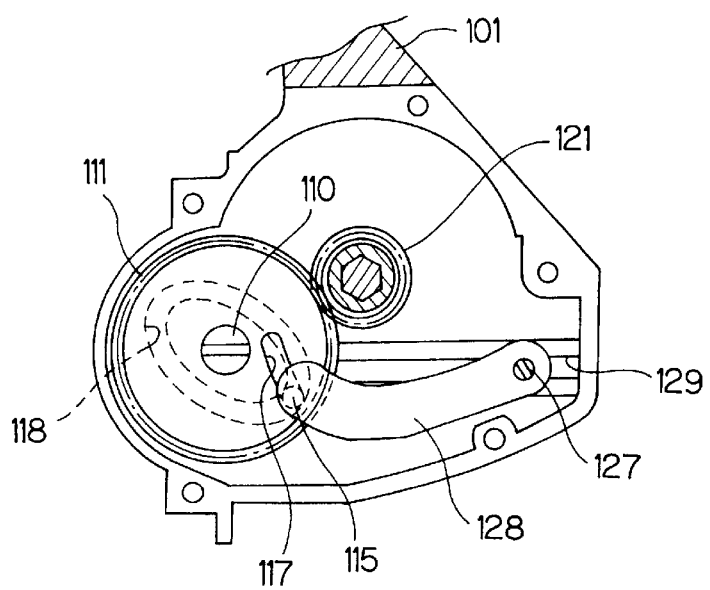
FIG. 25 is a sectional view taken along the line XXV—XXV in FIG. 24.

FIGS. 24 and 25 represent an eleventh embodiment of the present invention, in which the oscillator gear 111 is arranged in front of the master gear 108, the oscillator 112 is provided with a slide pin 127 in place of the vertical groove 119 (FIGS. 16 and 17), and the slide pin 27 is coupled with the other end 115b of the pin 115 on the side of the oscillator gear 111 through a link 128. In this embodiment, the reel body 101 is formed with a groove 129 for properly guiding the oscillator 112 in the longitudinal direction thereof and the front end of the slide pin 27 is inserted into the groove 129.

According to such structure, when the oscillator gear 111 is rotated, the other end 115b of the pin 115 is moved along the cam groove 118 and the swing motion of the pin 115 is converted to the reciprocal sliding motion of the oscillator 112 and the spool shaft 103.

Twelfth Embodiment

Figure 26:
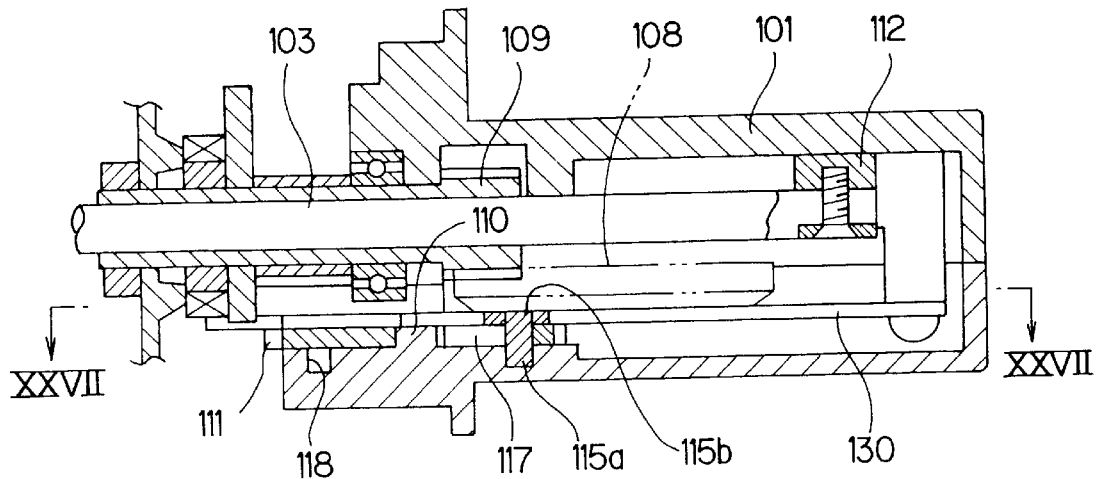
FIG. 26 is sectional view showing an essential portion of a twelfth embodiment of the present invention.
Figure 27:
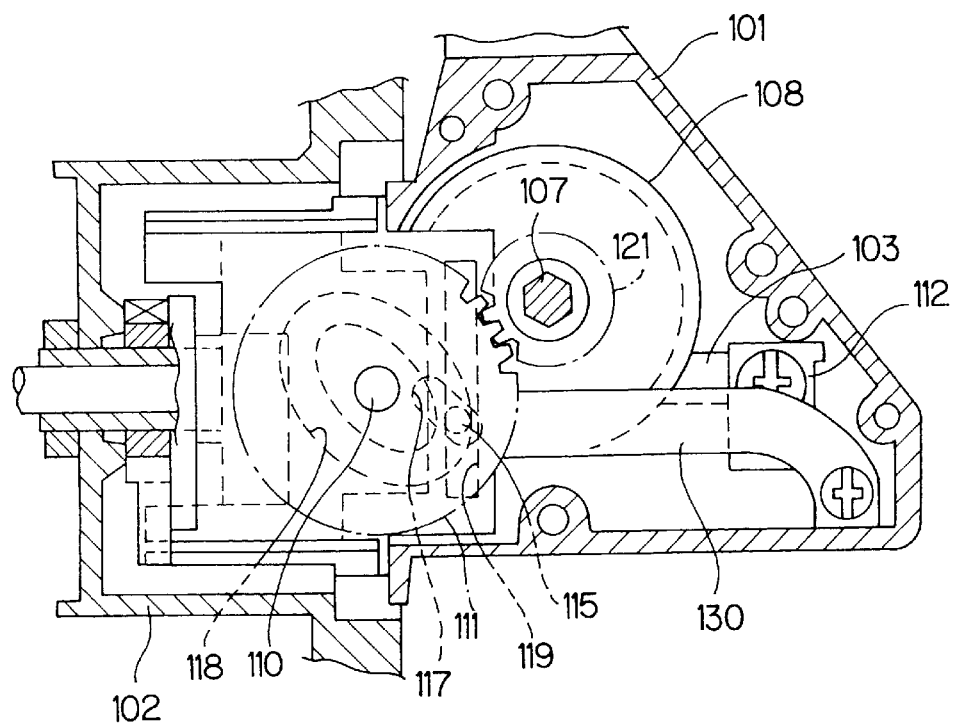
FIG. 27 is a sectional view taken along the line XXVII—XXVII in FIG. 26.

FIGS. 26 and 27 represent a twelfth embodiment of the present invention, in which the oscillator gear 111 is disposed in front of the coupling gear 121 (FIG. 16) corresponding to the handle lever mounting position. A slider 130 is fixed to the oscillator 112 and the slider 130 is formed with a vertical groove 119 with which the other end 115b of the pin 115 is engaged.

According to such structure, when the oscillator gear 111 is rotated, the other end 115b of the pin 115 is moved along the cam groove 118 and the slider 130 is moved in the longitudinal direction thereof, whereby the spool 104 carries out the reciprocal motion in the longitudinal direction through the oscillator 112, to which the slider 130 is fixed, and the spool shaft 103.

Thirteenth Embodiment

Figure 28:
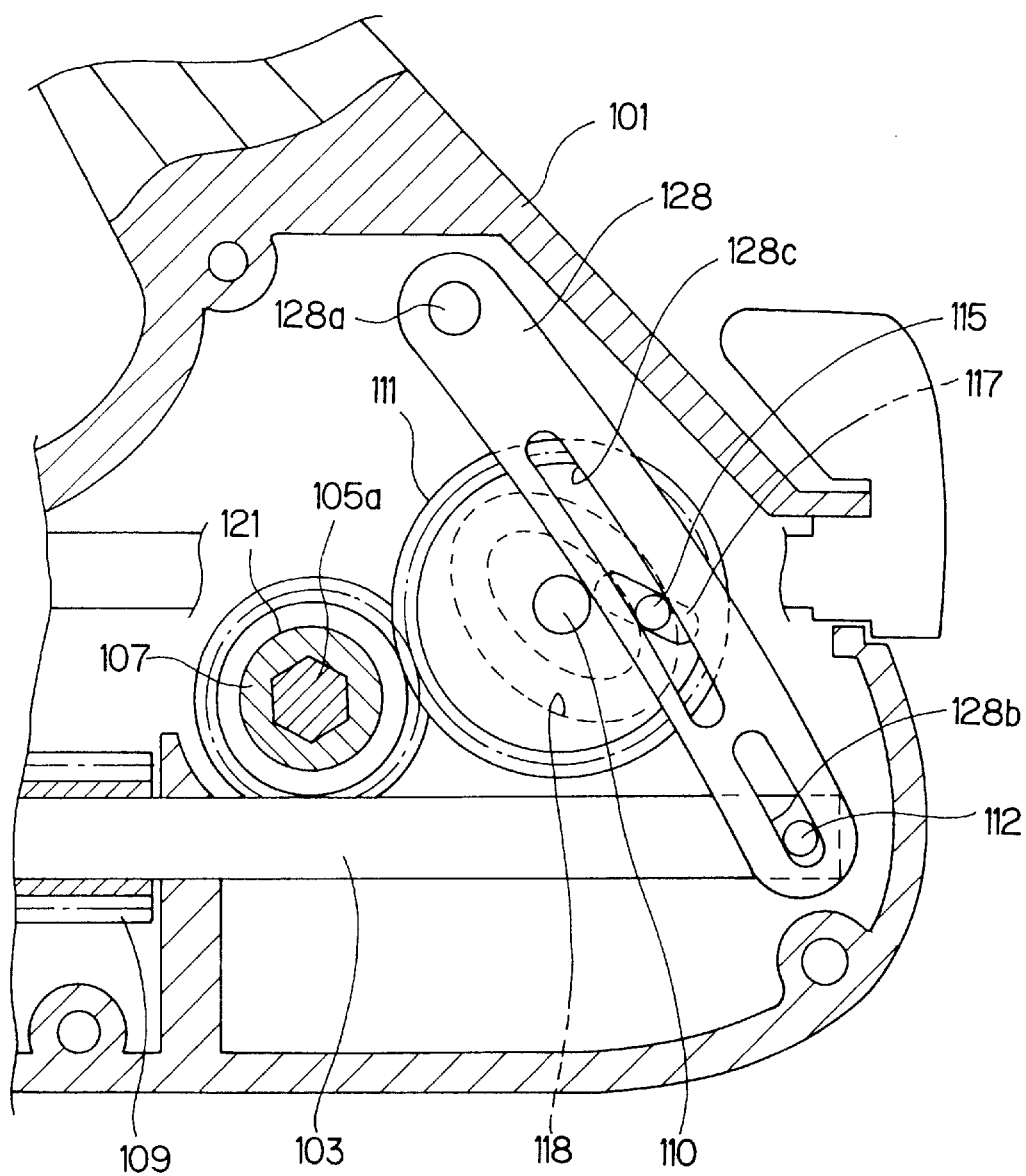
FIG. 28 is an enlarged partial sectional view of an essential portion of a thirteenth embodiment of the present invention.

FIG. 28 represents a thirteenth embodiment of the present invention, in which the other end 115b of the pin 115 and the oscillator 112 are coupled to a link 128 pivotally supported by a fulcrum pin 128c of the reel body 101 respectively through slots 128a and 128b formed to the link 128. According to such structure, the elliptical motion of the pin 115 along the cam groove 118 is converted into the sliding motion of the spool shaft 103 through the swing motion of the link 128 about the fulcrum pin 128c.

In this arrangement, the sliding amount of the oscillator 112 can be increased or decreased by changing distances between the fulcrum pin 128c and the other end 115b of the pin 115 and between the fulcrum pin 128c and the oscillator 112, and accordingly, the sliding motion of the spool 104 in association with the fishing line wind-up portion can be optionally adjusted. Furthermore, the sliding speed of the spool 104 in the slidable range can be partially adjusted by changing the inclinations or shapes of the slots 128a and 128b.

Fourteenth Embodiment

Figure 29:
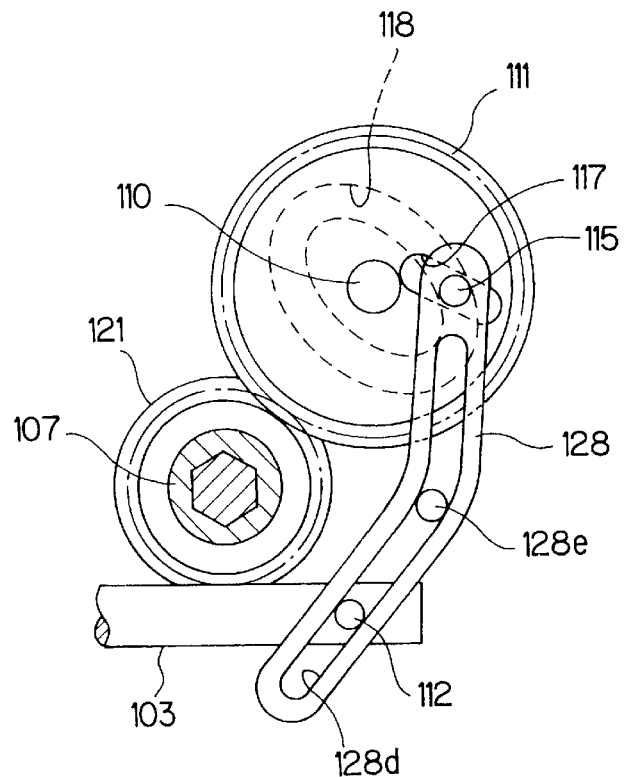
FIG. 29 is a sectional view showing an essential portion of a fourteenth embodiment of the present invention.

FIG. 29 represents a fourteenth embodiment of the present invention, in which the other end 115b of the pin 115 with the one end 115a thereof being restricted by the cam groove 118 and the oscillator 112 are coupled to a link 128 pivotally supported by a pin-shaped boss 128e of the reel body 101, respectively. The link 128 is swingable about the other end 115b of the pin 115, and the boss 128e projected from the reel body 101 and the pin-shaped oscillator 112 are fitted into a slot 128d formed to the link 128. According to such structure, the elliptical motion of the pin 115 along the cam groove 118 is converted to the uniform speed sliding motion of the spool shaft 103 through the swing motion of the link 128 about the boss 128e.

Further, the sliding amount and the sliding speed of the oscillator 112 can be optionally adjusted by changing the distances between the boss 128e and the other end 115b of the pin 115 and between the boss 128e and the oscillator 112, by exchanging the oscillator 112 with a fulcrum pin, and by changing the inclinations or shape of the slot 128d.

Fifteenth Embodiment

Figure 30:
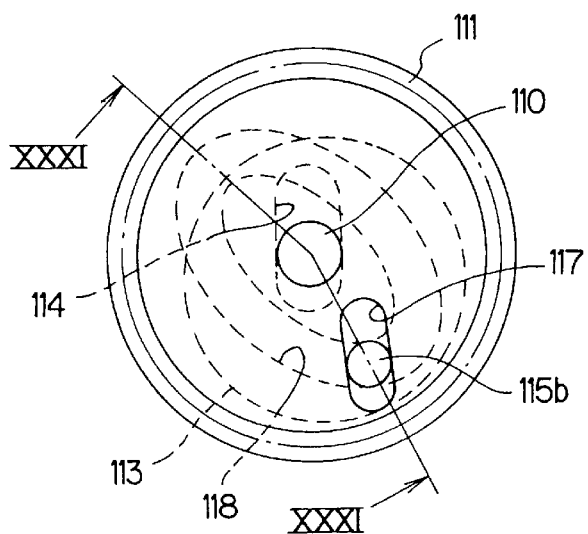
FIG. 30 is a view similar to FIG. 19 or 20 concerning a fifteenth embodiment of the present invention.
Figure 31:
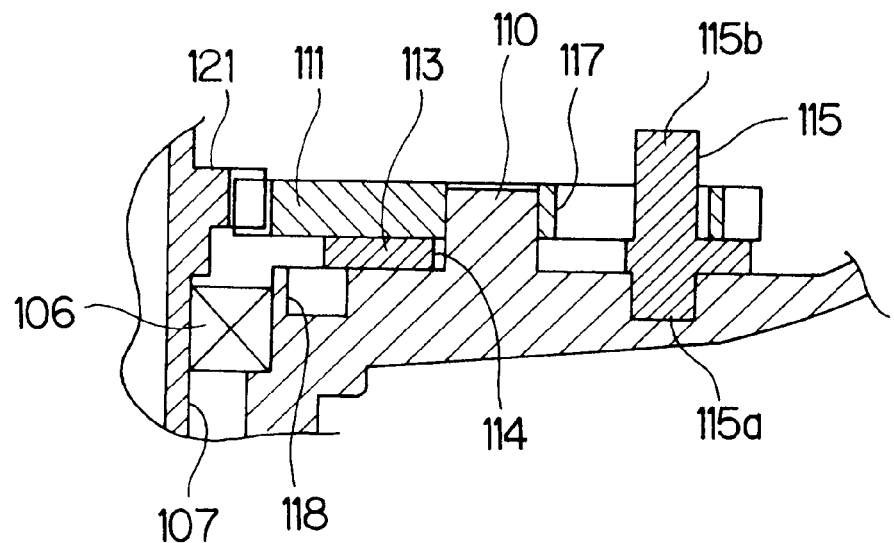
FIG. 31 is a sectional view taken along the line XXXI—XXXI in FIG. 30.

FIGS. 30 and 31 represent a fifteenth embodiment of the present invention, in which a rotational plate 113 is further provided so as to be rotatable with respect to the oscillator gear 11 together therewith and to be slidable in the extending direction of the pin guide slot 117, and the one end 115a and the other end 115b of the pin 115 are positioned on both the sides of the rotational plate 113.

The rotational plate 113 may have a disc or rectangular shape and the rotational plate 113 is formed with a slot 114 at its central portion into which the oscillator gear shaft 110 is engaged. According to such structure, the rotational plate 113 rotates about the oscillator gear shaft 110. The pin 115 projecting over the right and left side surfaces of the rotational plate 113 is formed as, for example, a round shaft having one end 115a engaged with the cam groove 118 and the other end 115b penetrating the slot 117 of the oscillator gear 111 and engaged with the vertical groove 119 of the oscillator 112.

The rotational plate 113 has flat surfaces contacting the oscillator 112 and the cam groove 118 and being parallel to each other and is snapped between the oscillator gear 111 and the oscillator 112 through the flat parallel surfaces. Accordingly, the rotational plate 113 carries out the reciprocal uniform speed sliding motion maintaining the levelness, and hence, the oscillator 112 can carry out the reciprocal uniform speed sliding motion.

In an alternation, the rotational plate 113 may be disposed so as to contact the other surface of the oscillator gear 111, and in this case, the one end 115a of the pin 115 penetrates the slot 117 of the rotational plate 113 and is engaged with the cam groove 118.

Sixteenth Embodiment

Figure 32:
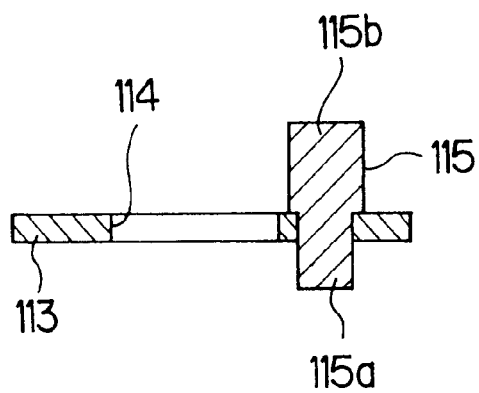
FIG. 32 is a sectional view showing an essential portion of a sixteenth embodiment of the present invention.

FIG. 32 represents a sixteenth embodiment of the present invention, in which the pin 115 is formed separately from the rotational plate 113 and, thereafter, is secured thereto.

Seventeenth Embodiment

Figure 33:
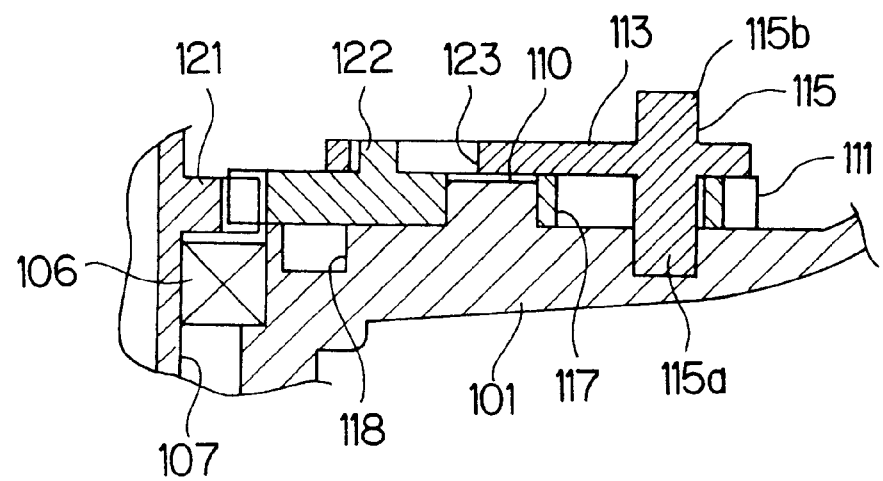
FIG. 33 is a sectional view showing an essential portion of a seventeenth embodiment of the present invention.

FIG. 33 represents a seventeenth embodiment of the present invention, in which a projection 122 is formed to the oscillator gear 111 on the side opposite to the slot 117 with the oscillator gear shaft 110 being interposed therebetween. A slot 123 is further formed to the rotational plate 113 on the side opposite to the pin 115 with the oscillator gear shaft 110 being interposed therebetween, the projection 122 being engaged with the slot 123.

Eighteenth Embodiment

Figure 34:
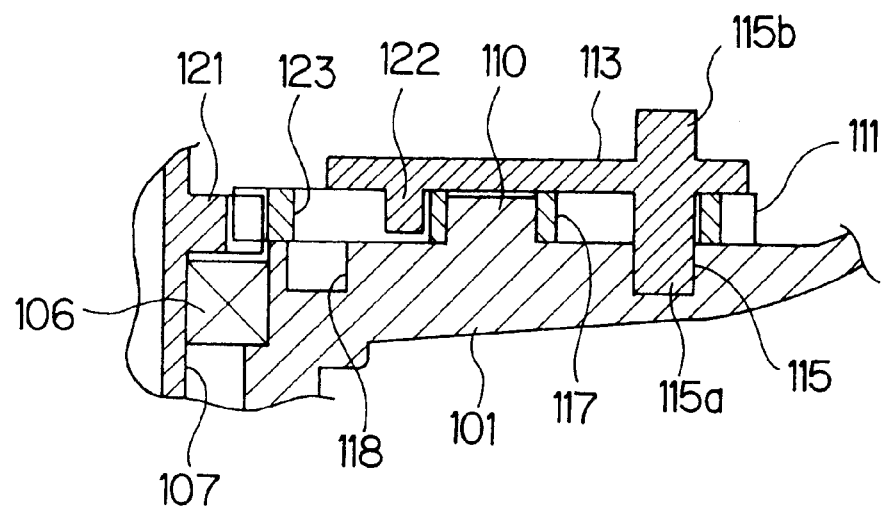
FIG. 34 is a sectional view showing an essential portion of an eighteenth embodiment of the present invention.

FIG. 34 represents an eighteenth embodiment of the present invention, in which the locations of the projection 122 and the slot 123 shown in FIG. 33 are interchanged with each other between the rotational plate 113 and the oscillator gear 111.

Nineteenth Embodiment

Figure 35:
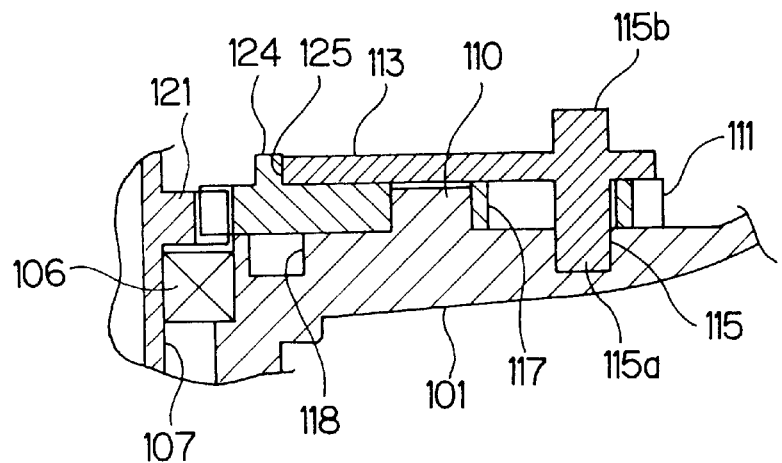
FIG. 35 is a sectional view showing an essential portion of a nineteenth embodiment of the present invention.

FIG. 35 represents a nineteenth embodiment of the present invention, in which a guide rail 124 and a slide surface 125 are formed to the oscillator gear 111 and the rotational plate 113, respectively, the guide rail 124 and the slide surface 125 being engaged with each other in the slidable manner. Although, in FIG. 35, the guide rail 124 and the slide surface 125 are merely partially shown, in a usual structure, two parallel guide rails 124 are arranged so as to snap the rotational plate 113 therebetween to be slidable through the slide surfaces 125.

In an alternation, a guide groove may be formed to one surface of the oscillator gear 111 and the rotational plate 113 is fitted in the guide groove to be slidable.

Twentieth Embodiment

Figure 36:
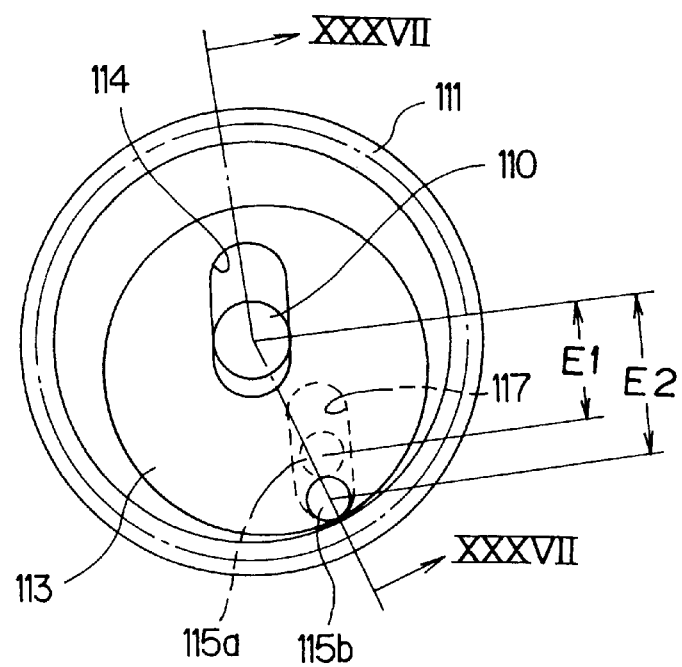
FIG. 36 is a view showing an essential portion of a nineteenth embodiment of the present invention.
Figure 37:
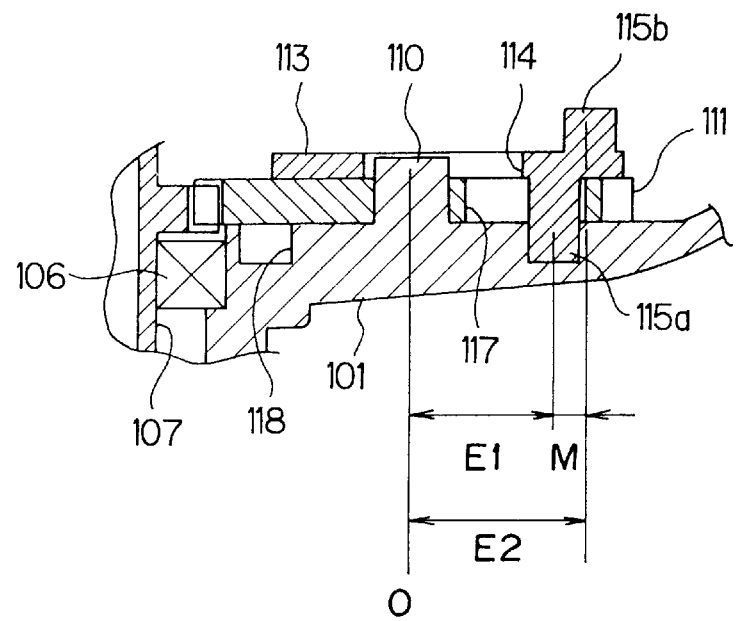
FIG. 37 is a sectional view taken along the line XXXVII—XXXVII in FIG. 36.

FIGS. 36 and 37 represent a twentieth embodiment of the present invention, in which the pin 115 is disposed such that the one end 115b thereof is displaced in the outer diameter direction of the oscillator gear 111 in comparison with the one end 115a of the pin 115.

According to this structure, providing that a distance from an indication line O representing both the rotation center of the oscillator gear 111 and the elliptical center of the cam groove 118 to the center of the one end 115a of the pin 115 is $E_1$, and a distance from the indication line O to the other end 115b of the pin 115 is $E_2$, the relationship between these two distances are defined by an inequality $E_1 < E_2$. In comparison with a case where the one and other ends 115a and 115b of the pin 115 lie on the same axis, the oscillating amount is increased by 2M (M=E2−E1). On the contrary, in the case of E1>E2, the oscillating amount is decreased by 2M.

Further, in a case where the pin 115 is disposed so that the other end 115b thereof is attached changeably to the rotational plate 113, the oscillating amount may be optionally adjusted in accordance with the size of the fishing line wind-up portion of the spool 104.

Twenty-first Embodiment

Figure 38:
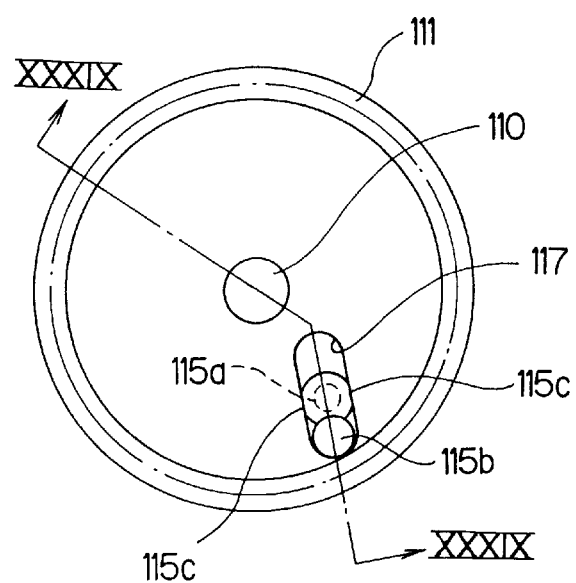
FIG. 38 is a view showing an essential portion of a twentieth embodiment of the present invention.
Figure 39:
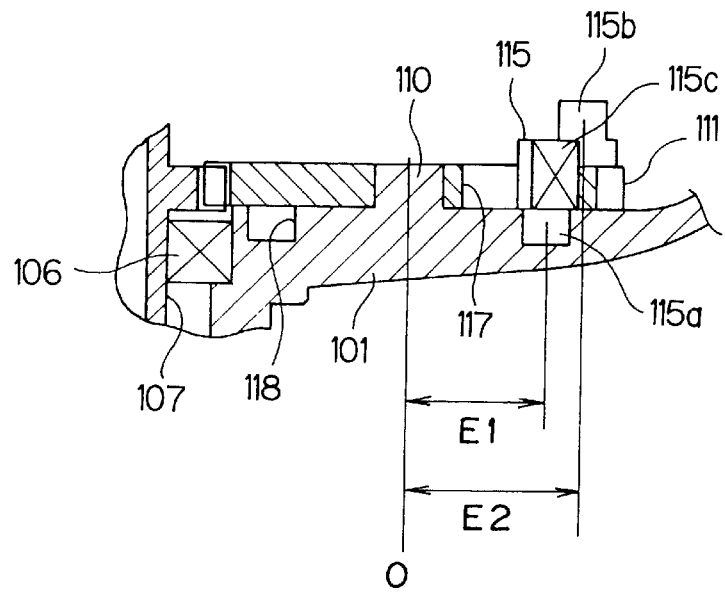
FIG. 39 is a sectional view taken along the line XXXIX—XXXIX in FIG. 38.

FIGS. 38 and 39 represent a twenty-first embodiment of the present invention, in which the pin 115 is formed so that the pin 115 is slidable under the condition that the pin 115 is prevented from rotating with respect to the pin guide slot 117 of the oscillator gear 111, and in addition, the pin 115 is formed so that the other end 115b thereof engaged with the oscillator 112 (FIGS. 16 and 17) or the link 28 (FIG. 24) is displaced in the outer diameter direction of the oscillator gear 111 with respect to the one end 115a of the pin 115 engaged with the cam groove 118.

The pin rotation preventing function is achieved by the abutment of a flat surface 115c formed to the side surface of the pin 115 against the inner surface, parallel to the flat surface 115c, of the pin guide slot 117. According to this function, the rotational plate 113 (FIG.30) may be eliminated.

Twenty-second Embodiment

Figure 40:
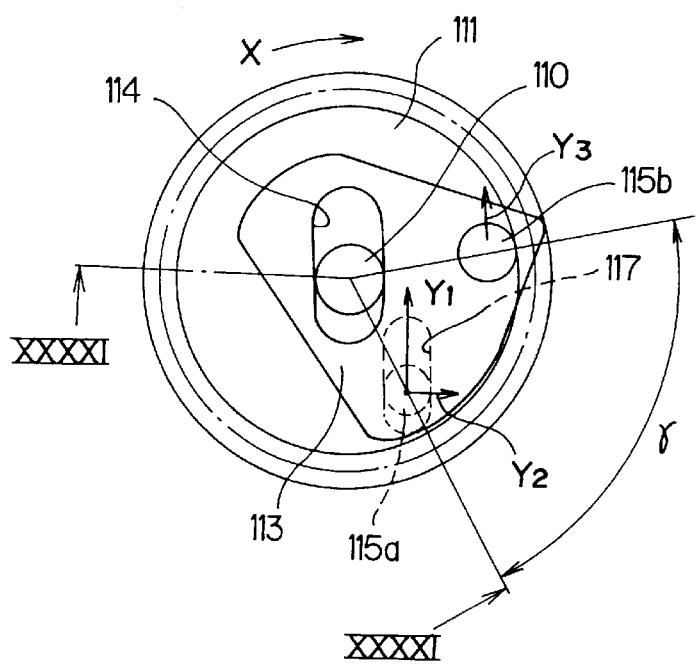
FIG. 40 is a view showing an essential portion of a twenty-first embodiment of the present invention.
Figure 41:
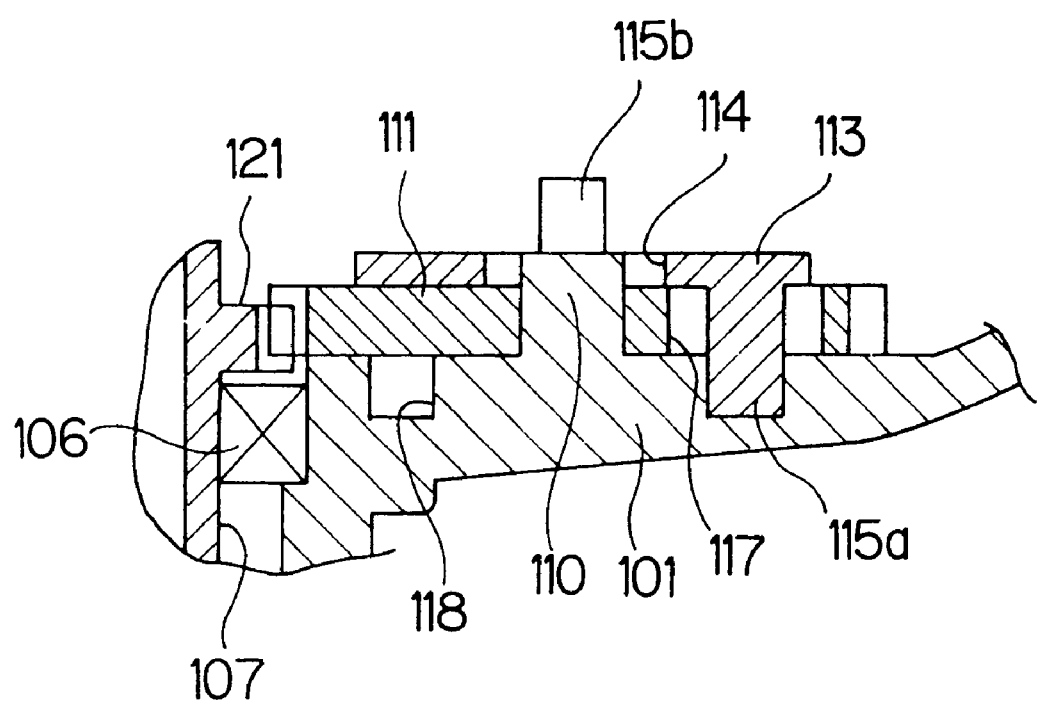
FIG. 41 is a sectional view taken along the line XXXXI—XXXXI in FIG. 40.

FIGS. 40 and 41 represent a twenty-second embodiment of the present invention, in which the pin 115 is formed so that the other end 115b thereof engaged with the oscillator 112 (FIGS. 16 and 17) or the link 28 (FIG. 24) is displaced in the circumferential direction of the oscillator gear 111 by an angle γ with respect to the one end 115a of the pin 115 engaged with the cam groove 118.

Further, the cam groove 118 and the pin guide slot 117 of the oscillator gear 111 are arranged in the manner similar to that in the eighth embodiment described above (refer to FIGS. 19 and 20).

The sliding motion of the oscillator 112 in the sliding mechanism mentioned above will be described hereunder with reference to FIGS. 19, 20, 21, 40 and 41.

In the case where the one end 115a of the pin 115 resides in the quadrant II (or IV), the one end 115a is moved in the reduced diameter direction by the amount $Y_1$ by the rotation of the oscillator gear 111 in the positive direction X and also moved in the direction reverse to the direction X by the amount $Y_2$ and then reduced in speed. Furthermore, since the other end 115b of the pin 115 is also moved by the amount $Y_3$, and the speed reduction effect can be thus achieved by this moving amount $Y_3$. Because of this reason, the displacement curve of the oscillator can further approximate to the uniform speed motion line by the moving amounts $Y_2$ and $Y_3$ in the quadrant II or IV.

Next, in the case where the one end 115a of the pin 115 resides in the quadrant I (or III), the one end 115a of the pin 115 is moved in the accelerated direction by the amount $Z_2$ by the rotation of the oscillator gear 111 in the positive direction X. In the like manner, the other end 115b of the pin 115 is also moved by the amount $Z_3$, not shown, in the direction X. Because of this reason, the displacement curve of the oscillator can further approximate to the uniform speed motion line by the moving amounts $Z_2$ and $Z_3$ in the quadrant I or III.

Accordingly, the oscillator 112 engaged with the other end 115b of the pin 115 carries out a motion along the motion curve similar to the uniform speed motion line shown with the broken line in FIG. 41 per one rotation of the oscillator gear 111 and the spool 104 hence carries out the reciprocal motion with a speed near a uniform speed.

Further, substantially the same effect as that mentioned above can be achieved by displacing the other end 115b of the pin 115 so as to go ahead the one end 115a thereof in the direction X or by angularly displacing the cam groove 118 and the pin guide slot 117 in the manner shown in FIG. 22.

The present invention further includes the following embodiments which further improve the foregoing embodiments. That is, in the following embodiments, the moving amount of the spool in the longitudinal direction thereof can be more increased or decreased in comparison with the foregoing embodiments. The further embodiments will be described hereunder with reference to FIGS. 42 to 64.

Twenty-third Embodiment

Figure 42:
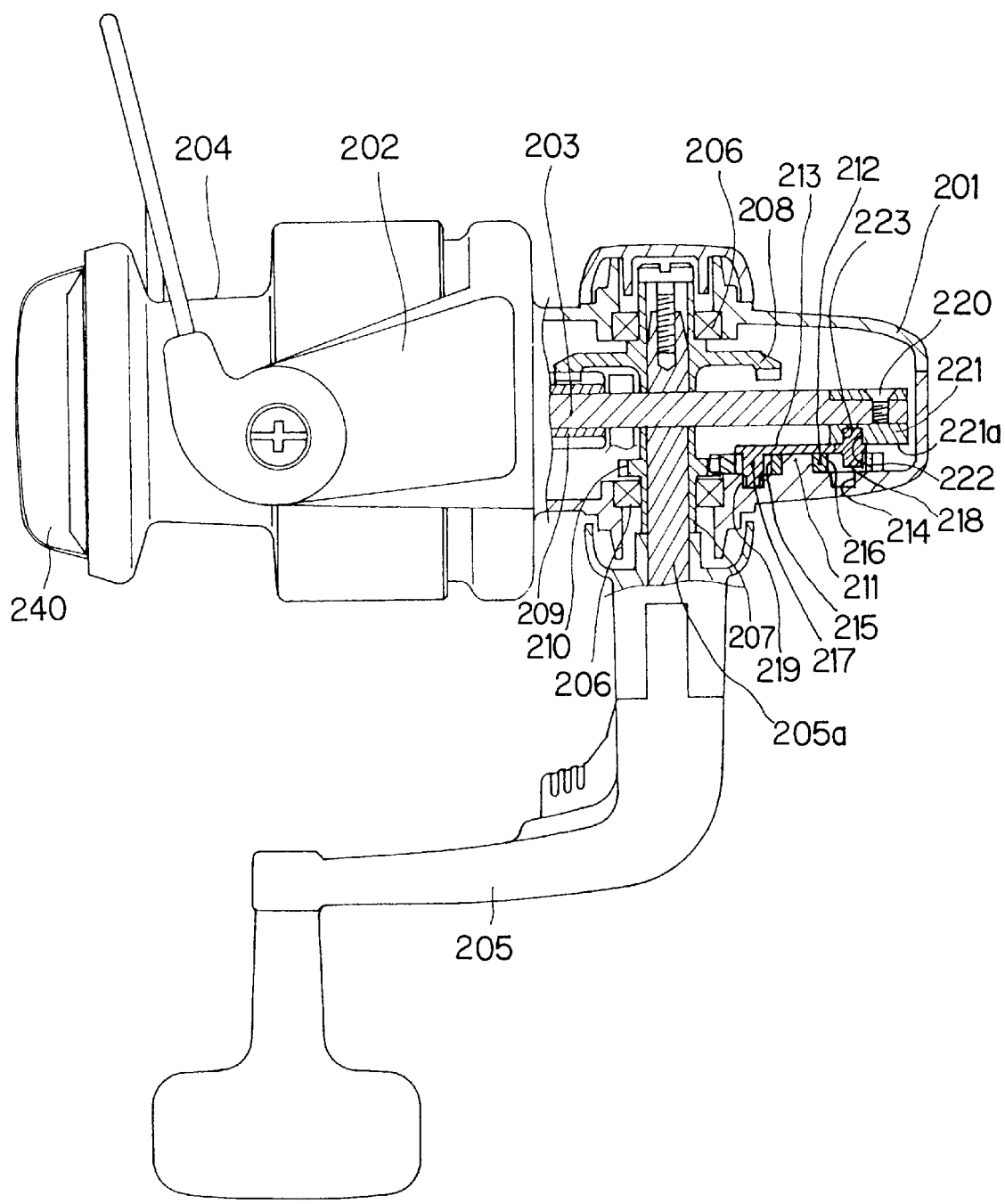
FIG. 42 is a side view, partially in section, of a fishing reel according to a twenty-third embodiment of the present invention.
Figure 43:
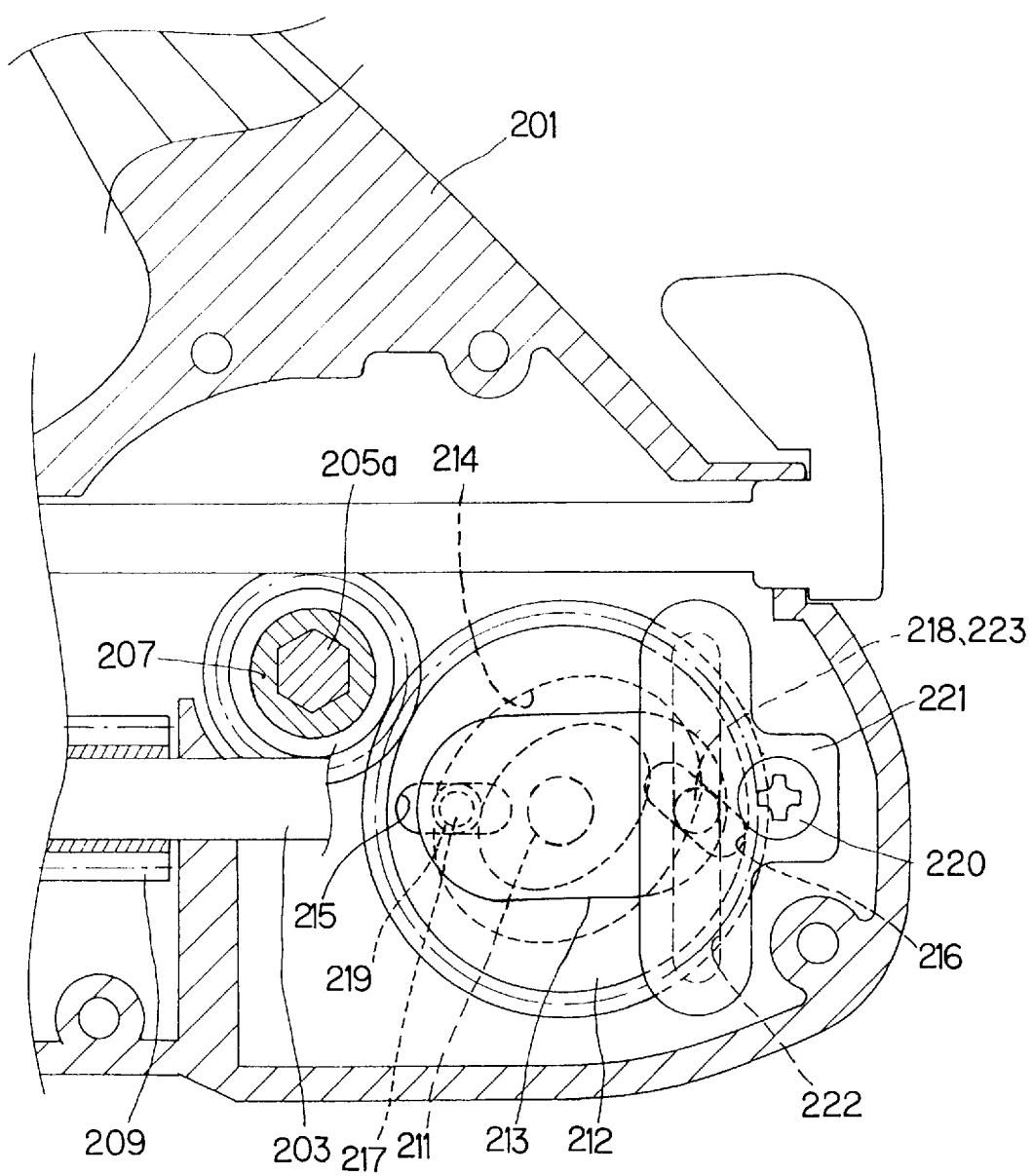
FIG. 43 is an enlarged partially sectional view showing an essential portion of the twenty-third embodiment.

FIGS. 42 and 43 represent a twenty-third embodiment of the fishing reel according to the present invention.

With reference to FIGS. 42 and 43, the fishing reel shown comprises a reel body 201 mounted to a fishing rod, a rotational frame 202 supported to the front portion of the reel body 201 to be rotatable, a spool shaft 203 supported by the reel body 201 to be slidable in the axial direction thereof, a spool 204 disposed in front of the rotational frame 202 and mounted to the front end portion of the spool shaft 203 through a drug knob 240 so as not to be come off therefrom, and a handle lever 205 secured to the side surface of the reel body 201 through a handle shaft 205a. Further, it is to be noted that, in the illustration, the axial direction of the spool shaft 203 accords with the longitudinal direction of the reel body 201, the side of the spool shaft 203 to which the spool 204 is mounted is the front side thereof and the opposite side thereto is the rear side, and a direction normal to the axes of both the spool shaft 203 and the handle shaft 205a is the vertical direction of the reel body 201. These positional or directional relationships are of course the same as those in the illustrations of FIGS. 1 and 16 though not mentioned particularly.

The handle shaft 205a is inserted into a hollow handle shaft 207 supported to the reel body 201 through a bearing 206 to be rotatable together with the handle shaft 207. A master gear 208 is formed to one end portion (upper end portion as viewed in FIG. 42) of the handle shaft 207, and the master gear 208 is meshed with a pinion 209, which is coupled with the rotational frame 202 to be rotatable about the spool shaft 203. According to this structure, when the handle lever 205 is rotated by an operator, the rotation thereof is transferred to the rotational frame 202 to rotate the same through the handle shaft 205a, the handle shaft 207, the master gear 208 and the pinion 209 in this order.

Figure 45:
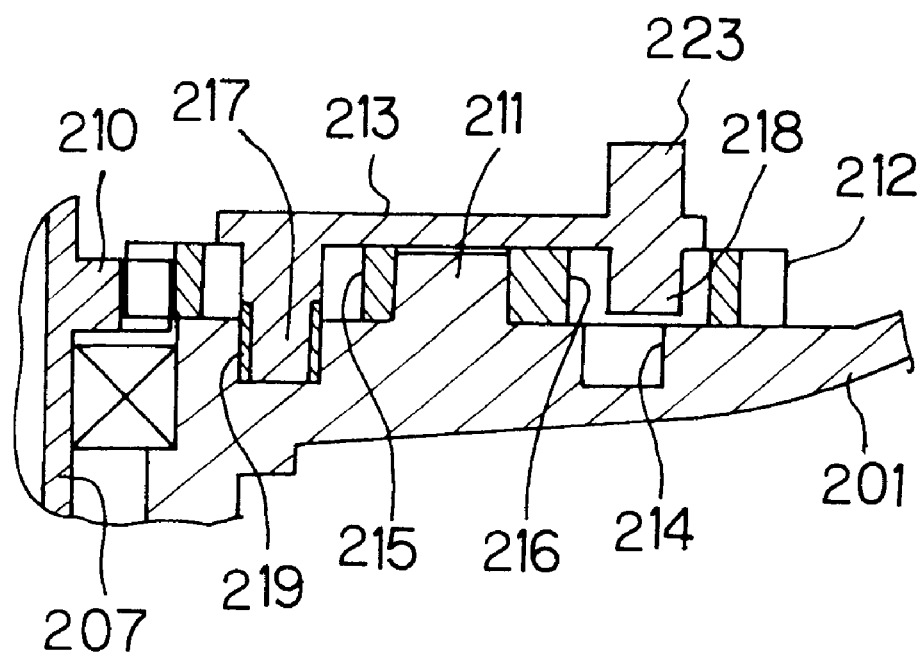
FIG. 45 is a sectional view taken along the line XXXXV—XXXXV in FIG. 44A.

A coupling gear 210 is formed integrally to the other end portion (lower end portion as viewed in FIG. 42) of the handle shaft 207, and the coupling gear 210 is meshed with an oscillator gear 212 supported to be rotatable by the rotational shaft 211 projecting from the side wall of the reel body 201. As shown in FIG. 45, a rotational plate 213 is disposed along with the side surface of the oscillator gear 212. A wall portion of the reel body 201 facing the oscillator gear 212 is formed with a cam groove 214 having substantially an elliptical shape so as to surround the rotational shaft 211. The oscillator gear 212 is formed with a pin guide groove 215 for guiding the pin so as to penetrate the oscillator gear 212 in the axial direction of the rotational shaft 211 and also formed with a pivotal slot 216. A cam pin 217 and a engaging projection 218 are integrally formed to the rotational plate 213 so as to be engaged with the slots 215 and 216 in a slidable manner.

The front end portion of the cam pin 217 penetrates the pin guide slot 215 and is engaged with the cam groove 214 to be slidable, and a collar 219 is mounted to this engaging portion. The collar 219 is formed of a material softer than that of the reel body 201. For example, when the reel body 201 is formed of an aluminum material, the collar 219 may be formed of a polyacetal material having mechanical strength lower than that of the aluminum and lubricating ability higher than that thereof. According to the location of the collar 219, the cam pin 217 does not directly contact the cam groove 214, thereby improving the lubricating ability and preventing the cam groove 214 and the cam pin 217 from being worn. Nylon or vinyl chloride may be utilized in substitution for the polyacetal.

As shown in FIGS. 42 and 43, an oscillator 221 is mounted to the rear end of the spool shaft 203 by a screw 220, and the oscillator 221 has a side surface 221a facing the rotational plate 213. A vertical groove 222 is formed to the side surface 221a of the oscillator 221 so as to extend in the vertical direction thereof, and an oscillator drive pin 223 formed to the rotational plate 213 is engaged with the vertical groove 222 to be slidable.

Figure 44A:
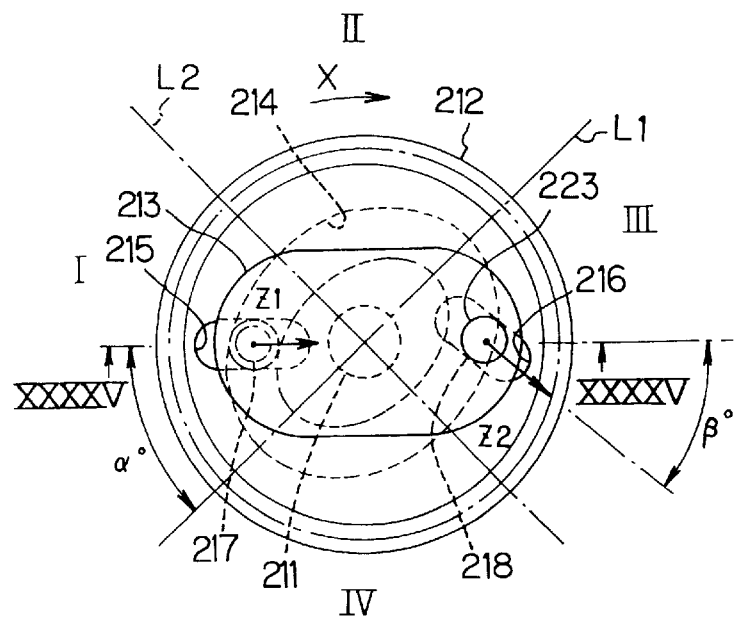
FIGS. 44A and 44B are views showing positional relationship between a cam groove, an oscillator and a rotational plate of the twenty-third embodiment.
Figure 44B:
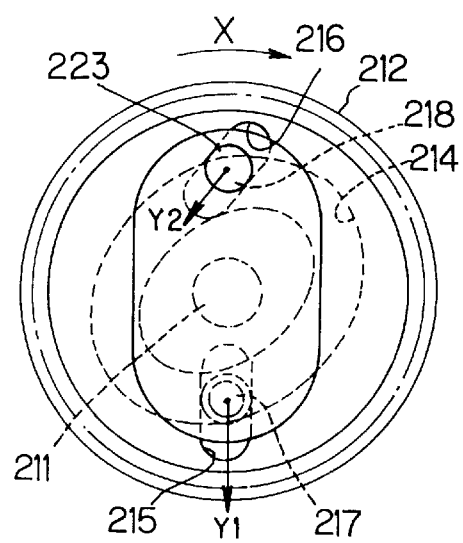

FIGS. 44 and 45 show the relationships among the pin guide slot 215 formed to the oscillator gear 212, the slot 216, the cam groove 214 formed to the reel body 201, the cam pin 217, the engaging projection 218 and the oscillator drive pin 223 which are formed to the rotational plate 213. The slot 216 is for the pivotal motion, thus being called herein later a pivotal slot 216. The bilateral direction in FIG. 44 corresponds to the longitudinal direction of the reel. FIG. 43A shows a state that the oscillator 221 is positioned at the most rear end portion in its movable range and FIG. 43B shows a state that the oscillator 221 is positioned at the intermediate portion in its movable range.

As can be seen from FIGS. 43A and 43B, the cam groove 214 is formed such that the long axis direction L1 thereof inclines by an angle α (for example, 45°) in a direction opposite to the rotation direction X of the oscillator gear 212 with respect to the longitudinal direction of the reel. The pin guide slot 215 is formed so that the longitudinal direction thereof is coincident with the radial direction of the oscillator gear 212. The pivotal slot 216 is formed such that the long axis direction thereof crosses obliquely by an angle β with respect to the radial direction of the oscillator gear 212, and the inclined direction of the pivotal slot 216 is set so that the outer peripheral side thereof goes ahead in the rotation direction X of the oscillator gear 212 with respect to the central side thereof. As shown in FIG. 45, the engaging projection 218 is formed so as to be shifted in angle of about 180° in the circumferential direction with respect to the cam pin 217. The engaging projection 218 and the oscillator drive pin 223 are projected in directions opposed to each other from the same position with respect to the circumferential direction of the rotational plate 213.

According to the structure described above, the spool 204 is driven in the longitudinal direction thereof in the following manner.

That is, when the handle lever 205 is rotated by an operator, the rotation of the handle lever 205 is transferred to the oscillator gear 212 through the handle shaft 205a and the coupling gear 210 to thereby rotate the oscillator gear 212 around the rotational shaft 211 in the clockwise direction (in the direction X in FIG. 44). At this time, the cam pin 217 engaged with the pin guide slot 215 of the oscillator gear 212 is slid in the pin guide slot 215 while swinging elliptically around the rotational shaft 211 along the cam groove 214. According to this motion, the rotational plate 213 integral with the cam pin 217 is slid and is rotated in positive or reverse direction with respect to the oscillator gear 212 in association with the sliding motion of the oscillator drive pin 223 within the pivotal slot 216, and then the oscillator drive pin 223 is moved integrally with the rotational plate 213 while sliding vertically in the vertical groove 222 formed to the oscillator 221. Since the oscillator 221 is fixed to the rear end of the spool shaft 203 to be capable of being moved only in the longitudinal direction of the spool shaft 203, only the longitudinal direction motion of the oscillator drive pin 223 is transferred to the oscillator 221, and hence, the spool 204 is moved in the longitudinal direction through the oscillator 221 and the spool shaft 203.

As shown in FIG. 44A, the peripheral surrounding of the rotational shaft 211 is sectioned in four quadrants I, II, III and IV by the long and short axes L1 and L2 of the cam groove 214. In the quadrants I and III, the cam pin 217 moves in the cam groove 214 from the long axis direction L1 towards the short axis direction L2 and, at the same time, moves so as to approach the rotational shaft 211 as shown with an arrow Z1 in the pin guide slot 215. Accordingly, the engaging projection 218 moves so as to be pushed out of the outer peripheral side of the oscillator gear 212 while being guided by the pivotal slot 216 as indicated by an arrow Z2, and in this time, since the pivotal slot 216 is formed in an inclined shape, the rotational plate 213 is relatively rotated (positive rotation) in the rotation direction X with respect to the oscillator gear 212. Therefore, in the quadrants I and III, the moving amount of the oscillator drive pin 223 can be increased with respect to the rotation angle of the oscillator gear 212.

Next, in the quadrants II and IV, the cam pin 217 moves in the cam groove 214 from the short axis direction L2 towards the long axis direction L1 and, at the same time, moves in a direction apart from the rotational shaft 211 as shown with an arrow Y1 in the pin guide slot 215. Accordingly, the engaging projection 218 moves so as to be pulled into the central side of the oscillator gear 212 while being guided by the pivotal slot 216 as indicated by an arrow Y2, and in this time, since the pivotal slot 216 is formed in an inclined shape, the rotational plate 213 is relatively rotated (reverse rotation) to the rotation direction X with respect to the oscillator gear 212. Therefore, in the quadrants II and IV, the moving amount of the oscillator drive pin 223 can be decreased with respect to the rotation angle of the oscillator gear 212.

Figure 65:
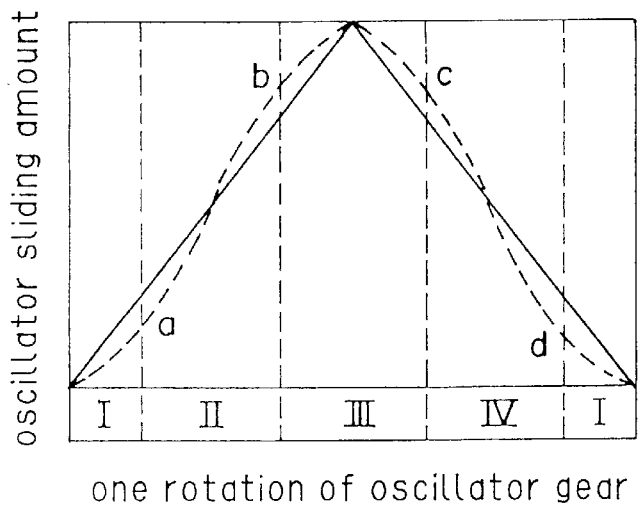
FIG. 65 is a diagram showing relationship between oscillator sliding amount and oscillator gear rotation angle of the twenty-third embodiment.
Figure 66:
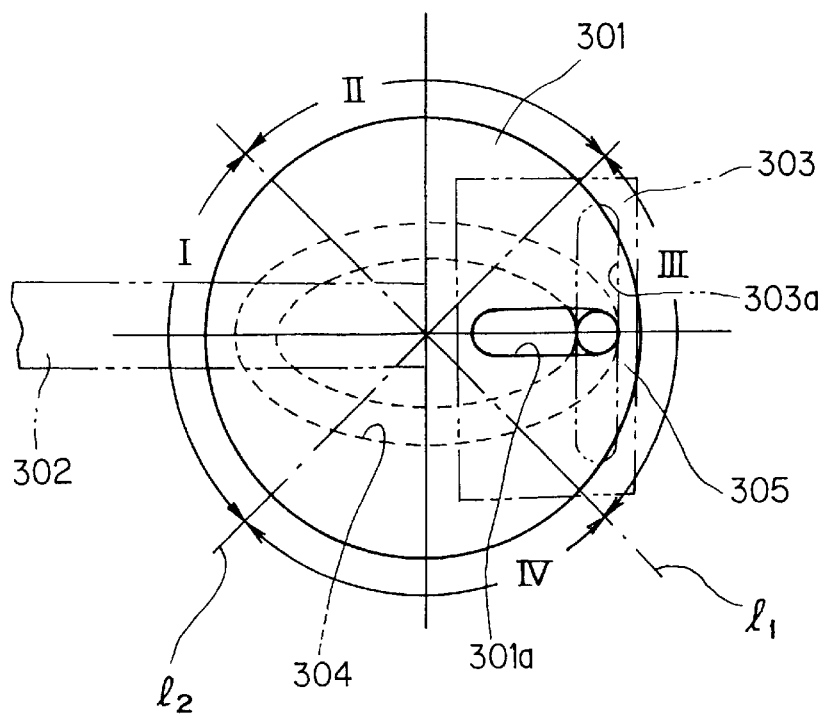
FIG. 66 is a view showing a sliding mechanism of a fishing reel of a conventional example.

Since the moving amount of the oscillator drive pin 223 is adjusted as mentioned above, the motion of the oscillator 221 engaged with the oscillator drive pin 223 approaches a constant motion shown by the solid line n in FIG. 65. That is, in the quadrants II and IV in which the oscillator drive pin 223 moves from the point a toward the point b, the slide motion of the oscillator 221 approaches to the solid line n from the broken line m indicating the motion of the prior mechanism due to the decrease of the moving amount of the rotational plate 213. Also, in the quadrants I and III in which the oscillator drive pin 223 moves from the point b toward the point c, the slide motion of the oscillator 221 approaches to the solid line n from the broken line m due to the increase of the moving amount of the rotational plate 213. Therefore, oscillator 221 can perform the reciprocal motion at a substantially constant velocity.

The modified embodiments of the present invention will be further described hereunder with reference to plan and sectional views corresponding to FIGS. 44 and 45, in which like reference numerals are added to members or portions corresponding to those of FIGS. 42 to 45.

Twenty-fourth Embodiment

Figure 46A:
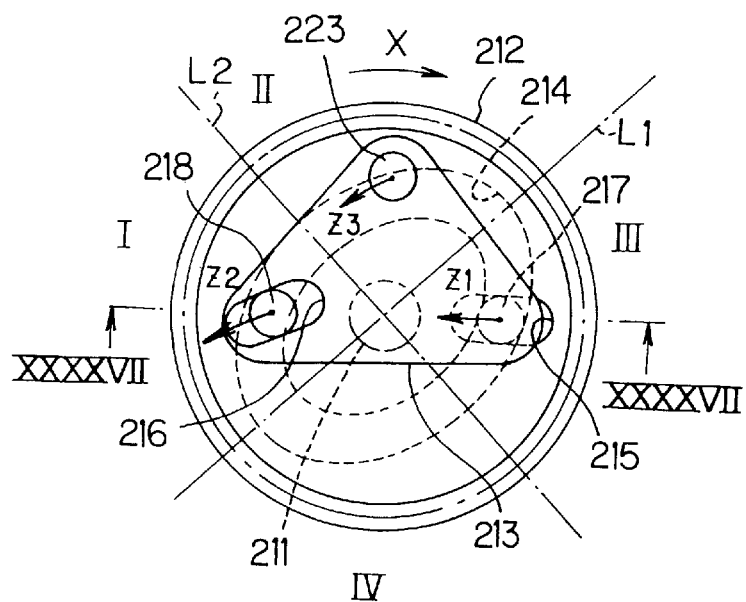
FIGS. 46A and 46B are views showing positional relationship between a cam groove, an oscillator and a rotational plate of a twenty-fourth embodiment of the present invention.
Figure 46B:
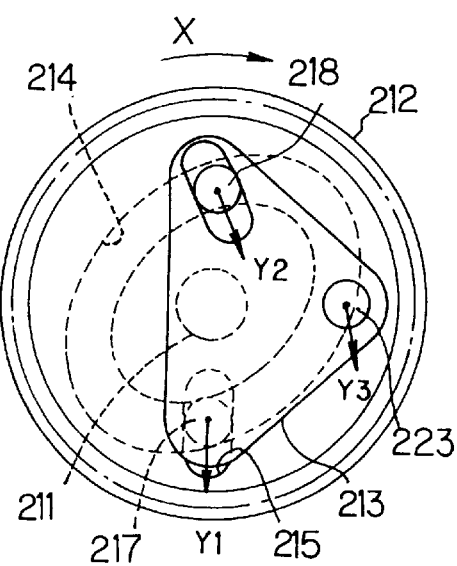
Figure 47:
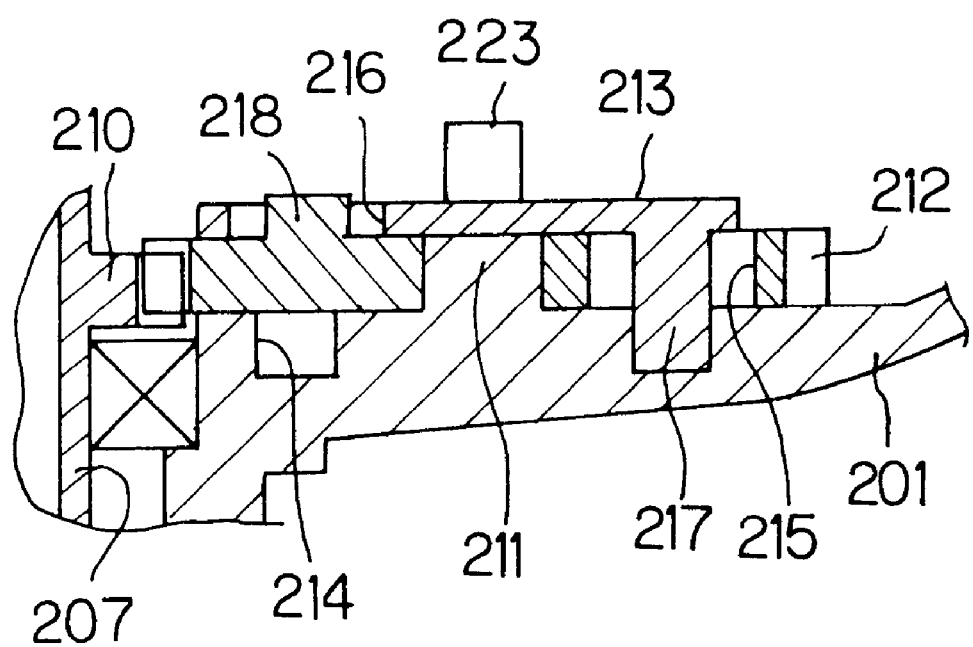
FIG. 47 is a sectional view taken along the line XXXXVII—XXXXVII in FIG. 46A.

FIGS. 46 and 47 represent a twenty-fourth embodiment of the present invention, which differs from the twenty-third embodiment in that the pivotal slot 216 is formed to the rotational plate 213 and the engaging projection 218 is formed to the oscillator gear 212.

In this embodiment, the pin guide slot 215 is formed so that the longitudinal direction thereof accords with the radial direction of the oscillator gear 212 and the pivotal slot 216 is formed so that the longitudinal direction thereof crosses obliquely the radial direction of the oscillator gear 212. The inclined direction of the pivotal slot 216 is set so that the outer peripheral side thereof is retired, with respect to the central side thereof, to a direction opposite to the rotation direction X of the oscillator gear 212. The oscillator drive pin 223 is arranged to a position displaced in the circumferential direction with respect to both the cam pin 217 and the engaging projection 218. FIG. 46A shows a state that the oscillator 221 is in the intermediate position in its movable range and FIG. 46B shows a state that the oscillator 221 is at the most rear end position in its movable range.

According to this embodiment, when the oscillator drive pin 223 is in the quadrants II and IV, the cam pin 217 approaches the rotational shaft 211 as shown by the arrow Z1 along the pin guide slot 215. Therefore, in the engagement of the engaging projection 218 with the pivotal slot 216, the rotational plate 213 is pushed out to the outer peripheral side as shown by the arrow Z2 along the longitudinal direction of the pivotal slot 216. As a result, the oscillator drive pin 223 is rotated relatively in a direction reverse to the rotation direction X with respect to the oscillator gear 212 as shown by the arrow Z3, and accordingly, the moving amount of the oscillator drive pin 223 with respect to the rotation angle of the oscillator gear 212 can be reduced.

Furthermore, when the oscillator drive pin 223 is in the quadrants I and III, the cam pin 217 is moved in a direction apart from the rotational shaft 211 as shown by the arrow Y1 along the pin guide slot 215. Therefore, in the engagement of the engaging projection 218 with the pivotal slot 216, the rotational plate 213 is pulled into the central portion side as shown by the arrow Y2 along the longitudinal direction of the pivotal slot 216. As a result, the oscillator drive pin 223 is rotated relatively in the rotation direction X with respect to the oscillator gear 212 as shown by the arrow Y3, and accordingly, the moving amount of the oscillator drive pin 223 with respect to the rotation angle of the oscillator gear 212 can be increased.

Twenty-fifth Embodiment

Figure 48A:
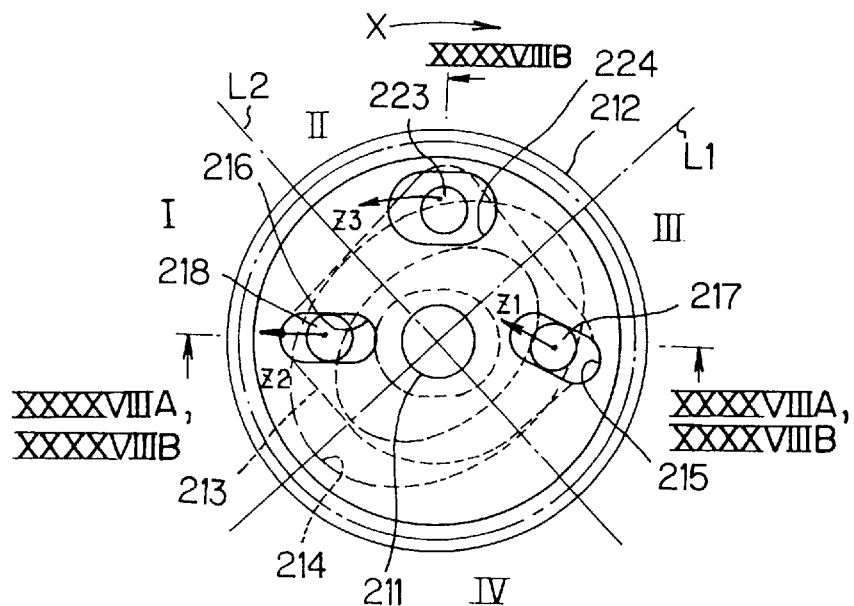
FIGS. 48A and 48B are views showing positional relationship between a cam groove, an oscillator and a rotational plate of a twenty-fifth embodiment of the present invention.
Figure 48B:
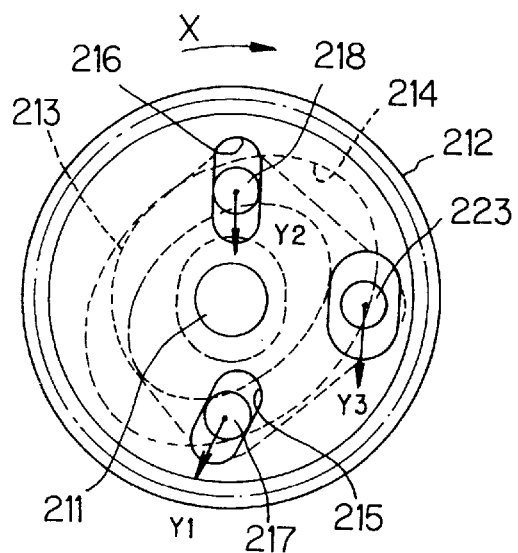
Figure 49A:
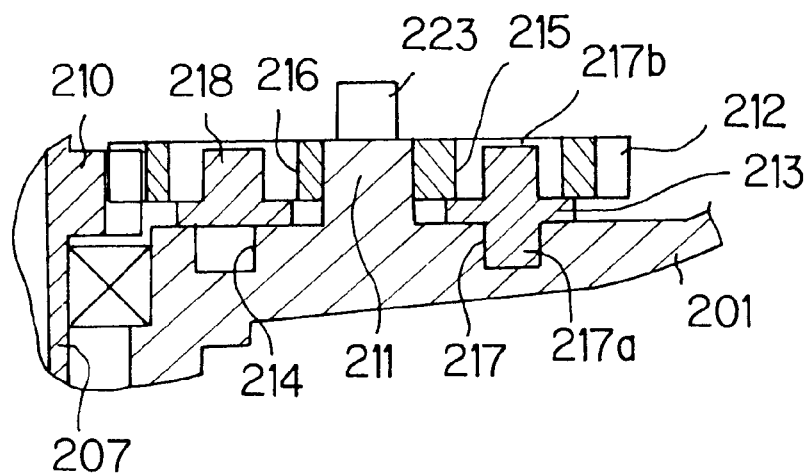
FIGS. 49A and 49B are sectional views taken along the lines XXXXIXA—XXXXIXA and XXXXIXB—XXXXIXB in FIG. 48A.
Figure 49B:
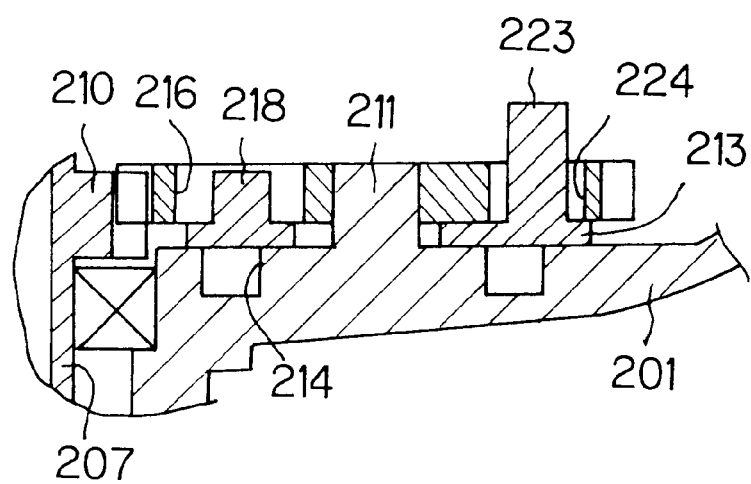

FIGS. 48 and 49 represent a twenty-fifth embodiment of the present invention, which aims to achieve stable maintenance and operation of the rotational plate 213 by putting the rotational plate 213 between the reel body 201 and the oscillator gear 212. In this embodiment, the cam pin 217 is located so as to penetrate the rotational plate 213 in a direction parallel to the axis of the rotational shaft 211 and so that one end 217a of the cam pin 217 is engaged with the cam groove 214 and the other end 217b is engaged with the pin guide slot 215, respectively, in a slidable fashion. The pin guide slot 215 is arranged so as to cross obliquely the radial direction of the oscillator gear 212 and the inclined direction thereof is set so that the outer peripheral side thereof goes ahead in the rotation direction X of the oscillator gear 212 with respect to the central side. The pivotal slot 216 is formed to the oscillator gear 212 and the longitudinal direction of the pivotal slot 216 accords with the radial direction of the oscillator gear 212. The engaging projection 218 formed to the rotational plate 213 is engaged with the pivotal slot 216 to be slidable.

The oscillator drive pin 223 is disposed in a manner displaced in the circumferential direction with respect to both the cam pin 217 and the engaging projection 218 so as to project to the side (not to contact the rotational plate 213) opposite to the oscillator gear 212 through a loose hole 224 formed to the oscillator gear 212. This projected portion of the oscillator drive pin 223 is engaged with the vertical groove of the oscillator 221 to be slidable as in the twenty-third embodiment. FIG. 48A shows a state that the oscillator 221 is in the intermediate portion in its movable range and FIG. 48B shows a state that the oscillator 221 is in the most rear end position in its movable range. The loose hole 224 is formed to have a sufficiently large diameter so as not to contact the oscillator drive pin 223 even in a case where the cam pin 217 is disposed at any position in the cam groove 214.

According to this embodiment, when the oscillator drive pin 223 is in the quadrants II and IV, the cam pin 217 approaches the rotational shaft 211 as shown by the arrow Z1 along the pin guide slot 215. Therefore, the engaging projection 218 is pushed out to the outer peripheral side as shown by the arrow Z2 along the longitudinal direction of the pivotal slot 216. As a result, the oscillator drive pin 223 is rotated relatively in a direction reverse to the rotation direction X with respect to the oscillator gear 212 as shown by the arrow Z3, and accordingly, the moving amount of the oscillator drive pin 223 with respect to the rotation angle of the oscillator gear 212 can be reduced.

Furthermore, when the oscillator drive pin 223 is in the quadrants I and III, the cam pin 217 is moved apart from the rotational shaft 211 as shown by the arrow Y1 along the pin guide slot 215. The engaging projection 218 is pulled into the central side as shown by the arrow Y2 along the longitudinal direction of the pivotal slot 216. As a result, the oscillator drive pin 223 is rotated relatively in the rotation direction X with respect to theoscillator gear 212 as shown by the arrow Y3, and accordingly, the moving amount of the oscillator drive pin 223 with respect to the rotation angle of the oscillator gear 212 can be increased.

Twenty-sixth Embodiment

Figure 50A:
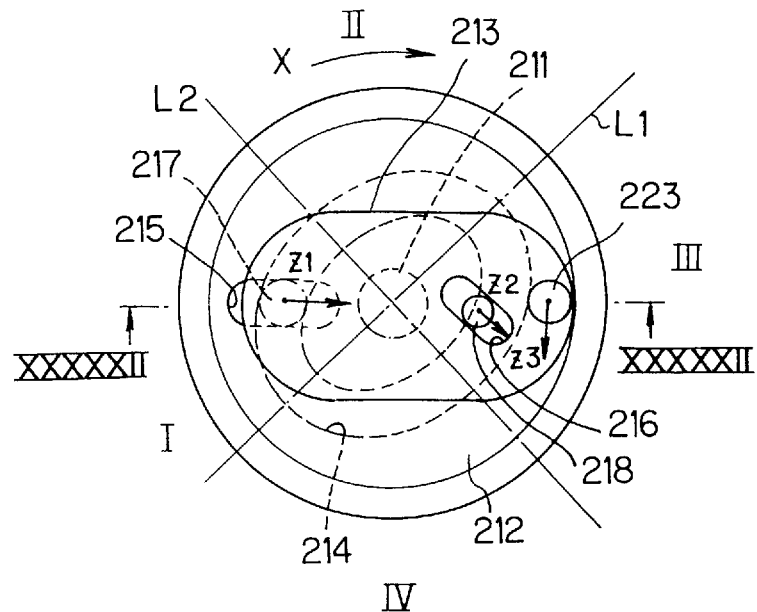
FIGS. 50A and 50B are views showing positional relationship between a cam groove, an oscillator and a rotational plate of a twenty-sixth embodiment of the present invention.
Figure 50B:
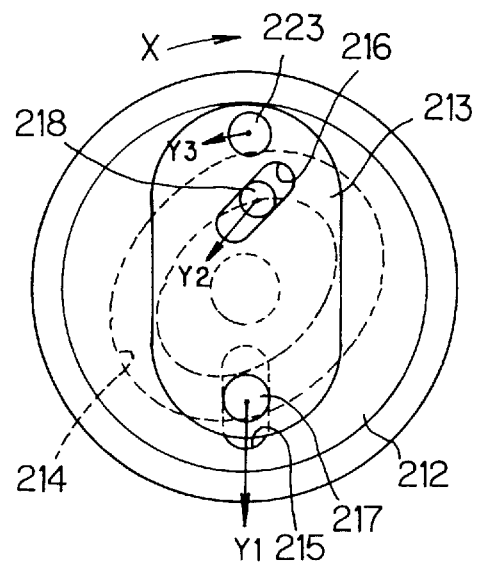
Figure 51:
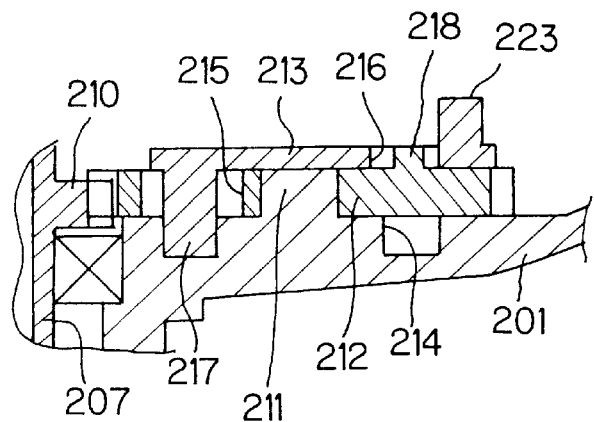
FIG. 51 is a sectional view taken along the line XXXXXI—XXXXXI in FIG. 50A.

FIGS. 50 and 51 represent a twenty-sixth embodiment of the present invention, which is common to the twenty-fourth embodiment in the arrangement that the pivotal slot 216 is formed to the rotational plate 213 and the engaging projection 218 is formed to the oscillator gear 212 and which is different therefrom in the arrangement that the cam pin 217, the engaging projection 218 and the oscillator drive pin 223 are approximately aligned on the radial direction line of the oscillator gear 212.

In this embodiment, the pin guide slot 215 is formed such that the longitudinal direction thereof accords with the radial direction of the oscillator gear 212 and the pivotal slot 216 is formed such that the longitudinal direction thereof crosses obliquely the radial direction of the oscillator gear 212. Through the engagement of these slots 215 and 216 with the cam pin 217 and the engaging projection 218, the rotational plate 213 is rotated in the positive direction or the reverse direction relatively with respect to the oscillator gear 212, whereby the moving amount of the oscillator drive pin 223 with respect to the rotation angle of the oscillator gear 212 is increased or decreased. This function is substantially the same with those of the twenty-third to twenty-fifth embodiments.

Twenty-seventh Embodiment

Figure 52:
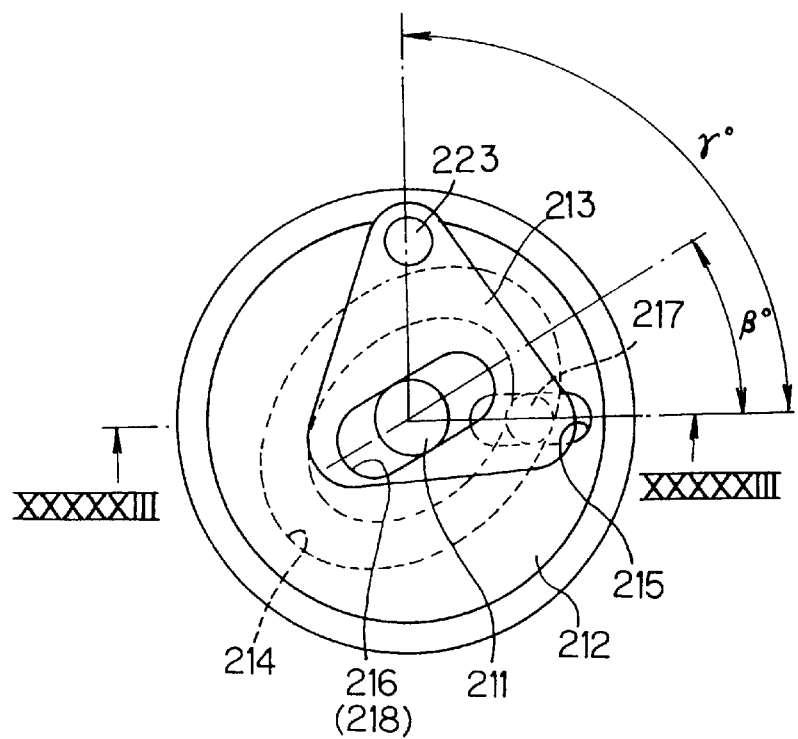
FIG. 52 is a view showing positional relationship between a cam groove, an oscillator and a rotational plate of a twenty-seventh embodiment of the present invention.
Figure 53:
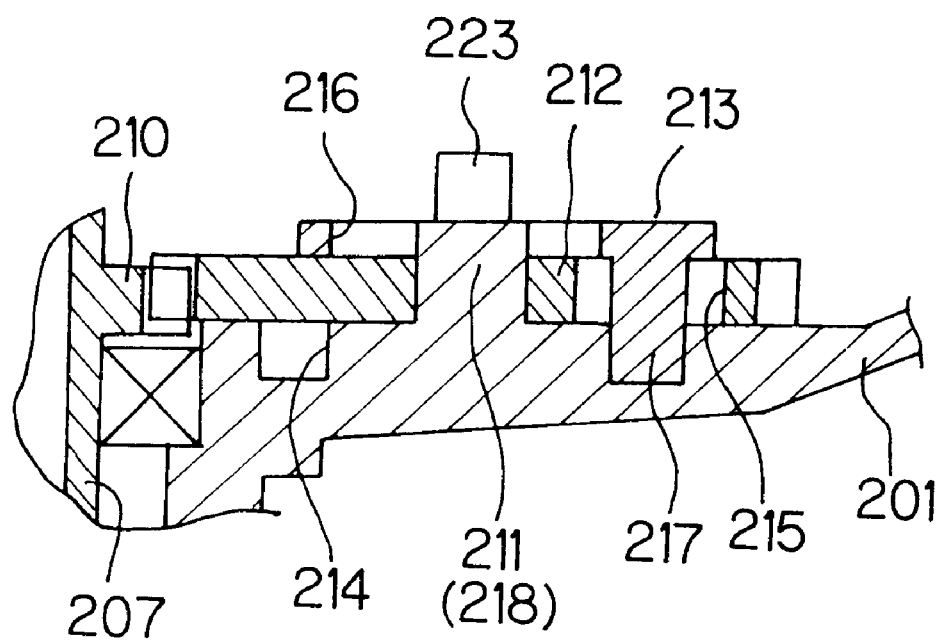
FIG. 53 is a sectional view taken along the line XXXXXIII—XXXXXIII in FIG. 52.

FIGS. 52 and 53 represent a twenty-seventh embodiment of the present invention, which is different from the twenty-third embodiment in the arrangement that the pivotal slot 216 is formed to the rotational plate 213 and the pivotal slot 216 is engaged with the rotational shaft 211 of the oscillator gear 212 to be slidable. That is, in this embodiment, the rotational shaft 211 has the function as the engaging projection 218 in the former embodiment. The pivotal slot 216 is formed so that the longitudinal direction thereof cross obliquely the radial direction of the oscillator gear 212. The inclined direction of the pivotal slot 216 has an angle β (less than 90°) to a side reverse to the rotation direction X of the oscillator gear 212 with respect to the pin guide slot 215. The oscillator drive pin 223 is formed to a position displaced by a predetermined angle γ in the same direction as the inclination of the pivotal slot 216 with respect to the cam pin 217.

In this arrangement, the rotational plate 213 is rotated in the positive or reverse direction with respect to the oscillator gear 212 through the engagement with the slots 215 and 216, and accordingly, the moving amount of the oscillator drive pin 223 is increased or decreased.

Twenty-eighth Embodiment

Figure 54A:
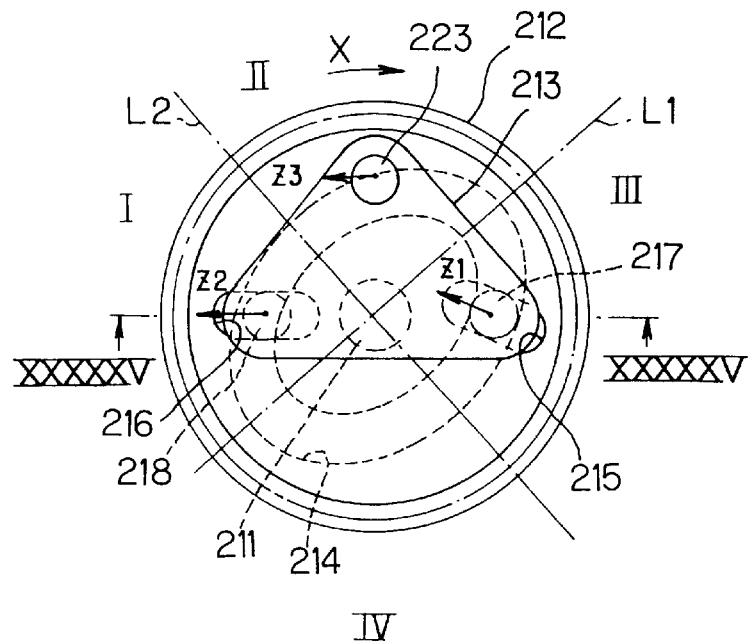
FIGS. 54A and 54B are views showing positional relationship between a cam groove, an oscillator and a rotational plate of a twenty-eighth embodiment of the present invention.
Figure 54B:
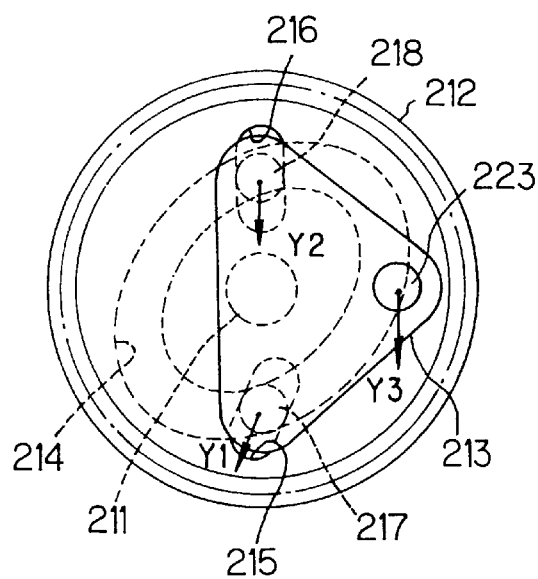
Figure 55:
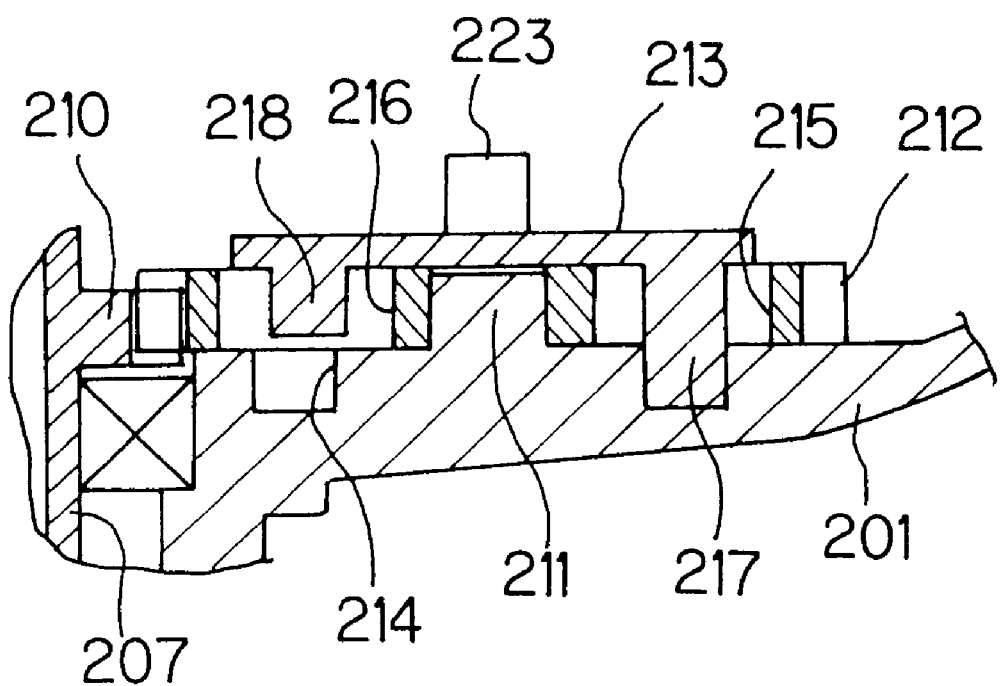
FIG. 55 is a sectional view taken along the line XXXXXV—XXXXXV in FIG. 54A.

FIGS. 54 and 55 represent a twenty-eighth embodiment of the present invention. In this embodiment, the rotational plate 213, which is disposed in the twenty-fifth embodiment of FIGS. 48 and 49, is shifted to a position between the oscillator gear 212 and the oscillator 221 from the position between the reel body 201 and the oscillator gear 212. According to this shifting of the rotational plate 213, the projecting directions of the cam pin 217 and the engaging projection 218 with respect to the rotational plate 213 are also changed to eliminate the formation of the loose hole 224 of the oscillator gear 212. The extending directions of the pin guide slot 215 and the pivotal slot 216 are the same as those in the twenty-fifth embodiment, and the circumferential arrangement of the cam pin 217, the engaging projection 218 and the oscillator drive pin 223 are also substantially the same as those in the twenty-fifth embodiment. Accordingly, the relative motion of the rotational plate 213 with respect to the oscillator gear 212 is also the same as that in the twenty-fifth embodiment.

Twenty-ninth Embodiment

Figure 56A:
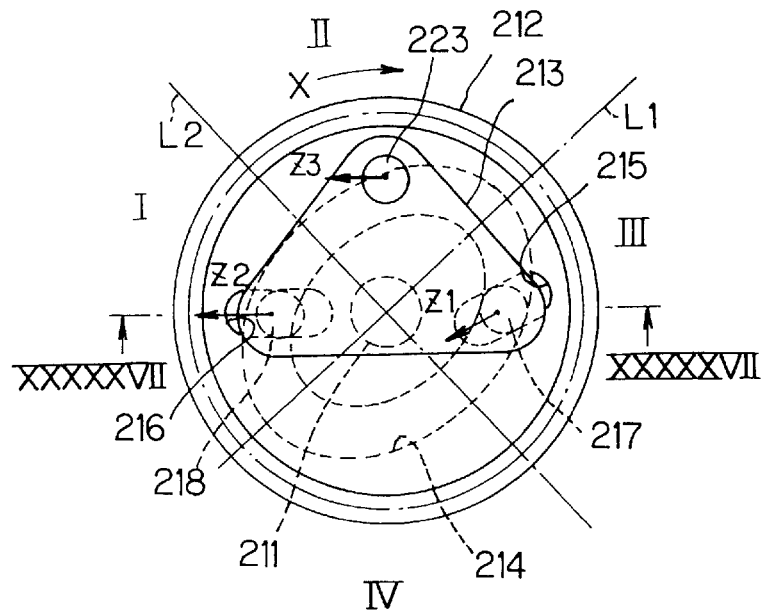
FIGS. 56A and 56B are views showing positional relationship between a cam groove, an oscillator and a rotational plate of a twenty-ninth embodiment of the present invention.
Figure 56B:
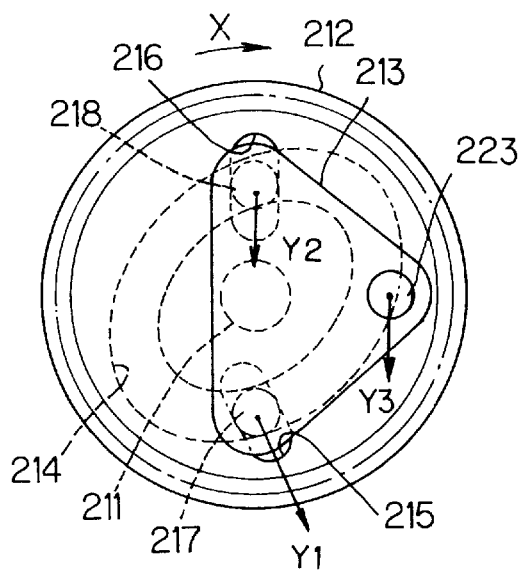
Figure 57:
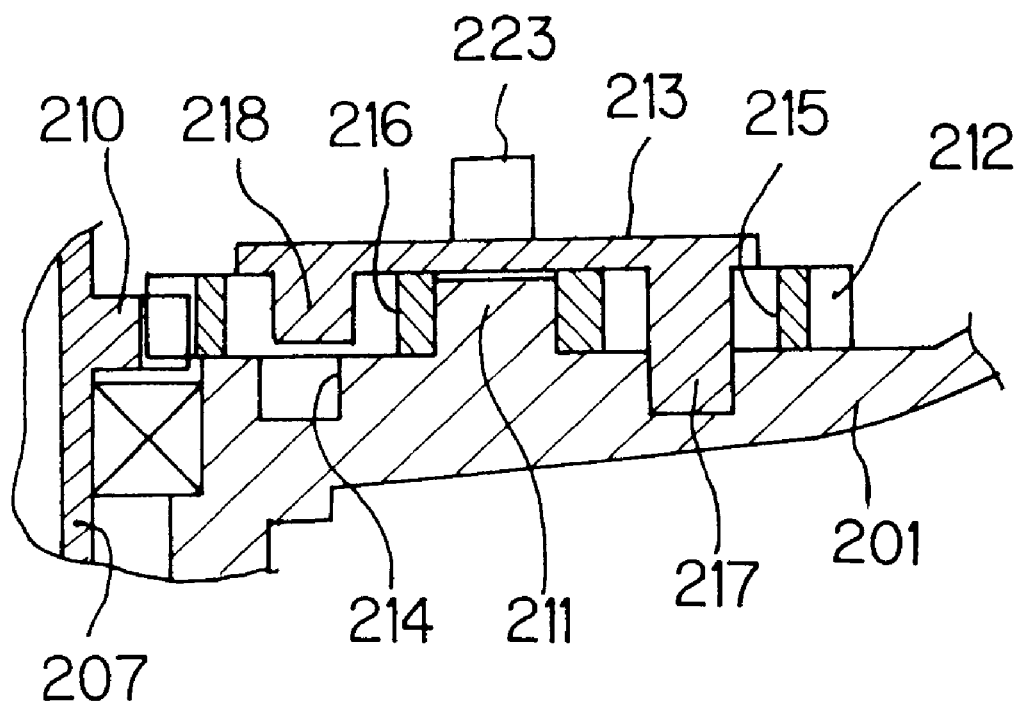
FIG. 57 is a sectional view taken along the line XXXXXVII—XXXXXVII in FIG. 56A.

FIGS. 56 and 57 represent a twenty-ninth embodiment of the present invention, in which the inclination of the pin guide slot 215 is made reverse to that in the twenty-eighth embodiment (FIGS. 54 and 55), and accordingly, when the oscillator drive pin 223 is in the quadrants I and III, the rotational plate 213 is rotated relatively to the rotation direction X with respect to the oscillator gear 212 and the moving amount of the oscillator drive pin 223 is increased. On the other hand, when the oscillator drive pin 223 is in the quadrants II and IV, the rotational plate 213 is rotated in the direction reverse to the rotation direction X and the moving amount of the oscillator drive pin 223 is decreased.

Thirtieth Embodiment

Figure 58A:
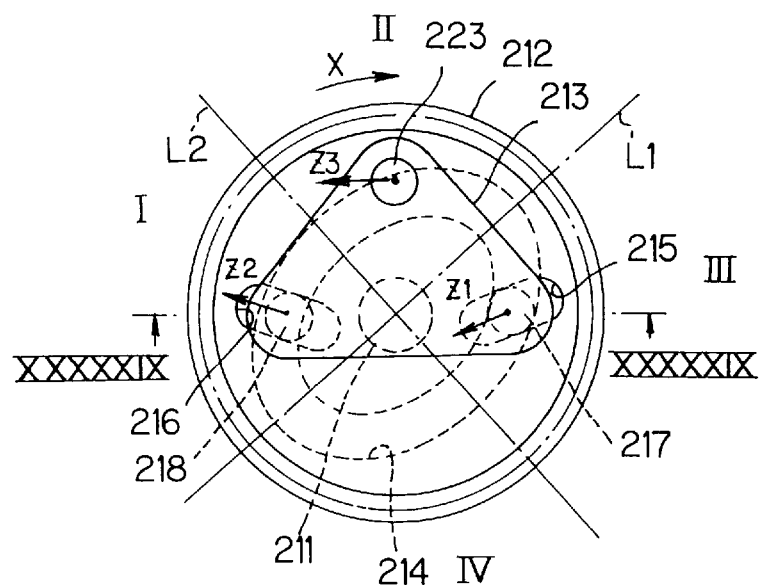
FIGS. 58A and 58B are views showing positional relationship between a cam groove, an oscillator and a rotational plate of a thirtieth embodiment of the present invention.
Figure 58B:
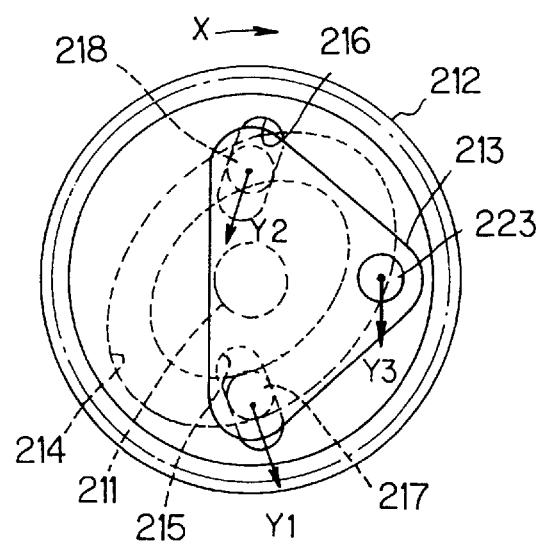
Figure 59:
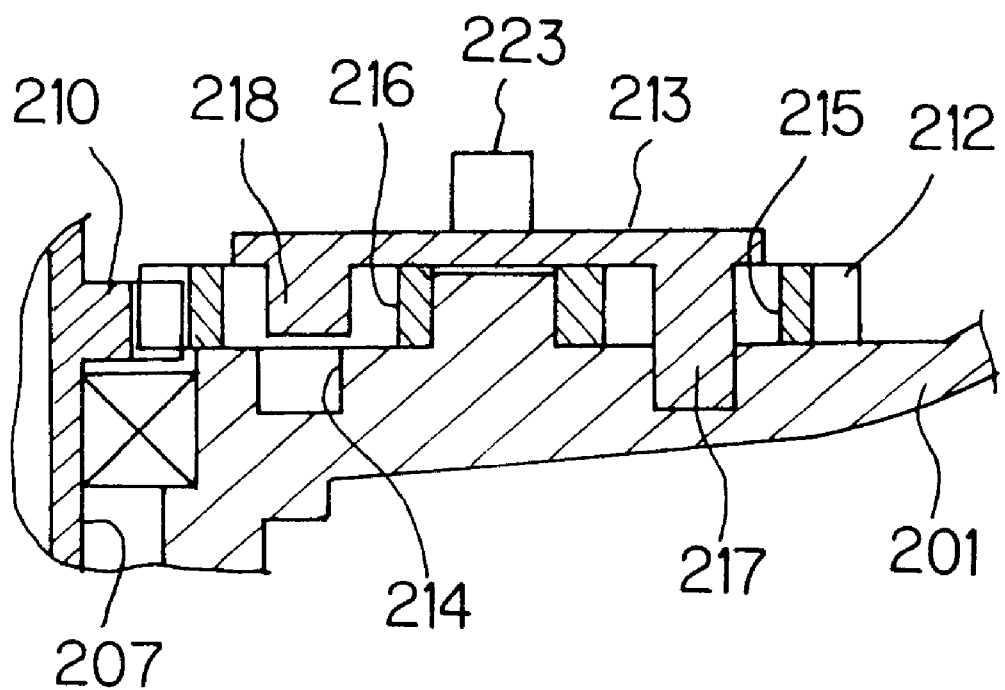
FIG. 59 is a sectional view taken along the line XXXXXXIX—XXXXXXIX in FIG. 58A.

FIGS. 58 and 59 represent a thirtieth embodiment of the present invention, which is different from the twenty-ninth embodiment in the arrangement that the pivotal slot 216 is formed to cross obliquely the radial direction of the oscillator gear 212.

In this thirtieth embodiment, when the oscillator drive pin 227 is in the quadrants I and III, the cam pin 217 is moved towards the rotation direction X while approaching the rotational shaft 211 as shown by the arrow Z1 in accordance with the inclination of the pin guide slot 215 and, accordingly, the engaging projection 218 is moved in the rotation direction X while departing from the rotational shaft 211 as shown by the arrow Z2 in accordance with the inclination of the pivotal slot 216. In this time, the oscillator drive pin 223 is rotated relatively to the rotation direction X with respect to the oscillator gear 212 as shown by the arrow Z3, but the moving amount of the oscillator drive pin 223 with respect to the rotational angle of the oscillator gear 212 is made further large in comparison with the case of the twenty-ninth embodiment.

When the oscillator drive pin 223 is in the quadrants II and IV, the cam pin 217, the engaging projection 218 and the oscillator pin 223 are moved as shown by the arrows Y1, Y2 and Y3, respectively, but the moving amount of the oscillator drive pin 223 is made further small in comparison with the case of the twenty-ninth embodiment. In this embodiment, the rotation amount of the rotational plate 213 can be adjusted in accordance with the inclination angle of the pin guide slot 215.

Thirty-first Embodiment

Figure 60A:
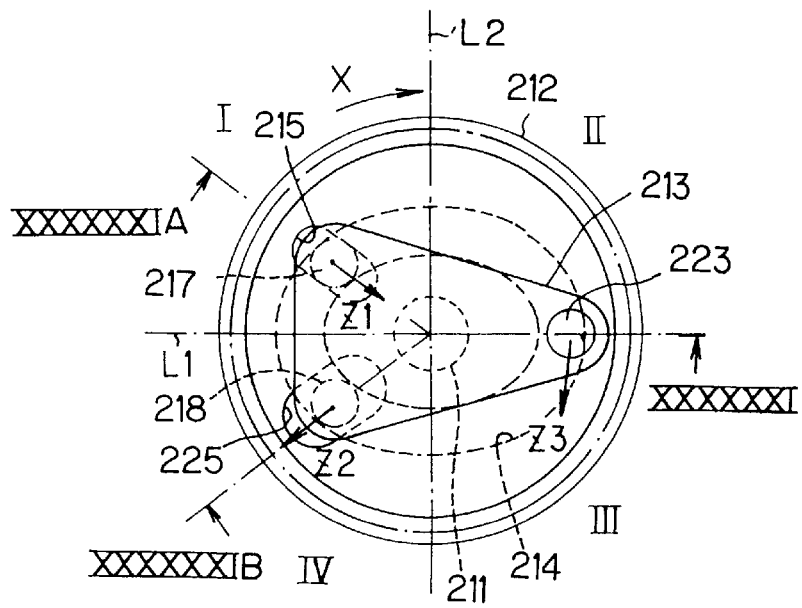
FIGS. 60A and 60B are views showing positional relationship between a cam groove, an oscillator and a rotational plate of a thirty-first embodiment of the present invention.
Figure 60B:
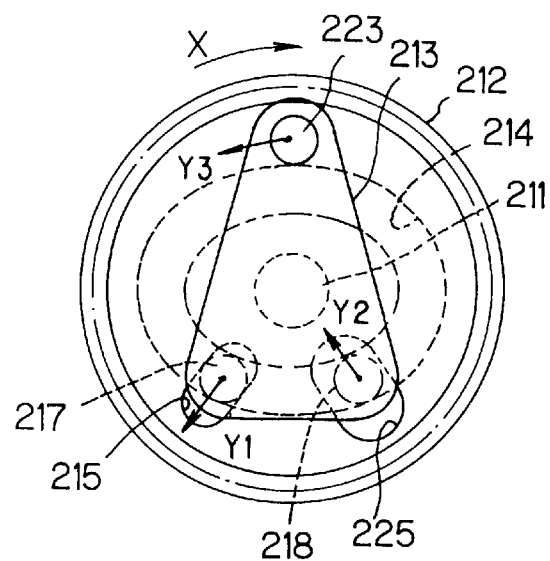
Figure 61A:
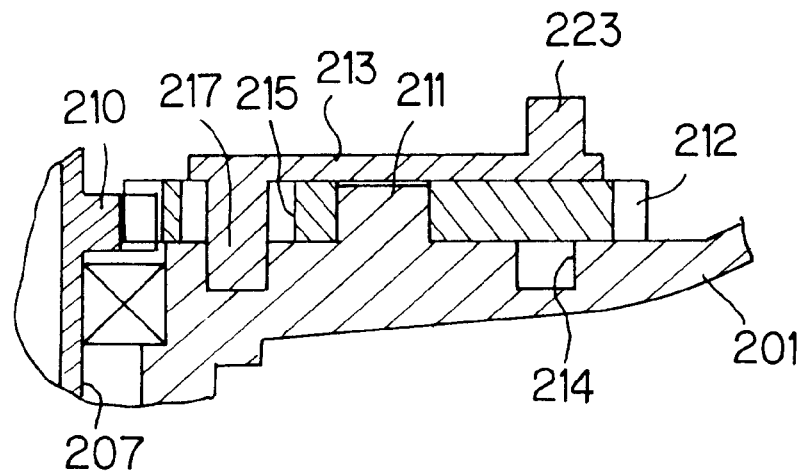
FIGS. 61A and 61B are sectional views taken along the lines XXXXXXIA—XXXXXXIA and XXXXXXIB—XXXXXXIB in FIG. 60A.
Figure 61B:
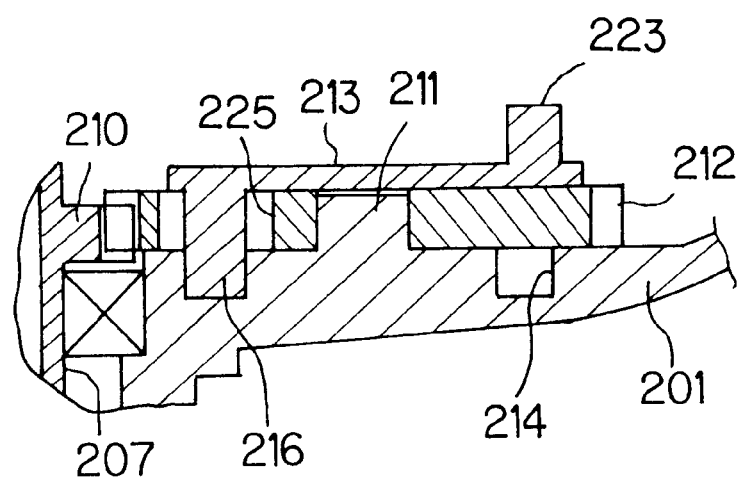

FIGS. 60 and 61 represent a thirty-first embodiment of the present invention, in which the long axis direction L1 of the cam groove 214 accords with the longitudinal direction of the reel. In this embodiment, the rotational plate 213 is provided with the cam pin 217, the engaging projection 218 and the oscillator drive pin 223 which are shifted in the circumferential direction thereof. The cam pin 217 penetrates the pin guide slot 215 of the oscillator gear 212 and is engaged with the cam groove 214 to be slidable, and the longitudinal direction of the pin guide slot 215 accords with the radial direction of the oscillator gear 212. Furthermore, the engaging projection 218 penetrates an escape hole 225 formed to the oscillator gear 212 and is engaged with the cam groove 214 to be slidable. The escape hole 225 has a diameter sufficient larger not to contact the engaging projection even if the cam pin 217 takes any position in the cam groove 214.

In this thirty-first embodiment, in the quadrants I and III, the cam pin 217 approaches the rotational shaft 211 along the pin guide slot 215 as shown by the arrow Z1. In this time, the engaging projection 218 is moved in the cam groove 214 from the short axis direction L2 to the long axis direction L1 so as to depart from the rotational shaft 211 as shown by the arrow Z2. Accordingly, the oscillator drive pin 223 is rotated relatively to the rotation direction X with respect to the oscillator gear 212 as shown by the arrow Z3, and hence, the moving amount of the oscillator drive pin 223 with respect to the rotational angle of the oscillator gear 212 is increased.

In the quadrants II and IV, the cam pin 217 is moved apart from the rotational shaft 211 as shown by shaft 211 as shown by the arrow Y1 along the pin guide slot 215 and the engaging projection 218 approaches the rotational shaft 211 as shown by the arrow Y2. As a result, the oscillator drive pin 223 is rotated relatively to the direction reverse to the rotation direction X with respect to the oscillator gear 212 as shown by the arrow Y3, and accordingly, the moving amount of the oscillator drive pin 223 is decreased.

Thirty-second Embodiment

Figure 62:
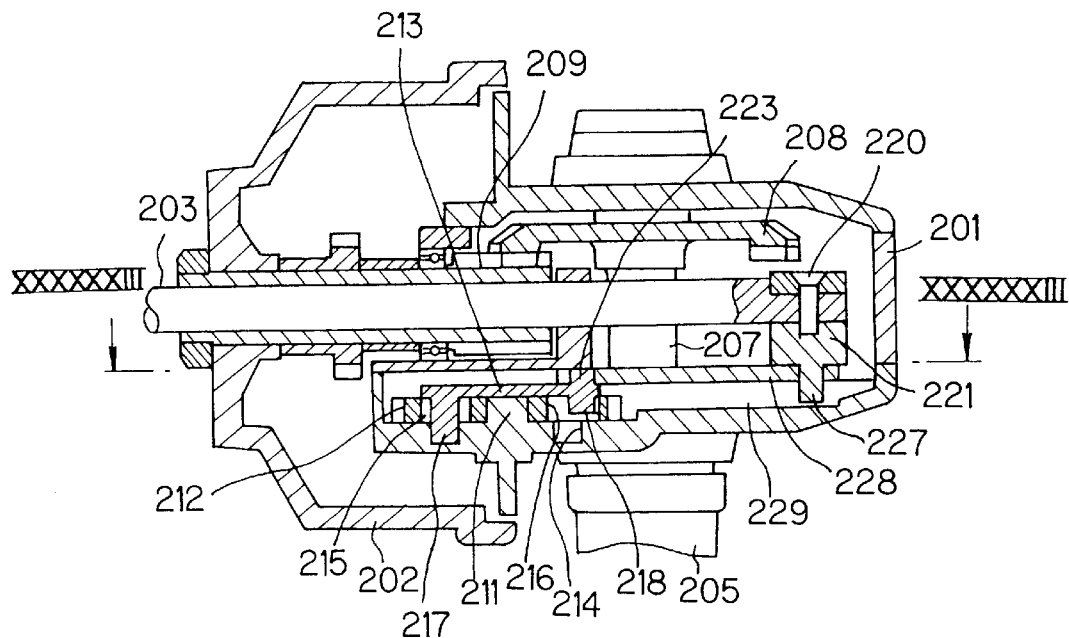
FIG. 62 is a sectional view of a fishing reel provided with a sliding mechanism according to a thirty-second embodiment of the present invention.
Figure 63:
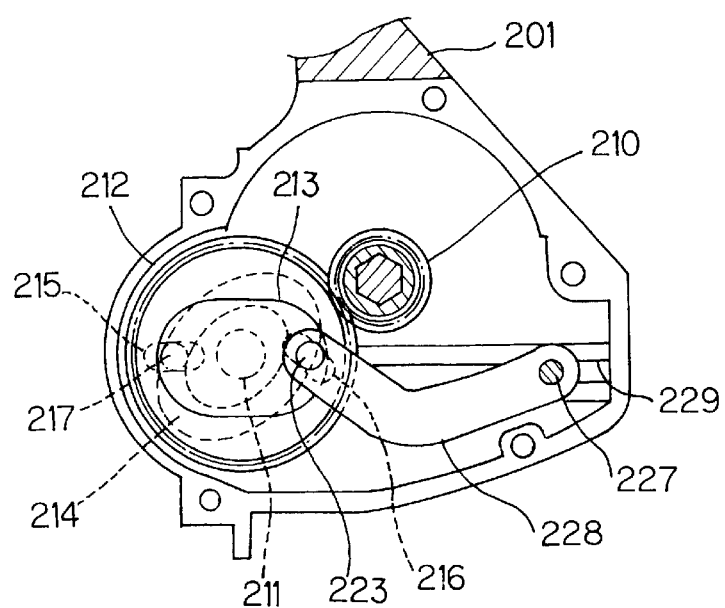
FIG. 63 is a sectional view taken along the line XXXXXXIII—XXXXXXIII in FIG. 62.

FIGS. 62 and 63 represent a thirty-second embodiment of the present invention, in which the oscillator gear 212 is arranged in front of the master gear 208. The oscillator 221 is formed with a pin 227 in place of the vertical groove 222 (FIG. 42), and the pin 227 is coupled with the oscillator drive pin 223 of the rotational plate 213 through a link 228. The reel body 201 is formed with a groove 229 for properly guiding the oscillator 221 in the longitudinal direction thereof and the front end of the pin 227 is inserted into the groove 229. The arrangements of the oscillator gear 212, the rotational plate 213, the cam groove 214, the pin guide slot 215, the cam pin 217 and the engaging projection 218 are substantially the same as those of the twenty-third embodiment.

According to this thirty-second embodiment, when the oscillator gear 212 is rotated, the rotational plate 213 is also rotated as in the twenty-third embodiment, and this rotating motion is transferred to the oscillator 221 through the oscillator drive pin 223, the link 228 and the pin 227, whereby the spool 204 carries out the reciprocal motion through the oscillator 221 and the spool shaft 203 in the longitudinal direction.

Thirty-third Embodiment

Figure 64:
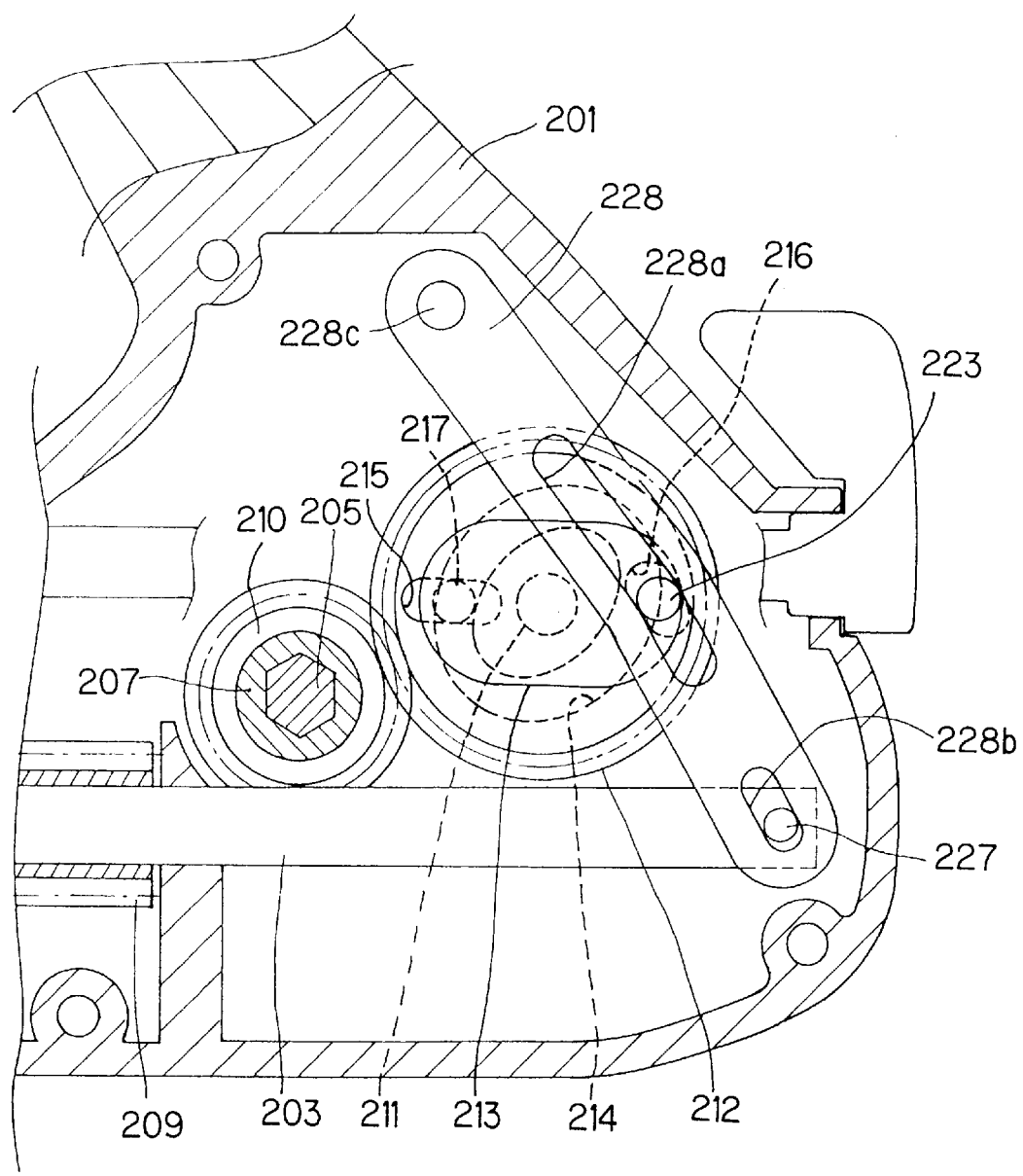
FIG. 64 is an enlarged partially sectional view of an essential portion of a thirty-third embodiment of the present invention.

FIG. 64 represents a thirty-third embodiment of the present invention, in which the oscillator drive pin 223 formed to the rotational plate 213 and the pin 227 formed to the oscillator 221 are slideably coupled with the link 228, which is supported to be swingable by a fulcrum pin 223c formed to the reel body 201, through the engagement thereof with slots 228b and 228a formed to the link 228. According to this structure, the motion of the oscillator drive pin 223 is converted into the sliding motion of the spool shaft 203 through the swing motion of the link 228 about the fulcrum pin 228c.

According to this embodiment, the sliding amount of the oscillator 221 can be increased or decreased by changing the distances between the fulcrum pin 228c and the oscillator drive pin 223 and between the fulcrum pin 228c and the pin 227, and therefore, the sliding amount of the spool 204 can be optionally adjusted by the width of the fishing line wind-up shell. Furthermore, by changing the inclination or shape of the slots 228b and 228a, the spool sliding speed can be partially adjusted in its slidable range. For example, by forming the slot 228a so as to have a bent shape, the sliding speed of the spool 204 can be changed at a portion after the bent portion from a portion before the bent portion. The link 228 may be formed to be swingable about the oscillator drive pin 223 or pin 227.

It is to be noted that, in the foregoing descriptions, many preferred embodiments of the present invention are described, but the present invention is not limited to these embodiments and many other changes, modifications and combinations may be made without departing from the scopes of the appended claims.

For example, in the twenty-fourth to thirty-third embodiments, the collar 219 (FIG. 45) may be disposed to the front end portion of the cam pin 217 and may be also disposed to the front ends of the engaging projection 218 and the oscillator drive pin 223. Furthermore, collars may be provided for the cam groove 214, the pin guide slot 215, the pivotal slot 216, the vertical groove 222 and the slots 228a and 228b. Still furthermore, a bearing member such as ball bearing may be provided to the front end of the cam pin 217, the engaging projection 218 or the oscillator drive pin 223 to further make smooth reciprocal motion of the spool 204.

Still furthermore, the portion of the reel body 201, to which the cam groove 214 is formed, may be formed of a hard material having an anti wearing property different from the material forming the other portion of the reel body 201. The portions of the oscillator gear 212, the rotational plate 213, the oscillator 221 and the link 228, to which the pin guide slot 215, the pivotal slot 216, the vertical groove 222 and the slots 228a, 228b are formed respectively, may be also formed of hard materials having an anti-wearing property different from the materials forming the other portions thereof. Alternatively, these grooves and slots may be covered by the materials having anti-wearing property.

The oscillator gear 212 may be constructed by coupling the oscillator gear 212 with the rotational shaft 211 and supporting the rotational shaft 211 to be rotatable by the reel body 201. In the twenty-third to thirty-third embodiments, except the twenty-fifth embodiment, the rotational plate 213 may be arranged between the reel body 201 and the oscillator 212.

According to the present invention, many advantages functions and effects over the prior art can be achieved as mentioned hereinbefore with respect to the respective preferred embodiments.

What is claimed is:

1. A spinning reel comprising:

a reel body casing;

a rotational frame member mounted on said reel body casing so as to be rotatable by means of a handle means supported on said reel body casing;

a spool shaft slideably mounted on a cylindrical shaft of said rotational frame member;

a spool secured to one end portion of said spool shaft;

an oscillator secured to another end portion of said spool shaft;

an oscillator gear mounted on said reel body casing so as to be rotatable by said handle means;

a rotational plate disposed along a side surface of said oscillator gear so as to be rotatable;

a cam engaging pin formed on one surface of said rotational plate, said cam engaging pin engaging with a cam groove having an elliptical shape, formed on an inside surface of said reel body casing, which faces said oscillator gear; and an oscillator drive pin formed on another surface of said rotational plate and connected to said oscillator, movement of said cam engaging pin relative to said oscillator gear being given by a change in radius of said cam groove along with rotation of said oscillator gear causing said oscillator drive pin together with said rotational plate to move reciprocally relative to said oscillator gear, and a reciprocal movement of said oscillator drive pin causing a rotational velocity of said oscillator drive pin to be changed relative to a rotational velocity of said oscillator gear.

2. The spinning reel according to claim 1, wherein said rotational plate is pivoted on said oscillator gear so that said oscillator drive pin of said rotational plate slides reciprocally in the direction crossing obliquely the radial direction of said oscillator gear.

3. The spinning reel according to claim 1, wherein any one of said rotational plate and said oscillator gear has a guide slot formed thereon, which extends in a direction crossing obliquely the radial direction of said oscillator gear so that said oscillator drive pin of said rotational plate slides reciprocally in the direction crossing obliquely the radial direction of said oscillator gear, and another one of said rotational plate and said oscillator gear has a guide pin inserted in said slot.

4. A spinning reel according to claim 1, wherein said oscillator drive pin is displaced with respect to said cam engaging pin in a radial direction of said oscillator gear.

5. A spinning reel according to claim 1, wherein said oscillator drive pin is displaced by a predetermined angle with respect to said cam engaging pin in a circumferential direction of the oscillator gear.

* * * * *